(12) United States Patent
Sakai

(10) Patent No.: US 8,129,932 B2
(45) Date of Patent: Mar. 6, 2012

(54) DRIVING APPARATUS FOR THREE-PHASE AC SYNCHRONOUS MOTOR

(75) Inventor: Koji Sakai, Kariya (JP)

(73) Assignee: DENSO CORPORATION, Kariya (JP)

( * ) Notice: Subject to any disclaimer, the term of this patent is extended or adjusted under 35 U.S.C. 154(b) by 187 days.

(21) Appl. No.: 12/659,312

(22) Filed: Mar. 4, 2010

(65) Prior Publication Data

US 2010/0231153 A1 Sep. 16, 2010

(30) Foreign Application Priority Data

Mar. 13, 2009 (JP) .................................. 2009-61252
Jun. 12, 2009 (JP) ................................ 2009-141094

(51) Int. Cl.
*H02P 6/18* (2006.01)
(52) U.S. Cl. ............. 318/400.32; 318/400.2; 318/400.3; 318/400.9; 318/400.17; 363/132
(58) Field of Classification Search ................ 318/400.2, 318/400.3, 400.9, 400.17, 400.27; 363/132
See application file for complete search history.

(56) References Cited

U.S. PATENT DOCUMENTS

| | | | | |
|---|---|---|---|---|
| 6,548,984 | B2 * | 4/2003 | Shamoto et al. | 318/801 |
| 6,630,804 | B2 * | 10/2003 | Moriya et al. | 318/85 |
| 6,806,671 | B2 * | 10/2004 | Kusaka et al. | 318/442 |
| 6,836,416 | B2 * | 12/2004 | Ishihara et al. | 363/132 |
| 7,098,624 | B2 * | 8/2006 | Kusaka | 318/727 |
| 7,816,805 | B2 * | 10/2010 | Tanaka et al. | 307/10.1 |
| 7,969,104 | B2 * | 6/2011 | Taniguchi | 318/139 |
| 2002/0000784 | A1 * | 1/2002 | Shamoto et al. | 318/801 |
| 2002/0070715 | A1 * | 6/2002 | Sasaki et al. | 322/28 |
| 2002/0141216 | A1 * | 10/2002 | Ishihara et al. | 363/132 |
| 2003/0057914 | A1 * | 3/2003 | Kamatsu et al. | 318/727 |
| 2005/0241875 | A1 * | 11/2005 | Ta et al. | 180/443 |
| 2005/0258796 | A1 * | 11/2005 | Kusaka | 318/801 |
| 2008/0265975 | A1 * | 10/2008 | Takasu et al. | 327/374 |
| 2008/0278102 | A1 * | 11/2008 | Taniguchi | 318/400.27 |
| 2009/0096394 | A1 * | 4/2009 | Taniguchi | 318/400.09 |
| 2009/0128076 | A1 * | 5/2009 | Taniguchi | 318/400.41 |
| 2009/0134700 | A1 * | 5/2009 | Tanaka et al. | 307/10.6 |
| 2009/0200975 | A1 * | 8/2009 | Hayashi | 318/432 |
| 2009/0237020 | A1 * | 9/2009 | Sakai | 318/400.11 |
| 2009/0256506 | A1 * | 10/2009 | Sakai | 318/400.09 |
| 2010/0026220 | A1 * | 2/2010 | Sakai | 318/400.17 |
| 2010/0320945 | A1 * | 12/2010 | Taniguchi et al. | 318/400.02 |
| 2011/0031922 | A1 * | 2/2011 | Sakai et al. | 318/519 |
| 2011/0050136 | A1 * | 3/2011 | Sumi et al. | 318/400.3 |

FOREIGN PATENT DOCUMENTS

| | | |
|---|---|---|
| JP | B2-2563226 | 9/1996 |
| JP | B2-3968563 | 6/2007 |
| JP | B2-4239643 | 1/2009 |

* cited by examiner

*Primary Examiner* — Paul Ip
(74) *Attorney, Agent, or Firm* — Posz Law Group, PLC

(57) ABSTRACT

In a driving apparatus for a three-phase synchronous motor, in which a battery is connected between a neutral point of a stator coil and a negative-pole bus, a control circuit acquires three-phase AC currents. The control circuit checks whether a neutral-point electric current is contained in an electric current detected by an electric current detecting section. Based on the check result, the control circuit checks whether electric current values for three-phases containing the neutral-point electric current are set together or electric current values for three-phases excluding the neutral-point electric current are set together to acquire the three-phase AC currents for driving the motor.

10 Claims, 53 Drawing Sheets

DRIVING APPARATUS FOR THREE-PHASE AC SYNCHRONOUS MOTOR

CROSS REFERENCE TO RELATED APPLICATION

This application relates to and incorporates herein by reference Japanese Patent Applications No. 2009-61252 filed on Mar. 13, 2009 and No. 2009-141094 filed on Jun. 12, 2009.

FIELD OF THE INVENTION

The present invention relates to a driving apparatus for a three-phase alternating synchronous motor having a star-connected stator coil.

BACKGROUND OF THE INVENTION

A conventional driving apparatus for a three-phase alternating current (AC) motor includes an inverter circuit, which outputs a three-phase alternating current to a three-phase AC motor and a control circuit, which controls the inverter circuit, for example as disclosed in JP 2563226.

Such an inverter circuit has six transistors. The six transistors will hereinafter be represented by SW1 to SW6.

The transistors SW1 and SW4 are connected directly to each other between a positive-pole bus and a negative-pole bus. The transistors SW2 and SW5 are connected directly to each other between the positive-pole bus and the negative-pole bus. The transistors SW3 and SW6 are connected directly to each other between the positive-pole bus and the negative-pole bus. The transistors SW1, SW2 and SW3 are connected to the positive-pole bus. The transistors SW4, SW5 and SW6 are connected to the negative-pole bus.

A common connection point of the transistors SW1 and SW4 is connected to a W-phase coil of a stator coil of the three-phase AC motor. A common connection point of the transistors SW2 and SW5 is connected to a V-phase coil of the stator coil. A common connection point of the transistors SW3 and SW6 is connected to a U-phase coil of the stator coil. The stator coil is provided by a star connection of the U-phase coil, the V-phase coil and the W-phase coil. A positive electrode of a direct current (DC) power source is connected to the positive-pole bus of the inverter circuit. A negative electrode of the DC power source is connected to the negative-pole bus.

An electric current sensor for detecting three-phase AC currents output from the inverter circuit is connected between the positive-pole bus of the inverter circuit and the positive electrode of the DC power source. The control circuit controls the six transistors such that switching operation of the six transistors is performed on the basis of the electric current values detected by the electric current sensor. In association therewith, the inverter circuit outputs three-phase AC currents to the three-phase AC motor from the three common connection points based on a difference in voltage between the positive-pole bus and the negative-pole bus.

When the transistors SW1, SW5 and SW6 are ON among the transistors SW1 to SW6, a W-phase electric current flowing from the inverter circuit to the W-phase coil is detected by the electric current sensor.

When the transistors SW2, SW4 and SW6 are ON among the transistors SW1 to SW6, a V-phase electric current flowing from the inverter circuit to the V-phase coil is detected by the electric current sensor.

When the transistors SW3, SW4 and SW5 are ON among the transistors SW1 to SW6, a U-phase electric current flowing from the inverter circuit to the U-phase coil is detected by the electric current sensor.

The control circuit uses the W-phase electric current, the V-phase electric current and the U-phase electric current detected by the electric current sensor as described above as the three-phase AC currents and controls the three-phase AC motor through the inverter circuit based on the three-phase AC currents.

SUMMARY OF THE INVENTION

It is an object of the present invention to provide a driving apparatus for a three-phase AC synchronous motor having a DC power source connected between a neutral point of a stator coil and either one of a negative-pole bus or a positive-pole bus of an inverter circuit, so that the three-phase AC synchronous motor is controlled based on three-phase AC currents output from the inverter circuit to the stator coil.

According to the present invention, an improved driving apparatus is provided for a three-phase AC synchronous motor, in which a rotor is rotated by a rotating magnetic field produced by a stator coil including three coils star-connected to a neutral point. The driving apparatus comprises an inverter circuit, a capacitor, an electric current detecting section, a current acquiring section and a control section.

The inverter circuit includes pairs of switching elements. Each of the pairs of the switching elements is connected in series. The pairs of the switching elements are provided for respective phases and connected in parallel between a positive-pole bus and a negative-pole bus. The inverter circuit outputs three-phase AC currents to the stator coil for generating the rotating magnetic field based on two output voltages. One voltage is an output voltage from a DC power source connected between the neutral point and one of the positive-pole bus and the negative-pole bus. The other voltage is an output voltage from the capacitor. For outputting each of the three-phase AC currents, a control section turns on, at the same time, one of the switching elements connected to one of the positive-pole bus and the negative-pole bus and two of the switching elements connected to other one of the positive-pole bus and the negative-pole bus.

The electric current detecting section detects an electric current flowing between one of the positive-pole bus and the negative-pole bus and one of the DC power source and the capacitor.

The current acquiring section acquires, for each of the phases, an electric current containing a phase electric current output to one of the three coils as the electric current detected by the electric current detecting section. The current acquiring section acquires electric currents detected by the electric current detecting section for all three phases.

The control section sets the electric currents for the three phases detected by the electric current detecting section and acquired by the current acquiring section together into three-phase AC currents. The control section controls, based on the three-phase AC currents, the pairs of the switching elements for the respective phases.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF THE PREFERRED EMBODIMENT (First Embodiment)

Figure 1:
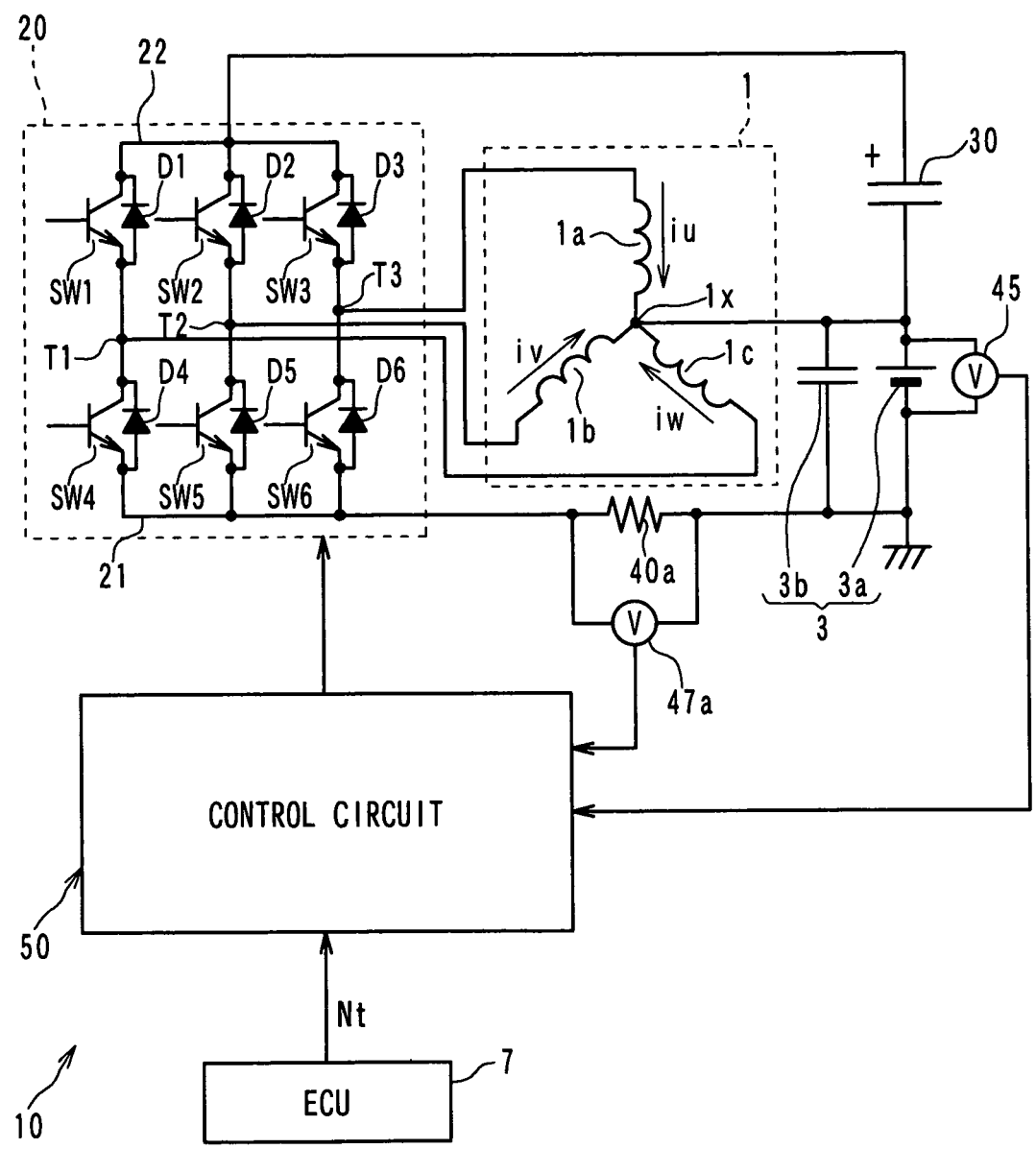
FIG. 1 is a diagram showing the configuration of a driving apparatus in a first embodiment according to the present invention.

Referring to FIG. 1, a driving apparatus for a three-phase AC synchronous motor according to the first embodiment of the present invention is denoted by numeral 10. The driving apparatus 10 outputs three-phase AC currents to the three-phase AC synchronous motor based on a DC voltage to drive the three-phase AC synchronous motor. A load, for example a compressor device, is connected to an output shaft of rotation of the three-phase AC synchronous motor.

The three-phase AC synchronous motor includes a rotor (not shown), for example having a permanent magnet embedded therein and a stator coil 1 providing a rotating magnetic field to the rotor. The stator coil 1 has a U-phase coil 1a, a V-phase coil 1b and a, W-phase coil 1c, which are star-connected to a neutral point 1x. A DC power source 3 is placed between the neutral point 1x of the stator coil 1 and the ground. The DC power source, 3 is formed of a battery 3a and a capacitor 3b.

The three-phase AC synchronous motor in the present embodiment has a structure which has no sensor for detecting the position information of the rotor.

The driving apparatus 10 includes an inverter circuit 20, a capacitor 30, a resistor 40, voltage sensors 45 and 47a and a control circuit 50. The inverter circuit 20 outputs three-phase AC currents iu, iv and iw to the stator coil 1 based on an output voltage from the DC power source 3 and a difference in voltage between the positive electrode and the negative electrode of the capacitor 30.

The inverter circuit 20 is formed, of transistors SW1 to SW6 and diodes D1, D2, D3, D4, D5 and D6.

The transistors SW1 and SW4 are connected in series directly to each other between a negative-pole bus 21 and a positive-pole bus 22. The transistors SW2 and SW5 are connected in series directly to each other between the negative-pole bus 21 and the positive-pole bus 22. The transistors SW3 and SW6 are connected in series directly to each other between the negative-pole bus 21 and the positive-pole bus 22. The negative-pole bus 21 is connected to the ground.

The transistors SW1 and SW4 are provided in a pair in association with the W-phase and a common connection point T1 of the transistors SW1 and SW4 is connected to the W-phase coil 1c. The transistors SW2 and SW5 are provided in a pair in association with the V-phase and a common connection point T2 of the transistors SW2 and SW5 is connected to the V-phase coil 1b. The transistors SW3 and SW6 are provided in a pair in association with the U-phase and a common connection point T3 of the transistors SW3 and SW6 is connected to the U-phase coil 1a. The pairs of the transistors are connected in parallel between the negative-pole bus 21 and the positive-pole bus 22.

Each of the transistors SW1 to S6 is formed by using a semiconductor transistor such as an insulated gate bipolar transistor or a field-effect transistor.

Each of the diodes D1, D2, D3, D4, D5 and D6 is placed in inverse-parallel with the associated one of the transistors SW1 to SW6.

The capacitor 30 provides an output voltage to the inverter circuit 20 together with the battery 3a. The positive electrode of the capacitor 30 is connected to the positive-pole bus 22 of the inverter circuit 20. The negative electrode of the capacitor 30 is connected to the neutral point 1x.

The resistor 40a is connected between the negative-pole bus 21 and a negative electrode of the battery 3a, that is, to the ground. The resistor 40a is used for acquiring a U-phase electric current iu, a V-phase electric current iv and a W-phase electric current iw as described below.

The U-phase electric current iu is a phase electric current, which flows from the common connection point T3 of the transistors SW3 and SW6 to the U-phase coil 1a. The V-phase electric current iv is a phase electric current, which flows from the common connection point T2 of the transistors SW2 and SW5 to the V-phase coil 1b. The W-phase electric current iw is a phase electric current, which flows from the common connection point T1 of the transistors SW1 and SW4 to the W-phase coil 1c.

In FIG. 1, the directions of the flow of the electric currents iu, iv and iw are defined such that arrows indicate a positive direction.

The voltage sensor 45 detects a potential difference between a positive electrode and the negative electrode of the DC power source 3.

The voltage sensor 47a detects a potential difference between one terminal and the other terminal of the resistor 40.

The control circuit 50 is formed of a microcomputer and a memory and as described below, performs processing of controlling the transistors SW1 to SW6 based on the respective values detected by the sensors 45 and 47a and the target number of revolution Nt provided by an electronic control unit (ECU) 7.

Next, the operation in the present embodiment will be described with reference to FIGS. 2 to 7.

Figure 2:
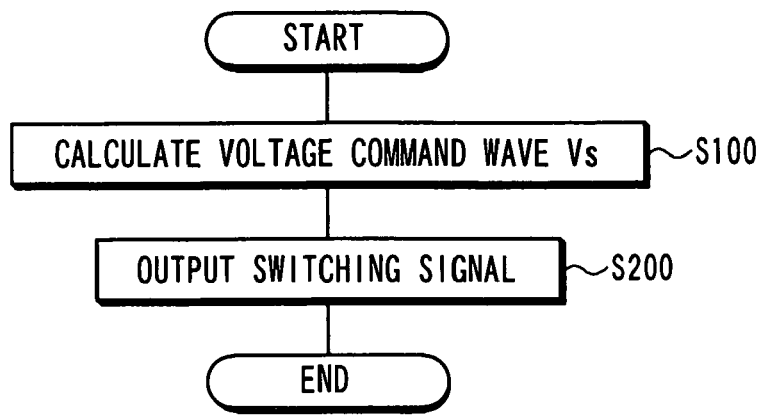
FIG. 2 is a flowchart showing control processing performed by a control circuit shown in FIG. 1.
Figure 3:
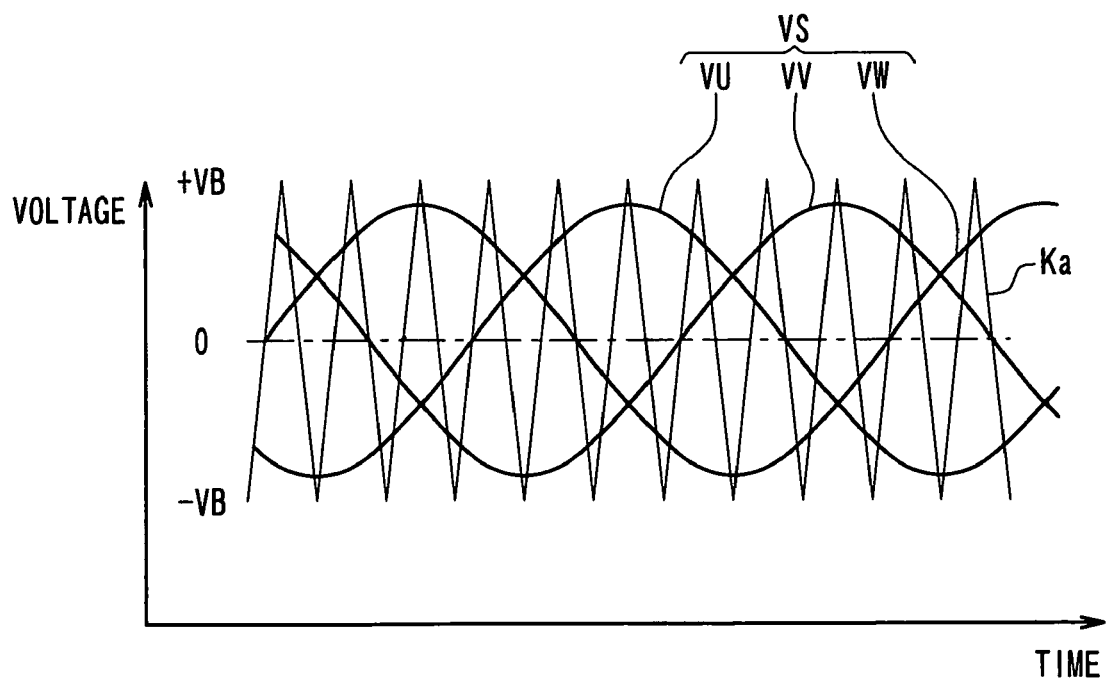
FIG. 3 is a diagram showing a carrier wave and a voltage command wave for use in the control circuit shown in FIG. 1.

The control circuit 50 performs control processing of a conventional triangular wave comparison method in accordance with a flowchart of FIG. 2. The control processing of the conventional triangular wave comparison method involves control of the inverter circuit 20 based on a comparison between a voltage command wave VS for each phase and a carrier wave Ka. FIG. 3 shows the carrier wave Ka. The carrier wave Ka is a triangular wave representing a voltage, which periodically changes from zero potential (0) toward a positive or negative side. The value detected by the voltage sensor 45 is set to a peak value VB of the carrier wave Ka.

First, at step S100, the control circuit 50 calculates the voltage command wave for each phase for controlling an actual number of revolution (actual rotation speed) Na of the three-phase AC motor to a target number of revolution (target rotation speed) Nt of the same.

The voltage command wave VS for each phase shows a voltage command value for each of the coils 1a, 1b and 1c and is three-phase command waves formed of a U-phase command wave VU, a V-phase command wave W and a W-phase command wave VW as shown in FIG. 3. Each of the voltage command waves VU, W and VW is a sinusoidal wave representing a voltage, which periodically changes from zero potential toward a positive or negative side. As described below, the waves VU, W and VW are used in controlling the inverter circuit 20.

A conventional voltage equation for a motor is used in the calculation of the voltage command wave for each phase. The voltage equation represents a relationship between an armature voltage for each phase produced in each of the coils 1a, 1b and 1c and each of the phase electric currents iu, iv and iw. In the present embodiment, each of the phase electric currents iu, iv and iw is substituted into the voltage equation to calculate the armature voltage for each phase and the calculated armature voltage is used as the voltage command wave for each phase. The phase electric currents iu, iv and iw are acquired through electric current calculation processing described below.

At the next step S200, a switching signal for controlling the inverter circuit 20 is acquired by using the voltage command wave VS.

Specifically, the voltage command wave VS and the carrier wave Ka is compared for each wave to determine which of the transistors SW1 to SW6 should be turned on.

The U-phase command wave VU is associated with the transistors SW3 and SW6. When the U-phase command wave VU is larger than the carrier wave Ka, the transistor SW3 on the side of the positive-pole bus 22, that is, the high-potential side, should be turned on and the transistor SW6 on the side of the negative-pole bus 21, that is, the low-potential side, should be turned off. When the U-phase command wave VU is smaller than the carrier wave Ka, the transistor SW3 should be turned off and the transistor SW6 should be turned on.

The V-phase command wave W is associated with the transistors SW2 and SW5. Similarly to the case of the U-phase command wave VU, one of the transistor SW2 on the side of the positive-pole bus 22 and the transistor SW5 on the side of the negative-pole bus 21 should be turned off and the other transistor should be turned on in accordance with the result of a comparison between the V-phase command wave W and the carrier wave Ka.

Similarly, one of the transistor SW1 on the side of the positive-pole bus 22 and the transistor SW4 on the side of the negative-pole bus 21 should be turned off and the other transistor should be turned on in accordance with the result of a comparison between the W-phase command wave VW and the carrier wave Ka.

The control circuit 50 determines in this manner which one of the transistors SW1 to SW6 should be turned on and calculates the switching signal containing the information of the determination.

Then, the processing returns to step S100 and repeats the processing at steps S100 and S200 to acquire a control signal for the inverter circuit 20 repeatedly.

The switching signals acquired as described above are output to the inverter circuit 20. This causes switching operation of the transistors SW1 to SW6. As a result, three-phase AC currents are output to the stator coil 1 from the common connection points T1, T2 and T3.

Thus, a rotating magnetic field is produced from the stator coil 1. The rotor rotates in synchronization with the rotating magnetic field.

With the switching operation of the transistors SW4, SW5 and SW6 on the side of the negative-pole bus 21, electric charge is accumulated in the capacitor 30.

For example, when the transistor SW4 is turned on in those transistors on the side of the negative-pole bus 21, an electric current flows from the DC power source 3 to the ground through the neutral point 1x, the W-phase coil 1c and the transistor SW4. At this time, energy is accumulated in the W-phase coil 1c. Thereafter, when the transistor SW4 is turned off, an electric current based on the energy accumulated in the W-phase coil 1c flows toward the positive-pole bus 22 through the diode D1.

That is, the electric current flows from the W-phase coil 1c toward the positive-pole bus 22 through the diode D1 when the transistor SW4 is turned off. The electric current flows toward the positive electrode of the capacitor 30 as a charge electric current and accumulates electric charge on the capacitor 30.

Next, electric current calculation processing in the present embodiment will be described with reference to FIGS. 4 to 7.

Figure 5:
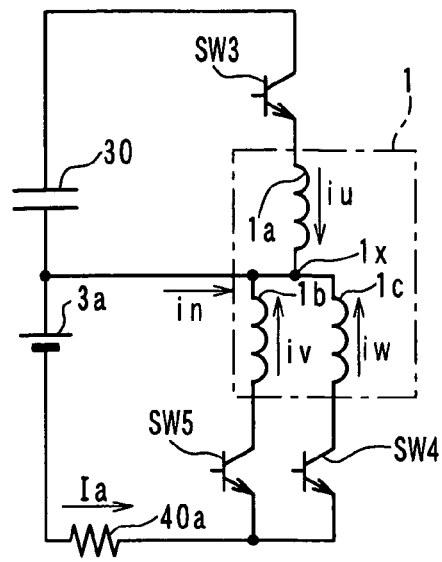
FIG. 5 is a diagram schematically showing an inverter circuit shown in FIG. 1.

FIG. 5 shows a schematic diagram of the inverter circuit 20 when the transistors SW3, SW4 and SW5 are ON among the transistors SW1 to SW6. In FIG. 5, the transistors SW1, SW2, SW6 and the diodes D1 to D6 are not shown.

Figure 6:
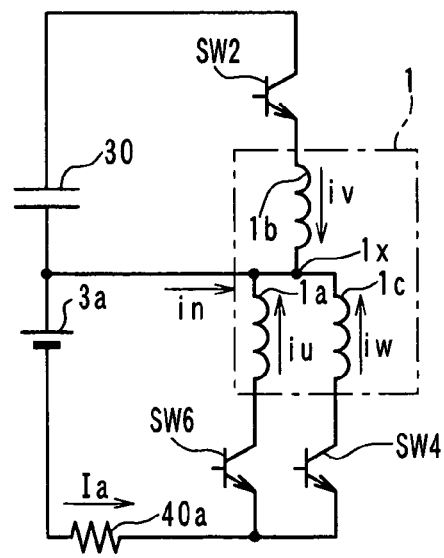
FIG. 6 is a diagram schematically showing the inverter circuit shown in FIG. 1.

FIG. 6 shows a schematic diagram of the inverter circuit 20 when the transistors SW2, SW4 and SW6 are ON among the transistors SW1 to SW6. In FIG. 6, the transistors SW1, SW3, SW5 and the diodes D1 to D6 are not shown.

Figure 7:
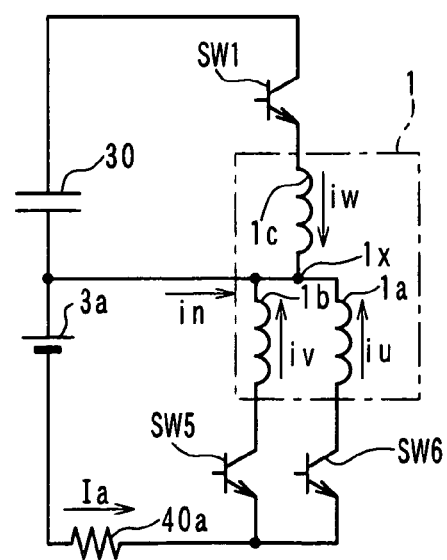
FIG. 7 is a diagram schematically showing the inverter circuit shown in FIG. 1.

FIG. 7 shows a schematic diagram of the inverter circuit 20 when the transistors SW1, SW5 and SW6 are ON among the transistors SW1 to SW6. In FIG. 7, the transistors SW2, SW3, SW4 and the diodes D1 to D6 are not shown. In FIGS. 5, 6 and 7, the direction of the flow of the electric current Ia is defined such that arrows indicate the positive direction.

Figure 4:
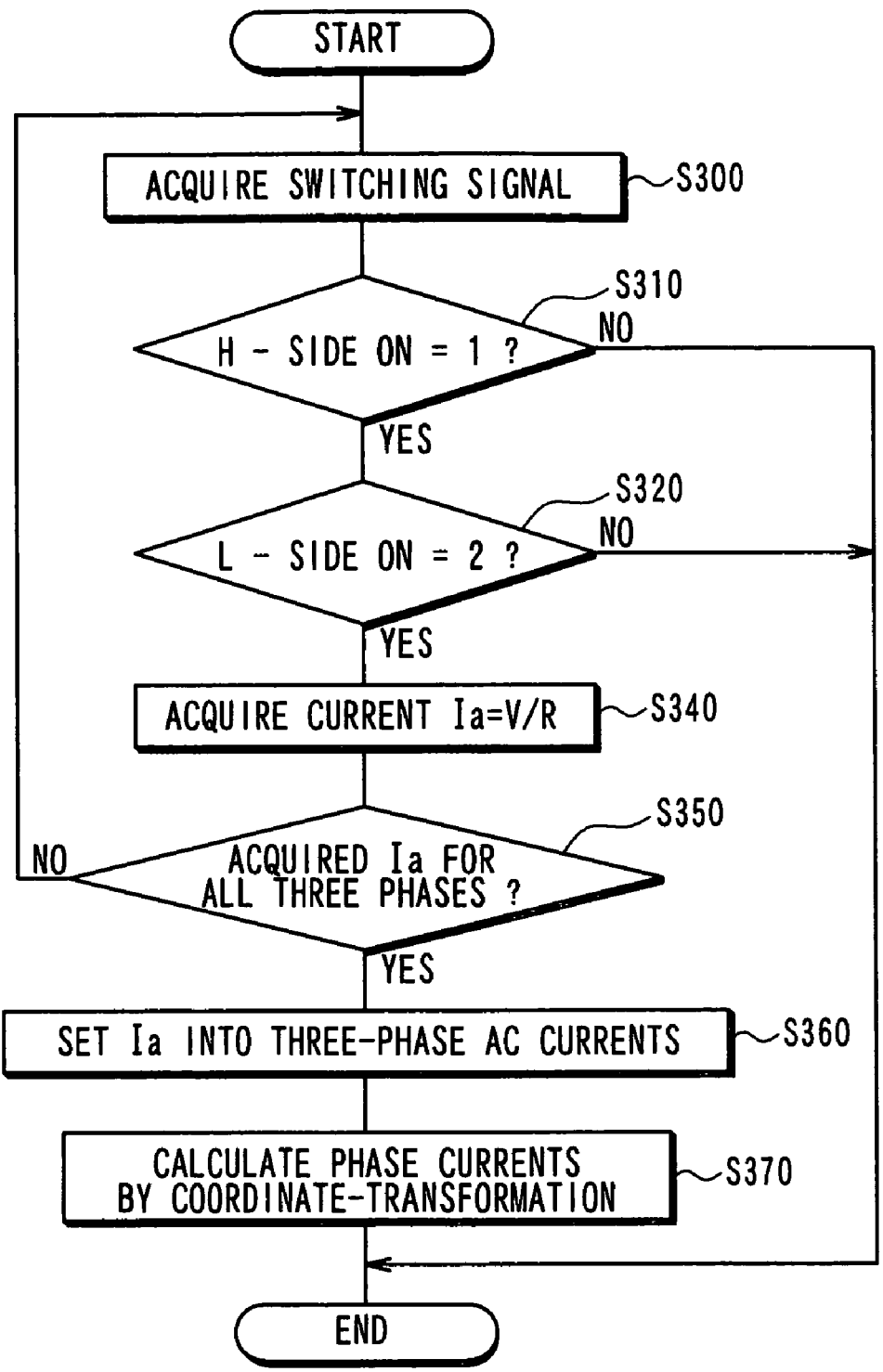
FIG. 4 is a flowchart showing electric current calculation processing performed by the control circuit shown in FIG. 1.

FIG. 4 is a flowchart showing the electric current calculation processing. The control circuit 50 performs the electric current calculation processing in accordance with the flowchart of FIG. 4. The electric current calculation processing is repeatedly performed and the performance of the electric current calculation processing is started each time the switching signal is calculated at step S200 described above. Specifically, the electric current calculation processing is performed each time the transistor to be turned on is changed among the transistors SW1 to SW6.

First, description is made with respect to the situation shown in FIG. 5, in which the transistors SW3, SW4 and SW5 are ON among the transistors SW1 to SW6.

At the first step S300, the switching signal is acquired. At the next step S310, it is checked, on the basis of the switching signal whether the number of ON transistors (denoted as ON number in FIG. 4) among the transistors SW1, SW2 and SW3 (denoted as high potential side (H-side) SWs in FIG. 4) is one or not.

It is then determined that the number of ON transistors among the transistors SW1, SW2 and SW3 is one and YES is produced at step S310. This is because only the transistor SW3 is ON (turned on) among the transistors SW1, SW2 and SW3.

At the next step S320, it is checked, on the basis of the switching signal whether the number of ON transistors (denoted as ON number in FIG. 4) among the transistors SW4, SW5 and SW6 (denoted as low potential side (L-side) SWs in FIG. 4) is two or not.

It is then determined that the number of ON transistors among the transistors SW4, SW5 and SW6 is two and YES is produced at step S330. This is because the transistors SW4 and SW5 are ON among the transistors SW4, SW5 and SW6.

When the transistors SW3, SW4 and SW5 are ON among the transistors SW1 to SW6 (FIG. 5), an electric current (iv+iw) provided by adding the V-phase electric current iv to the W-phase electric current iw flows as the electric current Ia through the resistor 40a. Assuming that an electric current flowing from the positive electrode of the battery 3a to the neutral point 1x of the stator coil 1 is defined as a neutral-point electric current in, the electric current (iv+iw) is equal to −(in+iu). The processing proceeds to step S340 to acquire −(in+iu) as a current value V/R provided by dividing a voltage V detected by the voltage sensor 47a by a resistance value R of the resistor 40a.

At the next step S350, it is checked whether the electric current Ia flowing through the resistor 40a has been acquired for all the three-phases or not. Since the electric current Ia has been acquired only for the U-phase at this point (FIG. 5), it is determined that the electric current Ia has not been acquired for all the three phases yet and NO is produced. Then, the processing returns to step S300.

Next, when the transistors SW2, SW4 and SW6 are ON among the transistors SW1 to SW6 as shown in FIG. 6, the switching signal is acquired at step S300, it is determined based on the switching signal that the number of ON transistors among the transistors SW1, SW2 and SW3 is one and YES is produced at step S310.

At the next step S320, it is determined that the number of ON transistors among the transistors SW4, SW5 and SW6 is two and YES is produced. This is because the transistors SW4 and SW6 are ON among the transistors SW4, SW5 and SW6.

When the transistors SW2, SW4 and SW6 are ON among the transistors SW1 to SW6, an electric current (iu+iw) flows as the electric current Ia through the resistor 40a. The electric current (iu+iw) is equal to −(in+iv). The control processing proceeds to step S340 to acquire −(in+iv) as the value V/R provided by dividing the voltage V detected by the voltage sensor 47a by the resistance value R of the resistor 40a.

At the next step S350, it is checked whether the electric current Ia flowing through the resistor 40a has been acquired for the three phases or not. Since the electric current Ia has been acquired only for the U-phase and the V-phase at this point (FIG. 6), it is determined that the electric current Ia has not been acquired for all the three phases yet and NO is produced. Then, the processing returns to step S300.

Next, when the transistors SW1, SW5 and SW6 are ON among the transistors SW1 to SW6 as shown in FIG. 7, the switching signal is acquired at step S300 and the control processing proceeds to the next step S310. It is determined that the number of ON transistors among the transistors SW1, SW2 and SW3 is one and YES is produced at step S310. At the next step S320, it is determined that the number of ON transistors among the transistors SW4, SW5 and SW6 is two and YES is produced.

When the transistors SW1, SW5 and SW6 are ON, an electric current (iu+iv) flows as the electric current Ia through the resistor 40a. The electric current (iu+iv) is equal to −(in+iw). The processing proceeds to step S340 to acquire −(in+iw) as the value V/R provided by dividing the voltage V detected by the voltage sensor 47a by the resistance value R of the resistor 40a.

At the next step S350, it is determined that the electric current Ia flowing-through the resistor 40a has been acquired for all the three phases and YES is produced. The control processing proceeds to the next step S360 to set the electric current Ia for all the three phases acquired at the step S340 together into three-phase AC currents {−(in+iu), −(in+iv), −(in+iw)} of a three-phase fixed coordinate system.

At the next step S370, the three-phase AC currents of the three-phase fixed coordinate system is coordinate-transformed to calculate the phase electric currents iu, iv, iw.

First, assuming that a U-phase component, a V-phase component and a W-phase component of the three-phase AC currents are represented by iva, iva and iwa, respectively, the following relations (1), (2) and (3) hold:

$$iua = -(in+iv) \tag{1}$$

$$iva = -(in+iu) \tag{2}$$

$$iwa = -(in+iw) \tag{3}$$

Next, the three-phase AC currents iva, iva and iwa of the three-phase fixed coordinate system are substituted into the following equation 1 to calculate AC currents iα and iβ of a two-phase fixed coordinate system:

$$\begin{bmatrix} i\alpha \\ i\beta \end{bmatrix} = \sqrt{\frac{2}{3}} \begin{bmatrix} 1 & -1/2 & -1/2 \\ 0 & \sqrt{3}/2 & -\sqrt{3}/2 \end{bmatrix} \begin{bmatrix} iu \\ iv \\ iw \end{bmatrix} \quad \text{[Equation 1]}$$

When the above relations-1, (2) and (3) are substituted into the above equation 1, the neutral-point electric currents in, which are contained in the electric currents iva, iva and iwa, cancel out each other and result in the AC currents iα and iβ, which include only the electric currents iu, iv and iw.

The electric currents iva, iva and iwa can be transformed from the three-phase fixed coordinate system to the AC currents of the two-phase fixed coordinate system in this manner to acquire the AC currents iα and iβ of the two-phase fixed coordinate system excluding the neutral-point electric current in.

In addition, the AC currents iα and iβ of the two-phase fixed coordinate system are transformed into electric currents of the three-phase fixed coordinate system to acquire electric currents iu, iv and iw excluding the neutral-point electric current in for each phase from the electric currents iva, iva and iwa. The electric currents iu, iv and iw thus acquired are used as the three-phase AC current for calculating the voltage command wave for each phase at step S100 described above.

In the present embodiment described above, when the control circuit 50 has acquired the electric current Ia flowing through the resistor 40a for the three-phases, the circuit 50 brings the electric current Ia for the three-phases together into the three-phase AC currents iva, iva and iwa of the three-phase fixed coordinate system. In addition, the control circuit 50 transforms the three-phase AC currents of the three-phase fixed coordinate system into the AC currents of the two-phase fixed coordinate system. Furthermore, the control circuit 50 transforms the AC currents of the two-phase fixed coordinate system into the three-phase AC currents of the three-phase fixed coordinate system to acquire the electric currents iu, iv and iw excluding the neutral-point electric current in for each phase from the electric currents iva, iva and iwa. Then, the control circuit 50 uses the electric currents iu, iv and iw to acquire the voltage command wave for each phase and controls the inverter circuit 20 based on the voltage command wave for each phase. In this manner, the three-phase AC synchronous motor can be controlled by using the three-phase AC currents iva, iva and iwa through the inverter circuit 20.

In the present embodiment, the single resistor 40a and the single voltage sensor 47a are used in order to acquire the three-phase AC currents iva, iva and iwa.

Some conventional driving apparatuses for three-phase AC synchronous motors employ three resistors and three voltage sensors in order to detect three-phase AC output currents from the inverter circuit 20 to the stator coil 1.

In contrast, the single resistor 40a and the single voltage sensor 47a are used as described above in the present embodiment. This can reduce the number of resistors and the number of voltage sensors.

The first embodiment described above is an example, in which the voltage command wave for each phase is calculated by using the electric currents iu, iv and iw excluding the neutral-point electric current in for each phase from the three-phase AC currents (iva, iva, iwa). Alternatively, the voltage command wave for each phase may be calculated by using three-phase AC currents (iva, iva, iwa) including the neutral-point electric current in for each phase.

While the first embodiment described above is an example, in which the three-phase AC currents iva, iva and iwa of the three-phase fixed coordinate system are used in acquiring the Voltage command wave VS, the present invention is not limited thereto. Alternatively, AC currents of the two-phase fixed coordinate system or electric currents of a rotational coordinate system may be used to acquire the voltage command wave VS.

(Second Embodiment)

The first embodiment has shown the example, in which the three-phase AC currents iva, iva and iwa are coordinate-transformed to acquire the electric currents iu, iv and iw excluding the neutral-point electric current in for each phase from the three-phase AC currents iva, iva and iwa. Instead, in the second embodiment described below, the neutral-point electric current in is detected and the detected neutral-point electric current in is used to exclude the neutral-point electric current in for each phase from three-phase AC currents iva, iva and iwa.

Figure 8:
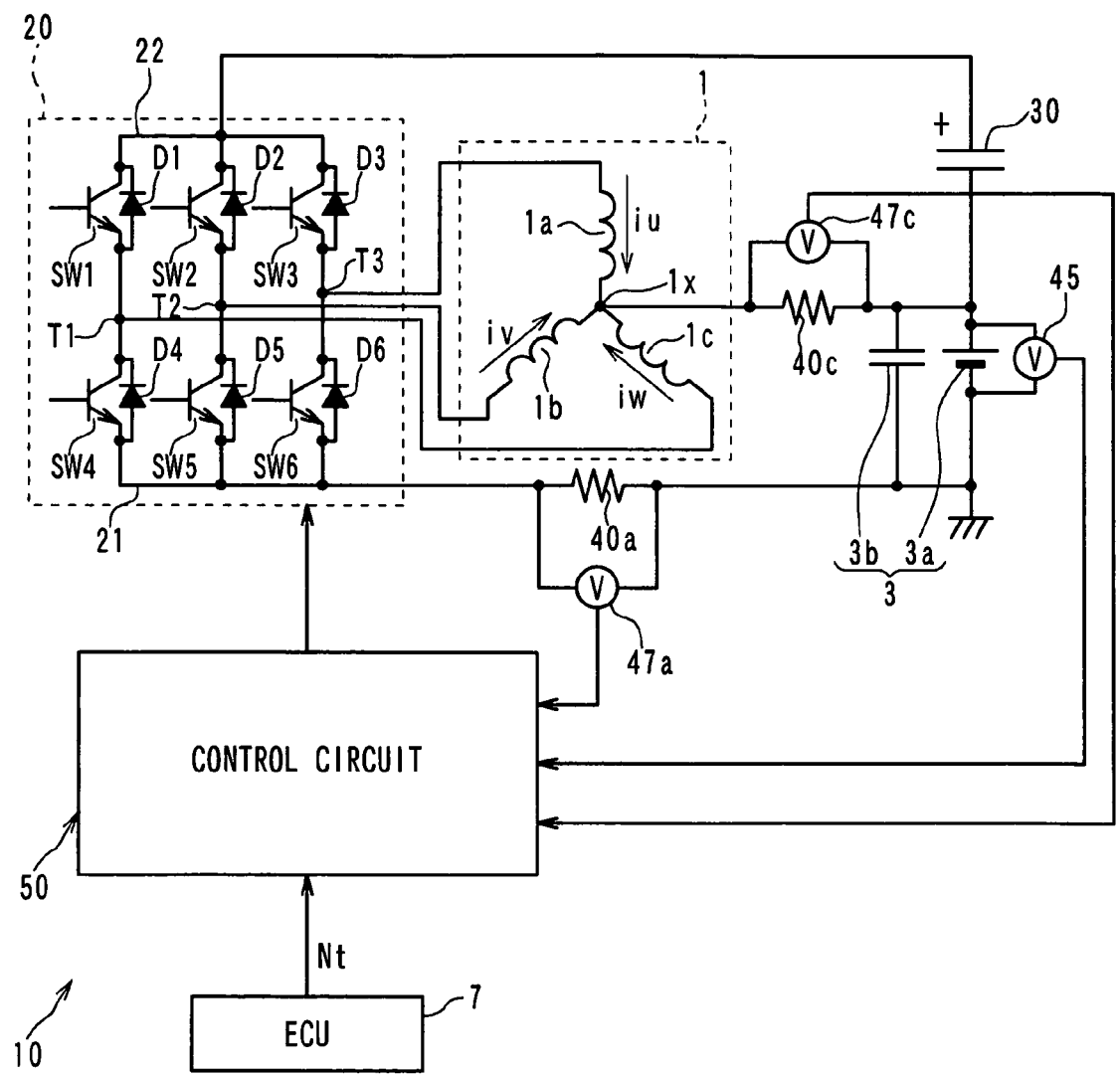
FIG. 8 is a diagram showing the configuration of a driving apparatus in a second embodiment according to the present invention.

FIG. 8 shows the circuit configuration of the driving apparatus 10 in the present embodiment.

The driving apparatus 10 in FIG. 8 is provided by adding a resistor 40c and a voltage sensor 47c to the driving apparatus 10 shown in FIG. 1.

The resistor 40c is connected between the neutral point 1x of the stator coil 1 and the positive electrode of the battery 3a. The resistor 40c is used for detecting the neutral-point electric current in.

The voltage sensor 47c detects a potential difference between one terminal and the other terminal of the resistor 40c.

Next, the operation of a control circuit 50 in the present embodiment will be described with reference to FIGS. 9 to 11.

Figure 9:
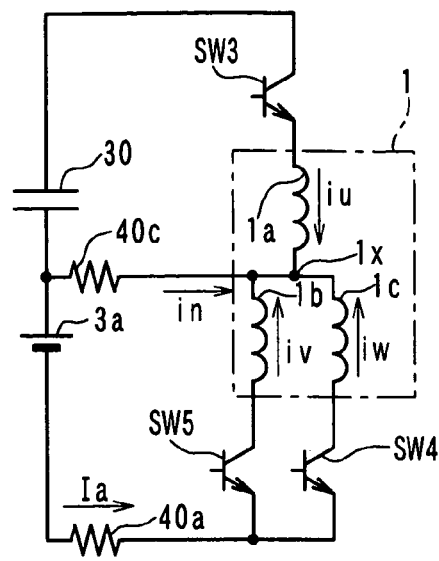
FIG. 9 is a diagram schematically showing an inverter circuit shown in FIG. 8.

FIG. 9 shows a schematic diagram of the inverter circuit 20 when the transistors SW3, SW4 and SW5 are ON among the transistors SW1 to SW6 and also shows the stator coil 1. FIG. 10 shows a schematic diagram of the inverter circuit 20 when the transistors SW2, SW4 and SW6 are ON and also shows the stator coil 1. FIG. 11 shows a schematic diagram of the inverter circuit 20 when the transistors SW1, SW5 and SW6 are ON and also shows the stator coil 1.

When the transistors SW3, SW4 and SW5 are ON among the transistors SW1 to SW6 as shown in FIG. 9, the electric current −(in+iu) can be acquired as a value V/R provided by dividing the voltage V detected by the voltage sensor 47a by the resistance value R of the resistor 40a similarly to the first embodiment described above.

When the transistors SW3, SW4 and SW5 are ON among the transistors SW1 to SW6 as shown in FIG. 9, the neutral-point electric current in is acquired as the value V/R provided by dividing the voltage V detected by the voltage sensor 47c by the resistance value R of the resistor 40c.

Subsequently, the neutral-point electric current in is used to acquire the electric current −iu excluding the electric current −in from the electric current (in+iu) acquired as described above. In addition, the electric current −iu can be multiplied by −1 to acquire the U-phase electric current iu.

Figure 10:
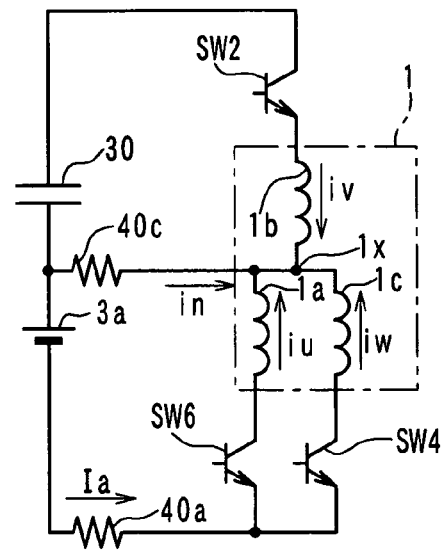
FIG. 10 is a diagram schematically showing the inverter circuit shown in FIG. 8.

Next, when the transistors SW2, SW4 and SW6 are ON among the transistors SW1 to SW6 as shown in FIG. 10, the electric current (in+iv) can be acquired as the value V/R provided by dividing the voltage V detected by the voltage sensor 47a by the resistance value R of the resistor 40a, similarly to the first embodiment described above.

In addition, when the transistors SW2, SW4 and SW6 are ON among the transistors SW1 to SW6, the neutral-point electric current in is acquired as the value V/R provided by dividing the voltage V detected by the voltage sensor 47c by the resistance value R of the resistor 40c.

Subsequently, the neutral-point electric current in is used to acquire the electric current −iv excluding the electric current −in from the electric current (in+iv) acquired as described above. In addition, the electric current −iv can be multiplied by −1 to acquire the V-phase electric current iv.

Figure 11:
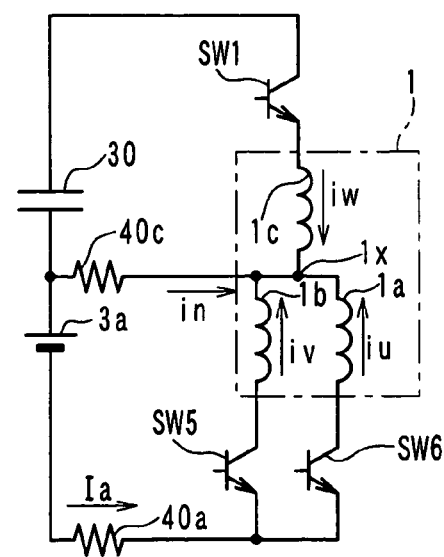
FIG. 11 is a diagram schematically showing the inverter circuit shown in FIG. 8.

Next, when the transistors SW1, SW5 and SW6 are ON among the transistors SW1 to SW6 as shown in FIG. 11, the electric current (in+iw) can be acquired as the value V/R provided by dividing the voltage V detected by the voltage sensor 47a by the resistance value R of the resistor 40a, similarly to the first embodiment described above.

In addition, when the transistors SW1, SW5 and SW6 are ON among the transistors SW1 to SW6, the neutral-point electric current in is acquired as the value V/R provided by dividing the voltage V detected by the voltage sensor 47c by the resistance value R of the resistor 40c.

Subsequently, the neutral-point electric current in is used to acquire the electric current −iw excluding the electric current −in from the electric current (in+iw) acquired as described above. In addition, the electric current −iw can be multiplied by −1 to acquire W-phase electric current iw.

The U-phase electric current iu, the V-phase electric current iv and the W-phase electric current iw thus acquired are set together into the three-phase AC currents. The three-phase AC currents are used to calculate the voltage command wave for each phase.

With the operation described above, the control circuit 50 can acquire the three-phase AC currents iu, iv and iw and can use the acquired three-phase AC currents iu, iv and iw to control the three-phase AC synchronous motor through the inverter circuit 20, similarly to the first embodiment described above.

(Third Embodiment)

The first and second embodiments described above have shown the examples, in which the electric current including the neutral-point electric current in added to the phase electric current is detected for each phase as the electric current Ia flowing through the resistor 40a. Instead, in the third embodiment described below, the phase electric current is detected as the electric current Ia flowing through the resistor 40a.

The circuit configuration of the driving apparatus 10 in the present embodiment is identical to the circuit configuration of the driving apparatus 10 in the first embodiment described above.

Control processing performed by the control circuit 50 in the present embodiment will be described below with reference to FIGS. 12 to 15.

Figure 13:
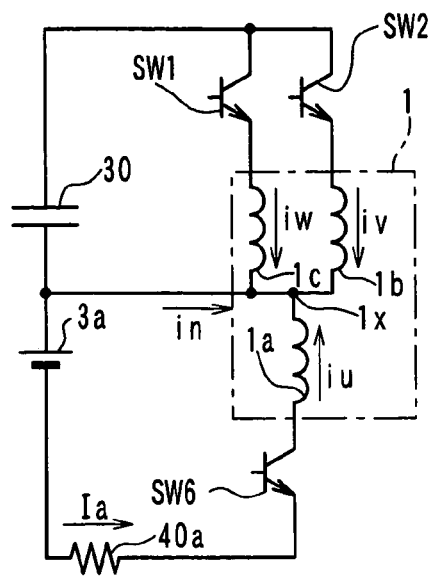
FIG. 13 is a diagram schematically showing an inverter circuit shown in FIG. 12.

FIG. 13 shows a schematic diagram of the inverter circuit 20 when transistors SW1, SW2 and SW6 are ON among transistors SW1 to SW6. In FIG. 13, the transistors SW3, SW4, SW5 and the diodes D1 to D6 are not shown.

Figure 14:
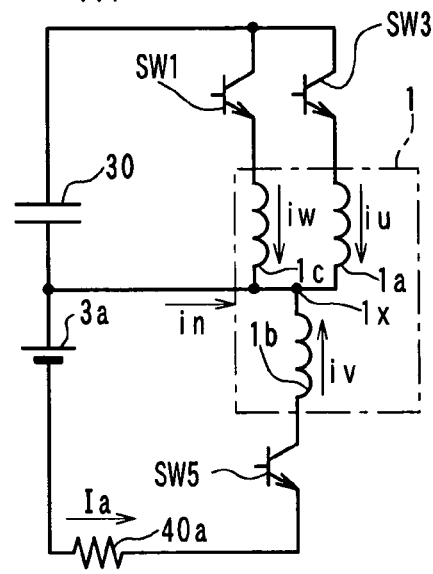
FIG. 14 is a diagram schematically showing the inverter circuit shown in FIG. 12.

FIG. 14 shows a schematic diagram of the inverter circuit 20 when the transistors SW1, SW3 and SW5 are ON among the transistors SW1 to SW6.

In FIG. 14, the transistors SW2, SW4, SW6 and the diodes D1 to D6 are not shown.

Figure 15:
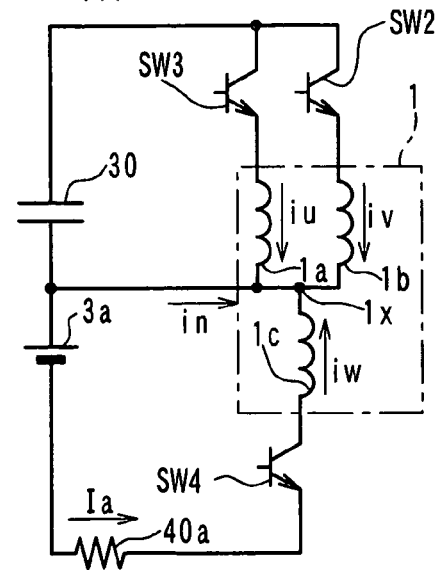
FIG. 15 is a diagram schematically showing the inverter circuit shown in FIG. 12.

FIG. 15 shows a schematic diagram of the inverter circuit 20 when the transistors SW2, SW3 and SW4 are ON among the transistors SW1 to SW6. In FIG. 15, the transistors SW1, SW5, SW6 and the diodes D1 to D6 are not shown. In FIGS. 13, 14 and 15, the direction of the flow of the electric current Ia is defined such that arrows indicate a positive direction.

Figure 12:
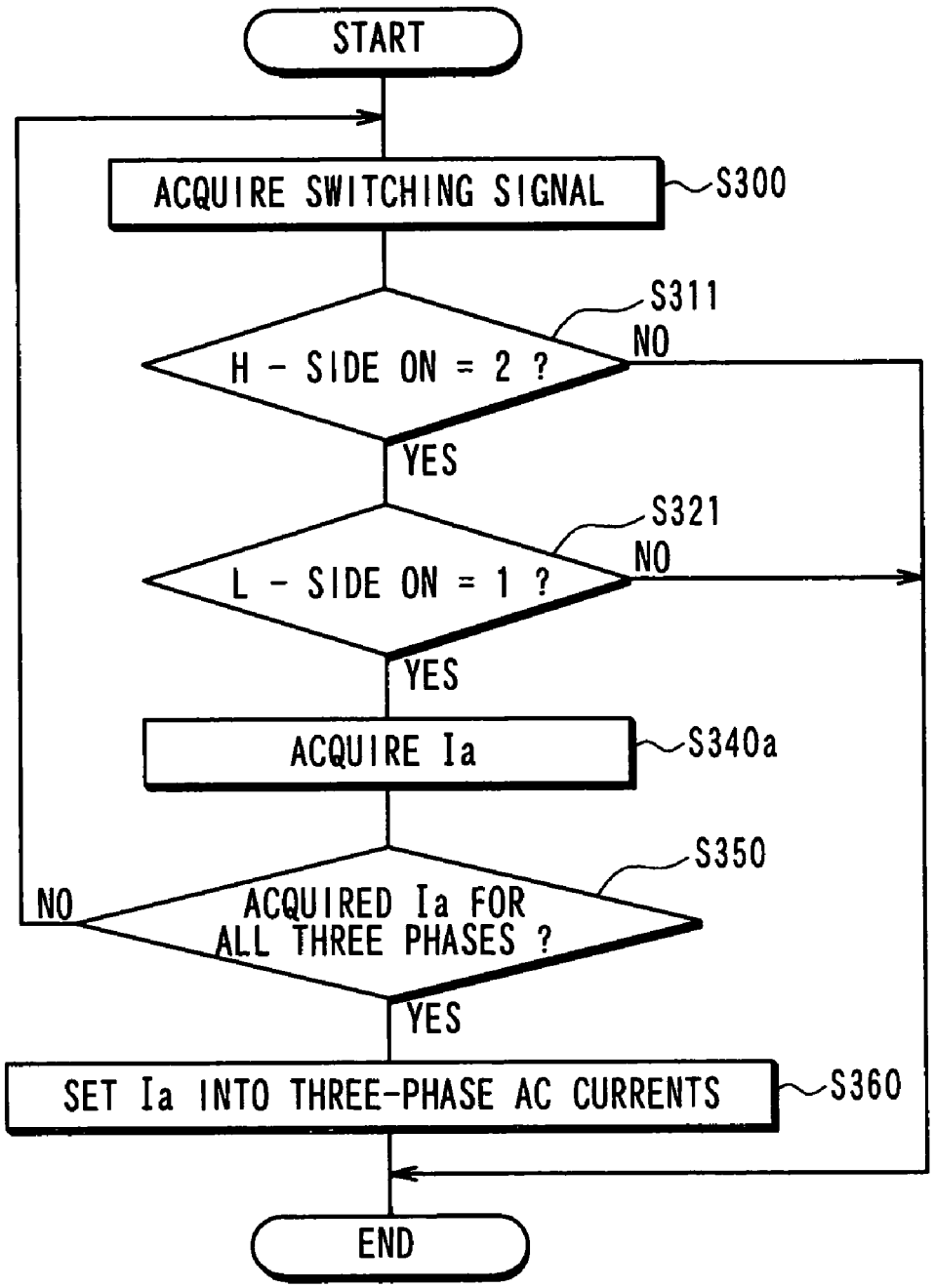
FIG. 12 is a diagram showing the configuration of a driving apparatus in a third embodiment according to the present invention.

FIG. 12 is a flowchart showing electric current calculation processing performed by the control circuit 50 in the present embodiment. The control circuit 50 performs the electric current calculation processing in accordance with the flowchart of FIG. 12.

First, description is made with respect to the situation, in which the transistors SW1, SW2 and SW6 are ON among the transistors SW1 to SW6.

At the first step S300, the switching signal is acquired. At the next step S311, it is checked, on the basis of the switching signal whether the number of ON transistors (denoted as ON number in FIG. 12) among the transistors SW1, SW2 and SW3 (denoted as high or H-side SWs in FIG. 12) is two or not.

Since only the two transistors SW1 and SW2 are ON at this point among the transistors SW1, SW2 and SW3, it is determined that the number of ON transistors among the transistors SW1, SW2 and SW3 is two and YES is produced at step S311.

At the next step S321, it is checked, on the basis of the switching signal whether the number of ON transistors (denoted as ON number in FIG. 12) among the transistors SW4, SW5 and SW6 (denoted as low or L-side SWs in FIG. 12) is one or not.

Since only the transistor SW6 is ON at this point among the transistors SW4, SW5 and SW6, it is determined that the number of ON transistors among the transistors SW4, SW5 and SW6 is one and YES is produced at step S321.

When the transistors SW1, SW2 and SW6 are ON among the transistors SW1 to SW6 (FIG. 13), the U-phase electric current iu flows as the electric current Ia through the resistor 40a. The control processing proceeds to the next step S340a to acquire the electric current iu as the value V/R provided by dividing the voltage V detected by the voltage sensor 47a by the resistance value R of the resistor 40a.

At the next step S350, it is checked whether or not the electric current Ia flowing through the resistor 40a has been acquired for the three-phases. Since the electric current Ia has been acquired only for the U-phase at this point, it is determined that the electric current Ia has not been acquired for the three phases yet and NO is produced.

Then, the processing returns to step S300 to acquire the switching signal. When the transistors SW1, SW3 and SW5 are ON at this point among the transistors SW1 to SW6, it is determined that the number of ON transistors among the transistors SW1, SW2 and SW3 is two and YES is produced at the next step S311.

Then, it is determined that only the transistor SW5 is ON among the transistors SW4, SW5 and SW6 and that the number of ON transistors among the transistors SW4, SW5 and SW6 is one and YES is produced at step S321.

When the transistors SW1, SW3 and SW5 are ON among the transistors SW1 to SW6 (FIG. 14), the electric current iv flows as the electric current Ia through the resistor 40a. The control processing proceeds to the next step S341 to acquire the V-phase electric current iv as the value V/R provided by dividing the voltage V detected by the voltage sensor 47a by the resistance value R of the resistor 40a.

Since the electric current Ia has been acquired only for the U-phase and the V-phase, it is determined that the electric current Ia has not been acquired for the three phases yet and NO is produced at the next step S350.

Then, the processing returns to step S300 to acquire the switching signal. When the transistors SW2, SW3 and SW4 are ON at this point among the transistors SW1 to SW6, it is determined that the number of ON transistors among the transistors SW1, SW2 and SW3 is two and YES is produced at the next step S311. It is determined that the number of ON transistors among the transistors SW4, SW5 and SW6 is one and YES is produced at the next step S321.

When the transistors SW2, SW3 and SW4 are ON (FIG. 15), the electric current iw flows as the electric current Ia through the resistor 40a. The control processing proceeds to the next step S340a to acquire the W-phase electric current iw as the value V/R provided by dividing the voltage V detected by the voltage sensor 47a by the resistance value R of the resistor 40a.

It is determined that the electric current Ia flowing through the resistor 40a has been acquired for the three-phases and YES is produced at the next step S350. The control processing proceeds to the next step S360 to bring the electric current Ia for the three-phases acquired at the step S340a together into three-phase AC currents iu, iv and iw.

In the present embodiment described above, the control circuit 50 acquires the phase electric currents iu, iv and iw as the electric current Ia flowing through the resistor 40a and brings the phase electric currents iu, iv and iw together into the three-phase AC currents. Therefore, similarly to the first embodiment described above, the three-phase AC synchronous motor can be controlled through the inverter circuit 20 by using the three-phase AC output from the inverter circuit 20 to the stator coil 1.

The control circuit 50 may calculate, for each phase, average values of the phase electric currents iu, iv and iw acquired at step S360 in the third embodiment described above and the phase electric currents iu, iv and iw acquired in the first embodiment described above and may use the average values of the phase electric currents to drive the three-phase AC synchronous motor through the inverter circuit 20.

(Fourth Embodiment)

The first to third embodiments described above have shown the examples, in which the resistor 40a is placed between the negative-pole bus 21 of the inverter circuit 20 and the negative electrode of the battery, 3a. Instead, in the fourth embodiment described below, a resistor 40b is placed between the positive-pole bus 22 of the inverter circuit 20 and the positive electrode of the capacitor 30 as shown in FIG. 16.

Figure 16:
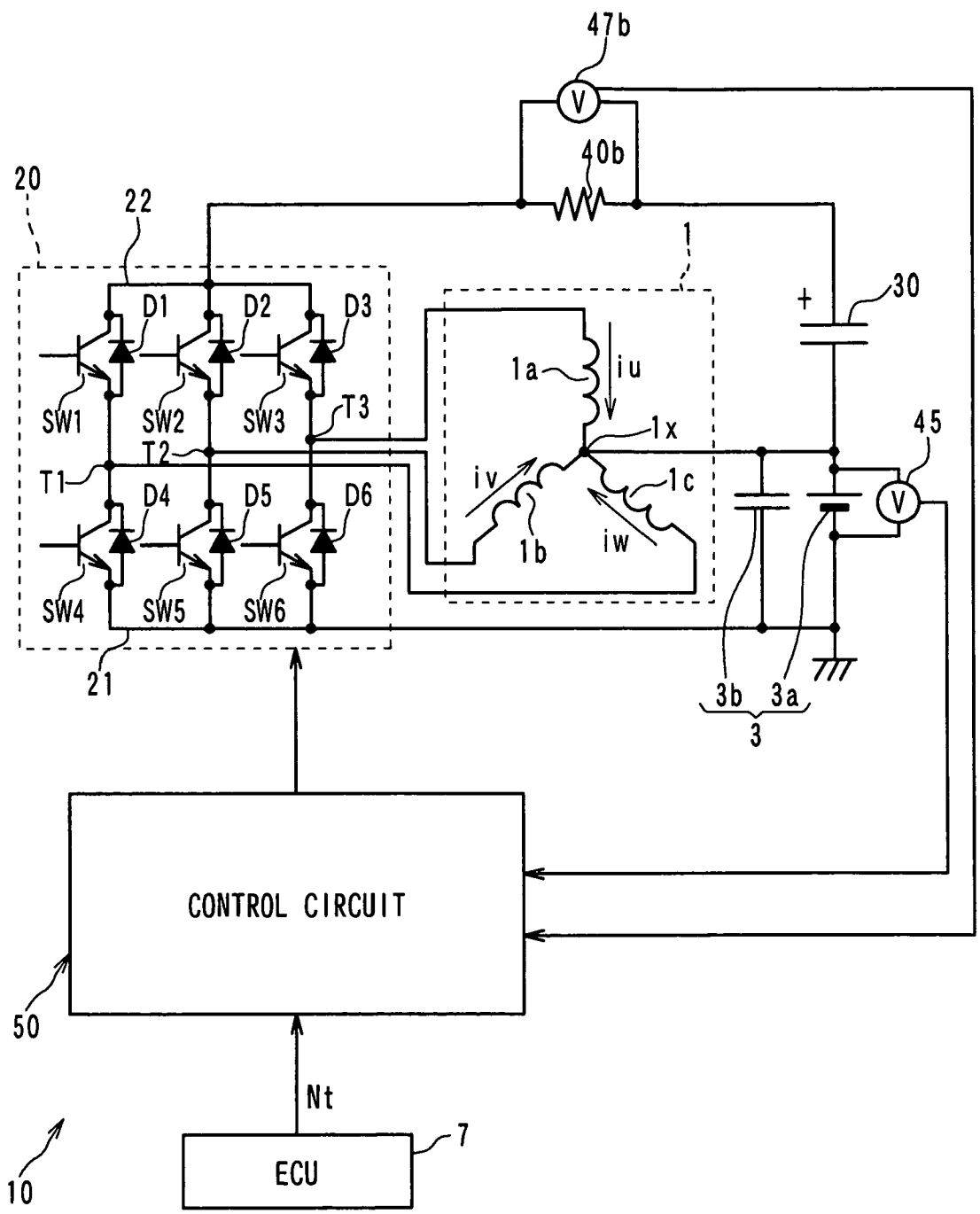
FIG. 16 is a diagram showing the configuration of a driving apparatus in a fourth embodiment according to the present invention.

In FIG. 16, the resistor 40b and a voltage sensor 47b are provided instead of the resistor 40a and the voltage sensor 47a in FIG. 1.

The resistor 40b is placed between the positive-pole bus 22 of the inverter circuit 20 and the positive electrode of the capacitor 30. The voltage sensor 47b detects a potential difference between one terminal and the other terminal of the resistor 40b.

Next, control processing performed by the control circuit 50 in the present embodiment will be described with reference to FIGS. 17 to 20.

Figure 18:
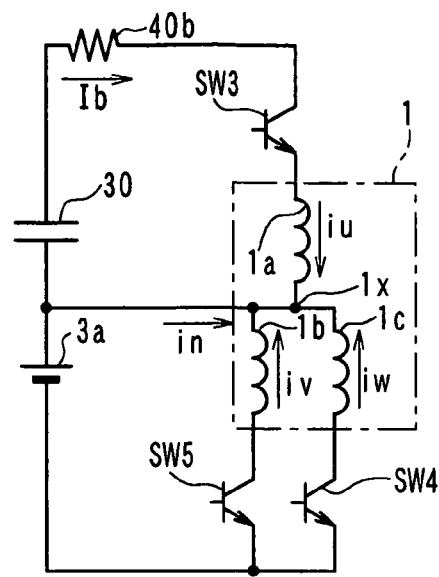
FIG. 18 is a diagram schematically showing an inverter circuit shown in FIG. 16.

FIG. 18 shows a schematic diagram of the inverter circuit 20 when the transistors SW3, SW4 and SW5 are ON among the transistors SW1 to SW6. In FIG. 18, the transistors SW1, SW2, SW6 and the diodes D1 to D6 are not shown.

Figure 19:
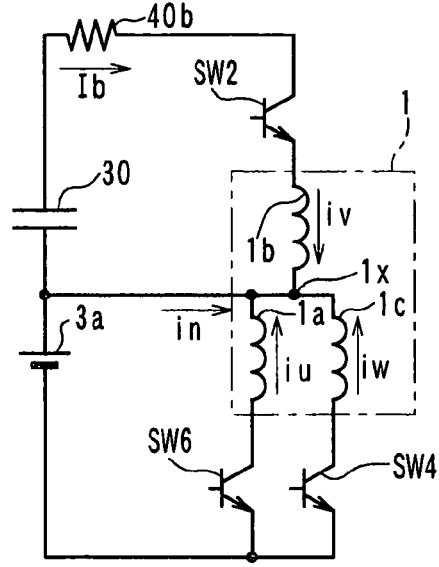
FIG. 19 is a diagram schematically showing the inverter circuit shown in FIG. 16.

FIG. 19 shows a schematic diagram of the inverter circuit 20 when the transistors SW2, SW4 and SW6 are ON among the transistors SW1 to SW6. In FIG. 19, the transistors SW1, SW3, SW5 and the diodes D1 to D6 are not shown.

Figure 20:
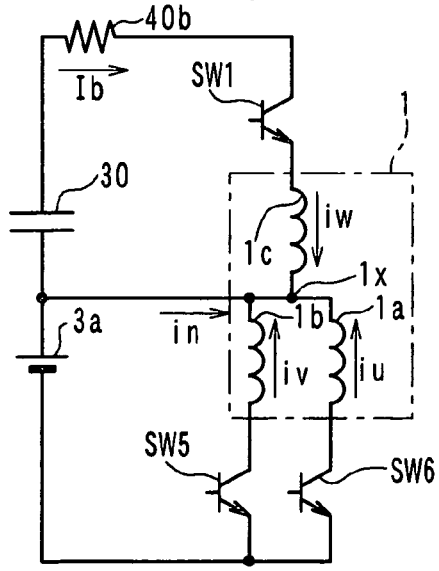
FIG. 20 is a diagram schematically showing the inverter circuit shown in FIG. 16.

FIG. 20 shows a schematic diagram of the inverter circuit 20 when the transistors SW1, SW5 and SW6 are ON among the transistors SW1 to SW6. In FIG. 20, the transistors SW2, SW3, SW4 and the diodes D1 to D6 are not shown. In FIGS. 18, 19 and 20, the direction of the flow of an electric current Ib is defined such that arrows indicate a positive direction.

Figure 17:
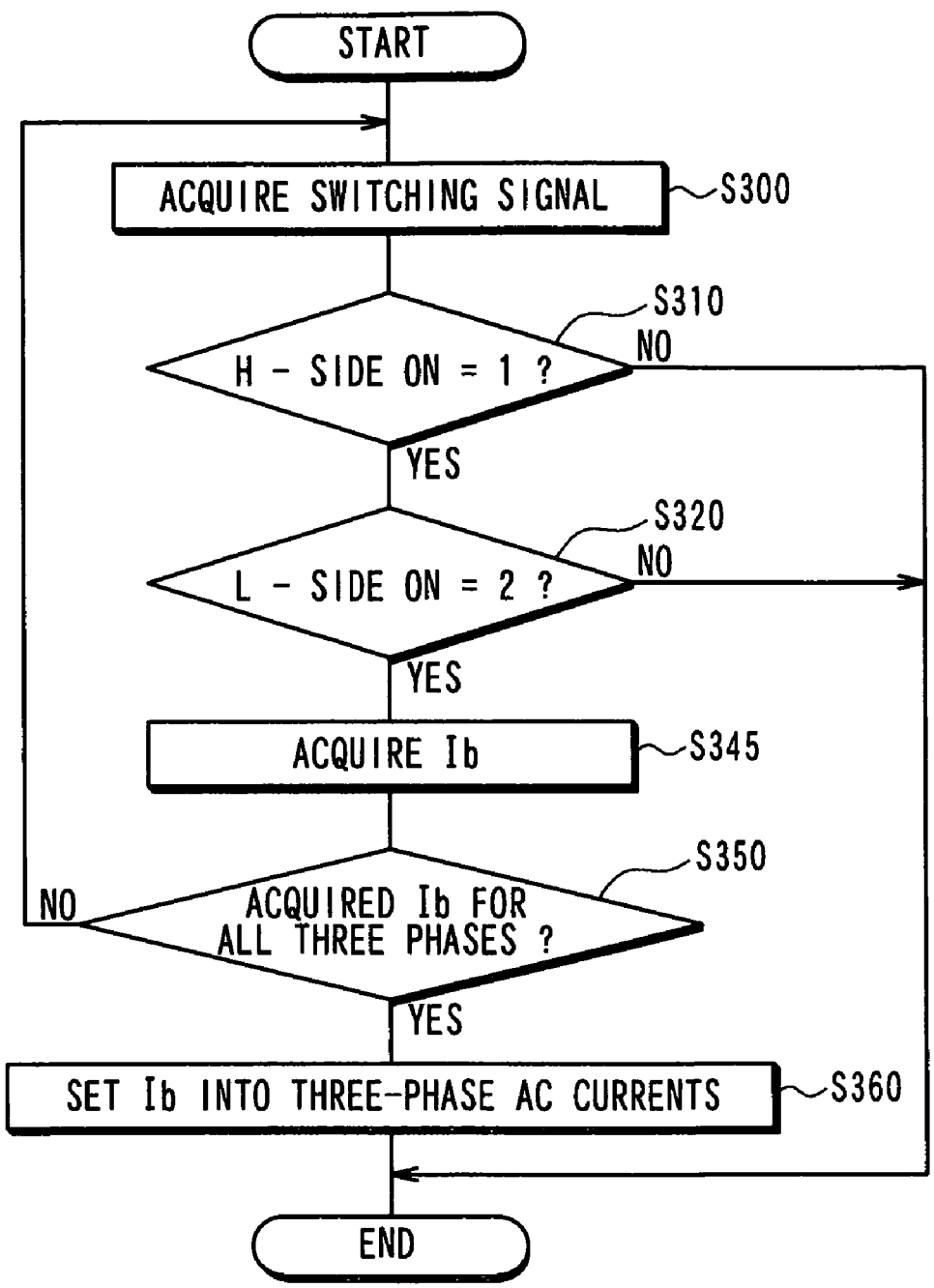
FIG. 17 is a flowchart showing electric current calculation processing performed by a control circuit shown in FIG. 16.

FIG. 17 is a flowchart showing electric current calculation processing performed by the control circuit 50 in the present embodiment. The control circuit 50 performs the electric current calculation processing in accordance with the flowchart of FIG. 17. In FIG. 17, reference numerals identical to those in FIG. 4 represent the same steps and the description thereof is omitted.

At the first step S300, the switching signal is acquired. When the transistors SW3, SW4 and SW5 are ON at this point among the transistors SW1 to SW6, it is determined that the number of ON transistors (denoted as ON number in FIG. 17) among the transistors SW1, SW2 and SW3 (denoted as high-side SWs in FIG. 17) is one and YES is produced at the next step S310.

It is determined that the number of ON transistors (denoted as ON number in FIG. 17) among the transistors SW4, SW5 and SW6 (denoted as lower-side SWs in FIG. 17) is two and YES is produced at the next step S320.

When the transistors SW3, SW4 and SW5 are ON among the transistors SW1 to SW6 (FIG. 18), the control processing proceeds to the next step S345 to acquire the U-phase electric current iu as the value V/R provided by dividing the voltage V detected by the voltage sensor 47b by the resistance value R of the resistor 40b.

Since the electric current Ib as the U-phase electric current iu has been acquired only for the U-phase, it is determined that the electric current Ib has not been acquired for three phases yet and NO is produced at the next step S350.

Then, the processing returns to step S300 to acquire the switching signal. When the transistors SW2, SW4 and SW6 are ON at this point among the transistors SW1 to SW6, it is determined that the number of ON transistors of the transistors SW1, SW2 and SW3 is one and YES is produced at the next step S310. It is determined that the number of ON transistors among the transistors SW4, SW5 and SW6 is two and YES is produced at step S320.

When the transistors SW2, SW4 and SW6 are ON (FIG. 19), the electric current iv as the electric current Ib flows through the resistor 40b. The control processing proceeds to the next step S345 to acquire the V-phase electric current iv as the value V/R provided by dividing the voltage V detected by the voltage sensor 47b by the resistance value R of the resistor 40b.

Since the electric current Ib has been acquired only for the U-phase and the V-phase, it is determined that the electric current Ib has not been acquired for the three phases yet and NO is produced at the next step S350.

Then, the processing returns to step S300 to acquire the switching signal. When the transistors SW1, SW5 and SW6 are ON at this point among the transistors SW1 to SW6, it is determined that the number of ON transistors among the transistors SW1, SW2 and SW3 is two and YES is produced at the next step S310. It is determined that the number of ON transistors among the transistors SW4, SW5 and SW6 is one and YES is produced at the next step S320.

When the transistors SW1, SW5 and SW6 are ON among the transistors SW1 to SW6 (FIG. 20), the electric current iw as the electric current Ib flows through the resistor 40b. The control processing proceeds to the next step S345 to acquire the W-phase electric current iw as the value V/R provided by dividing the voltage V detected by the voltage sensor 47b by the resistance value R of the resistor 40b.

It is determined that the electric current Ib flowing through the resistor 40b has been acquired for the three-phases and YES is produced at the next step S350. The control processing proceeds to the next step S360 to bring the electric currents Ib for the three-phases acquired at the step S345 together into three-phase AC currents iu, iv and iw.

In the present embodiment described above, the control circuit 50 detects the phase electric currents iu, iv and iw as the electric currents Ib flowing through the resistor 40b. Thus, the three-phase AC currents iu, iv and iw are acquired similarly to the first embodiment described above. As a result, the control circuit 50 can control the three-phase AC synchronous motor based on the electric currents iu, iv and iw through the inverter circuit 20.

(Fifth Embodiment)

The fourth embodiment described above is an example, in which the phase electric current is detected for each phase as the electric current Ib flowing through the resistor 40b. Instead, in the fifth embodiment described below, the electric current including the neutral-point electric current in added to the phase electric current is detected for each phase as the electric current Ib flowing through the resistor 40b.

The circuit configuration of the control circuit 50 in the present embodiment is identical to the circuit configuration in the fourth embodiment described above.

Control processing performed by the control circuit 50 in the present embodiment will be described below with reference to FIGS. 21 to 24.

Figure 22:
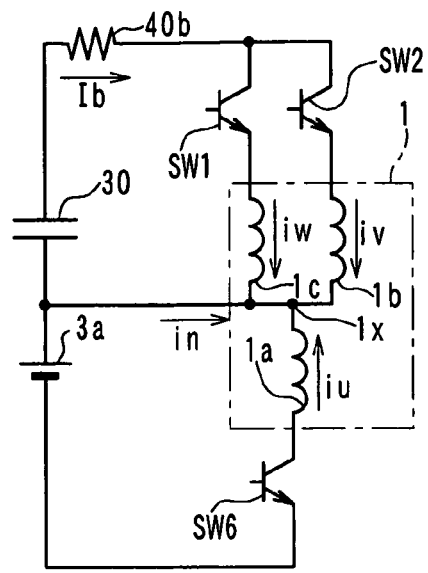
FIG. 22 is a diagram schematically showing an inverter circuit shown in FIG. 21.

FIG. 22 shows a schematic diagram of the inverter circuit 20 when the transistors SW1, SW2 and SW6 are ON among the transistors SW1 to SW6. In FIG. 22, the transistors SW3, SW4, SW5 and the diodes D1 to D6 are not shown.

Figure 23:
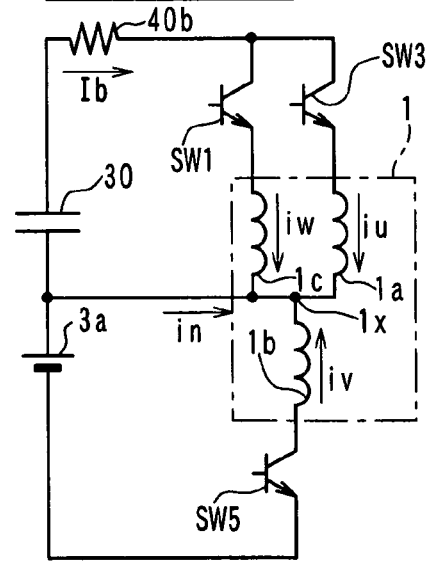
FIG. 23 is a diagram schematically showing the inverter circuit shown in FIG. 21.

FIG. 23 shows a schematic diagram of the inverter circuit 20 when the transistors SW1, SW3 and SW5 are ON among the transistors SW1 to SW6. In FIG. 23, the transistors SW2, SW4, SW6 and the diodes D1 to D6 are not shown.

Figure 24:
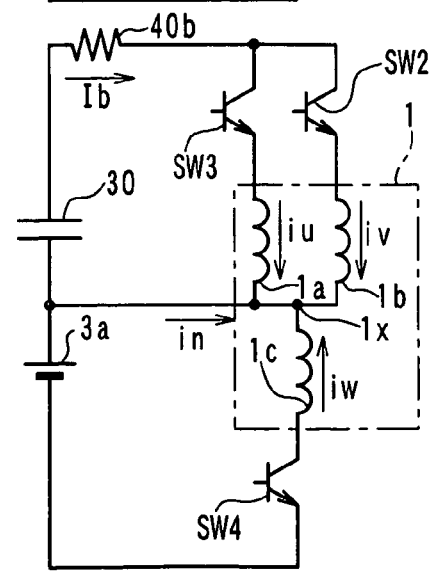
FIG. 24 is a diagram schematically showing the inverter circuit shown in FIG. 21.

FIG. 24 shows a schematic diagram of the inverter circuit 20 when the transistors SW2, SW3 and SW4 are ON among the transistors SW1 to SW6. In FIG. 24, the transistors SW1, SW5, SW6 and the diodes D1 to D6 are not shown. In FIGS. 22, 23 and 24, the direction of the flow of the electric current Ib is defined such that arrows indicate a positive direction.

Figure 21:
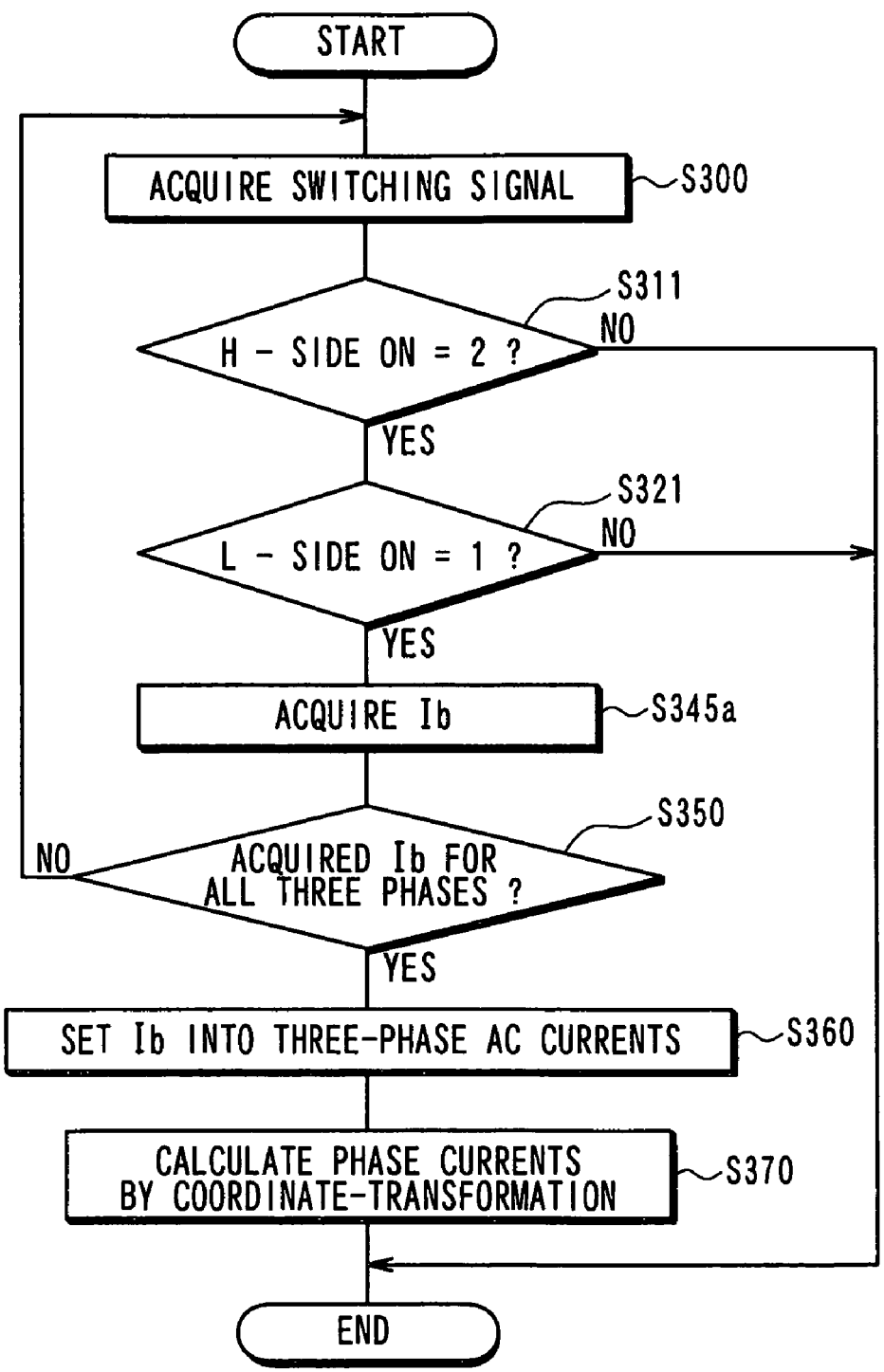
FIG. 21 is a diagram showing the configuration of a driving apparatus in a fifth embodiment according to the present invention.

FIG. 21 is a flowchart showing electric current calculation processing performed by the control circuit 50 in the present embodiment. The control circuit 50 performs the electric current calculation processing in accordance with the flowchart of FIG. 21. In FIG. 21, reference numerals identical to those in FIG. 12 represent the same steps and the description thereof is omitted.

First, at step S300, the switching signal is acquired. When the transistors SW1, SW2 and SW6 are ON among the transistors SW1 to SW6, it is determined that the number of ON transistors (denoted as ON number in FIG. 21) among the transistors SW1, SW2 and SW3 (denoted as high-side SWs in FIG. 21) is two and YES is produced at the next step S311.

It is determined that the number of ON transistors (denoted as ON number in FIG. 21) among the transistors SW4, SW5 and SW6 (denoted as lower-side SWs in FIG. 21) is one and YES is produced at the next step S321.

When the transistors SW1, SW2 and SW6 are ON among the transistors SW1 to SW6 (FIG. 22), the control processing proceeds to the next step S340a to acquire −(in+iu) as the value V/R provided by dividing the voltage V detected by the voltage sensor 47b by the resistance value R of the resistor 40b.

Since the electric current Ib has been acquired only for the U-phase, it is determined that the electric current Ib has not been acquired for three phases yet and NO is produced at the next step S350.

Then, the processing returns to step S300 to acquire the switching signal. When the transistors SW1, SW3 and SW5 are ON at this point among the transistors SW1 to SW6, it is determined that the number of ON transistors among the transistors SW1, SW2 and SW3 is two and YES is produced at the next step S311. It is determined that only the transistor SW5 is ON among the transistors SW4, SW5 and SW6 and that the number of ON transistors among the transistors SW4, SW5 and SW6 is one and YES is produced at step 5321.

When the transistors SW1, SW3 and SW5 are ON among the transistors SW1 to SW6 (FIG. 23), the control processing proceeds to the step S345a to acquire −(in+iv) as the value V/R provided by dividing the voltage V detected by the voltage sensor 47b by the resistance value R of the resistor 40b.

Since the electric current Ib has been acquired only for the U-phase and the V-phase, it is determined that the electric current Ib has not been acquired for the three phases yet and NO is produced at the next step S350.

Then, the processing returns to step S300 to acquire the switching signal. When the transistors SW2, SW3 and SW4 are ON at this point among the transistors SW1 to SW6, it is determined that the number of ON transistors among the transistors SW1, SW2 and SW3 is two and YES is produced at the next step S311. It is determined that the number of ON transistors among the transistors SW4, SW5 and SW6 is one and YES is produced at the next step S321.

When the transistors SW2, SW3 and SW4 are ON among the transistors SW1 to SW6 (FIG. 24), the control processing proceeds to the step S345a to acquire −(in+iw) as the value V/R provided by dividing the voltage V detected by the voltage sensor 47b by the resistance value R of the resistor 40b.

It is determined that the electric current. Ib flowing through the resistor 40b has been acquired for the three-phases and YES is produced at the next step S350. The control processing proceeds to the next step S360 to set the electric currents Ib for the three-phases acquired at the step S340a together into three-phase AC currents of the three-phase fixed coordinate system.

At the next step S370, the three-phase AC current of the three-phase fixed coordinate system is coordinate-transformed to acquire the AC currents iα and iβ of the two-phase fixed coordinate system. In this manner, the AC currents iα and iβ of the two-phase fixed coordinate system excluding the neutral-point electric current in for each phase can be acquired, similarly to the first embodiment described above. In addition, the AC currents iα and iβ of the two-phase fixed coordinate system can be transformed into electric currents of the three-phase fixed coordinate system to acquire electric currents iu, iv and iw excluding the neutral-point electric current in for each phase from the electric currents Ib for the three-phases.

In the present embodiment described above, the control circuit 50 acquires the electric currents Ib flowing through the resistor 40b for the three-phases, brings the electric currents Ib for the three-phases together into the three-phase AC currents of the three-phase fixed coordinate system and coordinate-transforms the three-phase AC currents of the three-phase fixed coordinate system to acquire the three-phase AC currents iu, iv and iw. Furthermore, the control circuit 50 can control the three-phase AC synchronous motor based on the electric currents iu, iv and iw through the inverter circuit 20.

The control circuit 50 may calculate, for each phase, average values of the phase electric currents iu, iv and iw acquired at step S370 in the fifth embodiment described above and the phase electric current iu, iv and iw acquired in the fourth embodiment described above and may use the average values of the phase electric currents to acquire the voltage command wave for each phase.

(Sixth Embodiment)

Next, description will be made with respect to the sixth embodiment, in which the first and the fourth embodiments described above are combined such that the three-phase AC synchronous motor is controlled by using average values of three-phase AC currents detected by the resistor 40a and the voltage sensor 47a and three-phase AC currents detected by the resistor 40b and the voltage sensor 47b.

Figure 25:
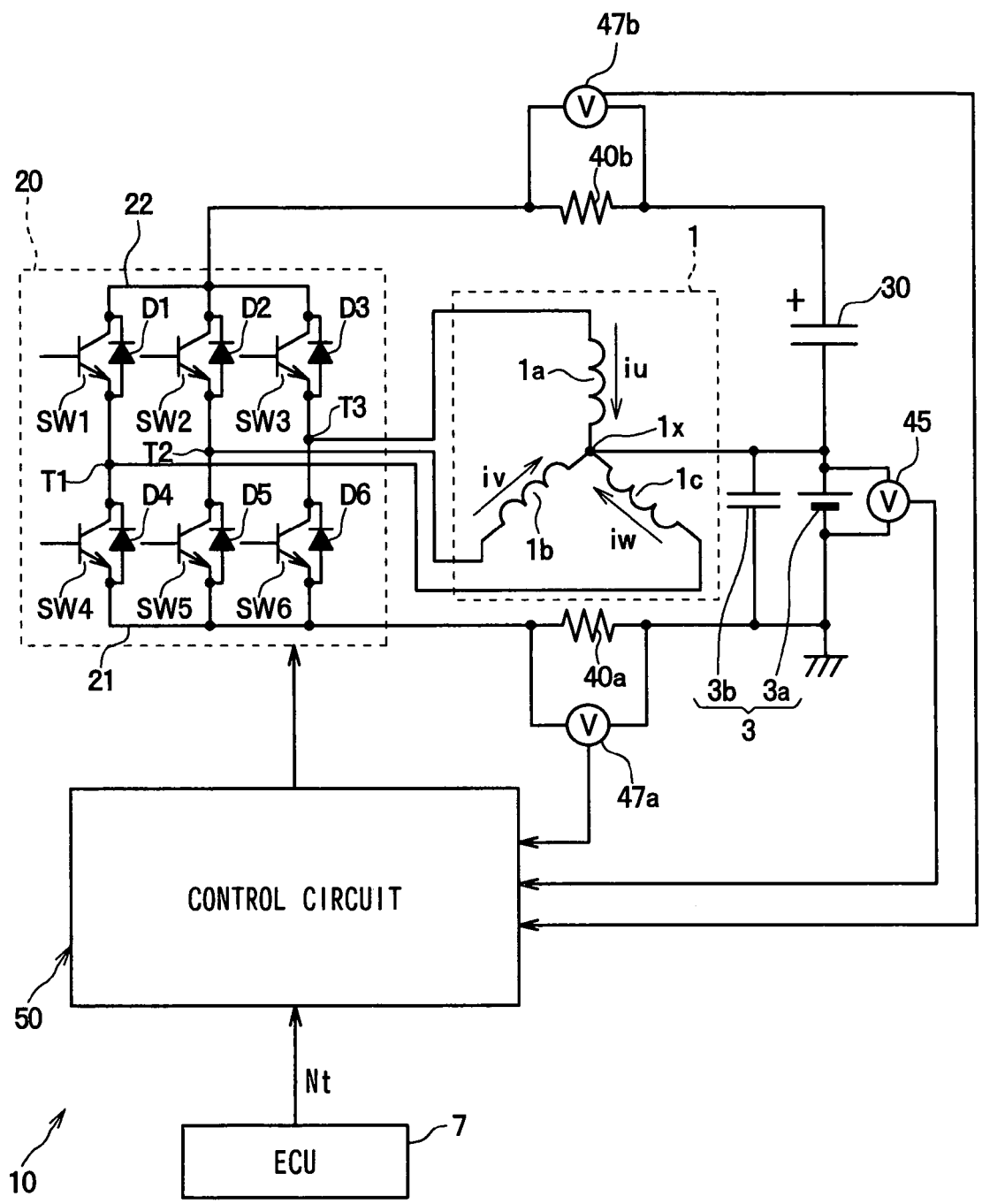
FIG. 25 is a diagram showing the configuration of a driving apparatus in a sixth embodiment according to the present invention.

FIG. 25 shows the circuit configuration of the driving apparatus 10 according to the sixth embodiment. FIG. 25 shows the configuration, in which the resistor 40b and the voltage sensor 47b are added to the circuit configuration shown in FIG. 1.

The resistor 40b is placed between the positive-pole bus 22 of the inverter circuit 20 and the positive electrode of the capacitor 30 similarly to theourth embodiment described above. The voltage sensor 47b detects a potential difference between one terminal and the other terminal of the resistor 40b similarly to the fourth embodiment described above.

Next, control processing performed by the control circuit 50 in the present embodiment will be described below with reference to FIGS. 26 to 29.

Figure 27:
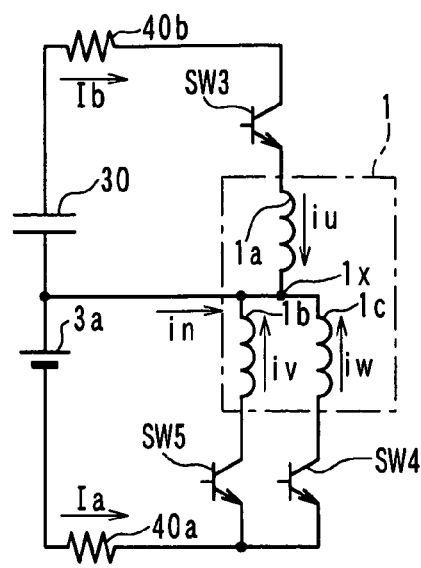
FIG. 27 is a diagram schematically showing an inverter circuit shown in FIG. 25.

FIG. 27 shows a schematic diagram of the inverter circuit 20 when transistors SW3, SW4 and SW5 are ON among the transistors SW1 to SW6 and also shows the stator coil 1.

Figure 28:
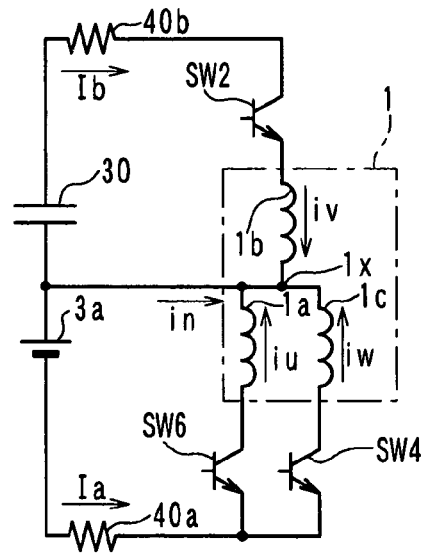
FIG. 28 is a diagram schematically showing the inverter circuit shown in FIG. 25.

FIG. 28 shows a schematic diagram of the inverter circuit 20 when the transistors SW2, SW4 and SW6 are ON among the transistors SW1 to SW6 and also shows the stator coil 1.

Figure 29:
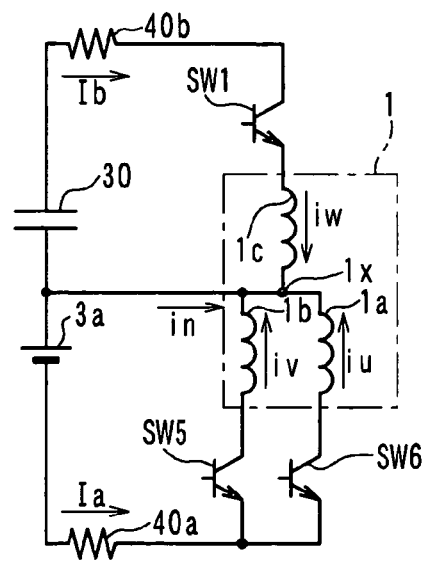
FIG. 29 is a diagram schematically showing the inverter circuit shown in FIG. 25.

FIG. 29 shows a schematic diagram of the inverter circuit 20 when the transistors SW1, SW5 and SW6 are ON among the transistors SW1 to SW6 and also shows the stator coil 1.

Figure 26:
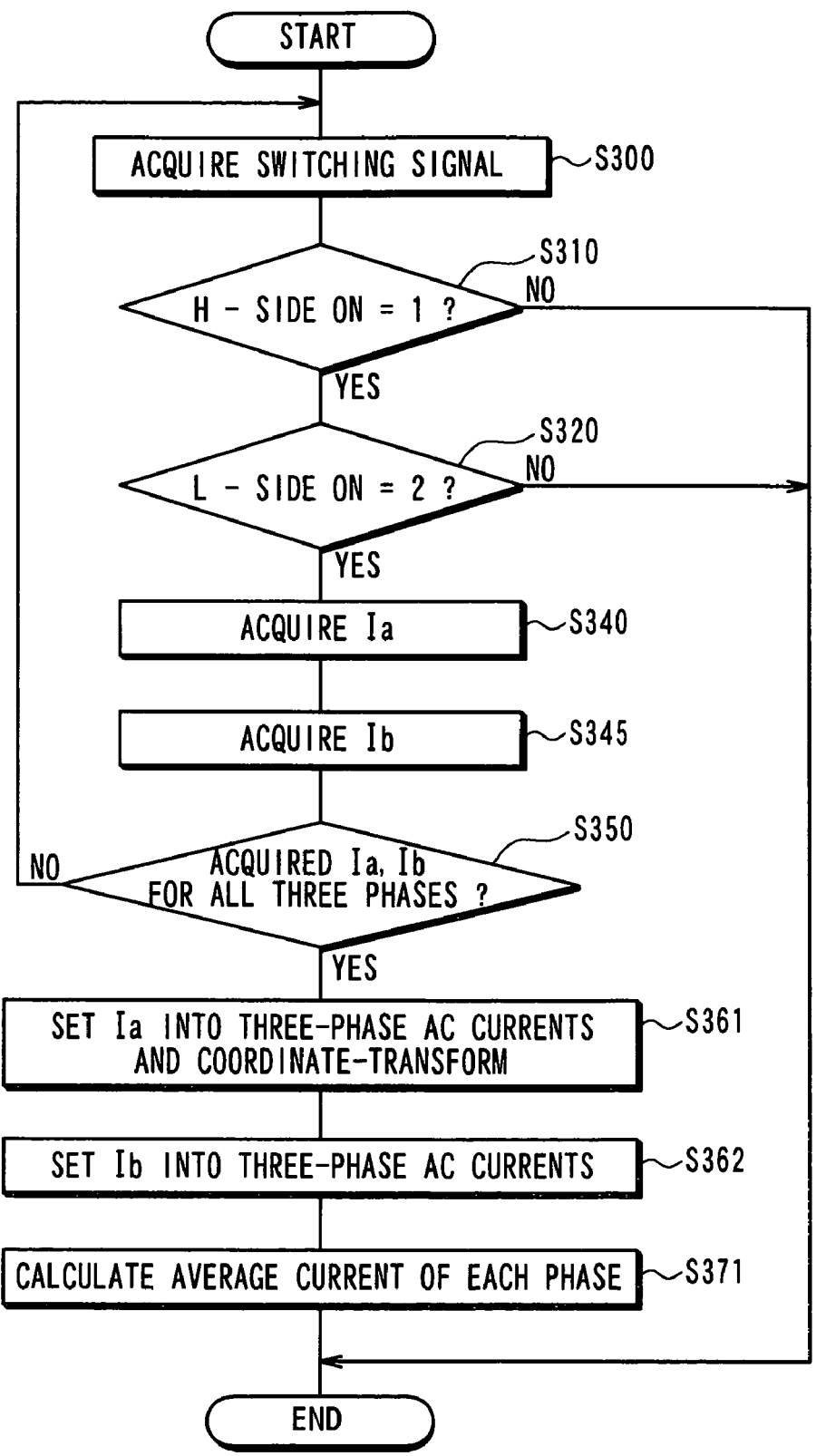
FIG. 26 is a flowchart showing electric current calculation processing performed by a control circuit shown in FIG. 25.

FIG. 26 is a flowchart showing electric current calculation processing performed by the control circuit 50 in the present embodiment. The control circuit 50 performs the electric current calculation processing in accordance with the flowchart of FIG. 26. In FIG. 26, reference numerals identical to those in FIG. 4 represent the same steps and the description thereof is omitted.

First, at step S300, the switching signal is acquired. When the transistors SW3, SW4 and SW5 are ON at this point among the transistors SW1 to SW6, it is determined that the number of ON transistors (denoted as ON number in FIG. 26) among the transistors SW1, SW2 and SW3 (denoted as high-side SWs in FIG. 26) is one and YES is produced at the next step S310.

It is determined that the number of ON transistors (denoted as ON number in FIG. 26) among the transistors SW4, SW5 and SW6 (denoted as lower-side SWs in FIG. 26) is two and YES is produced at the next step S320.

When the transistors SW3, SW4 and SW5 are ON among the transistors SW1 to SW6 (FIG. 27), the electric current Ia is acquired as −(in+iu) at step S340. The electric current Ia is equal to the value V/R provided by dividing the voltage V detected by the voltage sensor 47a by the resistance value R of the resistor 40a.

In addition, the electric current Ib is acquired as the U-phase electric current iu at step S345. The electric current Ib is equal to the value V/R provided by dividing the voltage V detected by the voltage sensor 47b by the resistance value R of the resistor 40b.

Since the electric current Ia and Ib have been acquired only for the U-phase, it is determined that the electric current Ia and Ib have not been acquired for three phases yet and NO is produced at the next step S350.

Thereafter, the processing at step S300, the YES determination at step S310, the YES determination at step S320 and the processing at steps S340 and S345 are repeated until the electric current Ia and Ib have been acquired for the three phases and thus YES is produced at step S350.

When the transistors SW2, SW4 and SW6 are ON among the transistors SW1 to SW6 (FIG. 28), the electric current Ia is acquired as the electric current (in+iv) at step S340. In addition, the electric current Ib is acquired as the V-phase electric current iv at step S345.

When the transistors SW1, SW5 and SW6 are ON among the transistors SW1 to SW6 as shown in FIG. 29, the electric current Ia is acquired as the electric current (in+iw) at step S340. In addition, the electric current Ib is acquired as the W-phase electric current iw at step S345.

When the electric current Ia flowing through the resistor 40a and the electric current Ib have been acquired for the three phases and YES is produced at step S350, the control processing proceeds to the next step S361. Similarly to the first embodiment described above, the electric current Ia for the three-phases acquired at the step S340 are set together into three-phase AC currents iva, iva and iwa of the three-phase fixed coordinate system and the three-phase AC currents iva, iva and iwa are coordinate-transformed to provide three-phase AC currents iu, iv and iw excluding neutral-point electric current in for each phase from the electric currents iva, iva and iwa.

At the next step S362, the electric currents Ib for the three-phases acquired at the step S345 are set together into three-phase AC currents iu, iv and iw of the three-phase fixed coordinate system.

At the next step S371, the control circuit 50 calculates, for each phase, average values of the phase electric currents iu, iv and iw acquired at step S361 and the phase electric currents iu, iv and iw acquired at step S362.

The control circuit 50 uses the calculated average values of the phase electric currents to acquire the voltage command wave for each phase. The control circuit 50 uses the voltage command wave for each phase to acquire the switching signal similarly to the first embodiment described above. Then, the switching signals are output to the inverter circuit 20 to perform the switching operation of the transistors SW1 to SW6.

In the present embodiment described above, the control circuit 50 calculates the average values of the three-phase AC currents acquired by using the electric current Ia flowing through the resistor 40a and the three-phase AC currents acquired by using the electric current Ib flowing through the resistor 40b. The circuit 50 uses the calculated average values to acquire the voltage command wave for each phase. The circuit 50 uses the voltage command wave for each phase to acquire the switching signal and outputs the acquired switching signal to the inverter circuit 20. Thus, the three-phase AC synchronous motor can be controlled through the inverter circuit 20 based on the average values.

The sixth embodiment described above is an example, in which the three-phase AC currents iva, iva and iwa of the three-phase fixed coordinate system are coordinate-transformed to acquire the three-phase AC currents iu, iv and iw. Instead, similarly to the second embodiment described above, a resistor may be connected between the neutral point 1x of the stator coil 1 and the positive electrode of the battery 3a, the neutral-point electric current in flowing through the resistor may be detected and the detected neutral-point electric current in may be used to exclude the neutral-point electric current in from the three-phase AC currents iva, iva and iwa.

(Seventh Embodiment)

Next, the seventh embodiment will be described in which average values of phase electric currents are calculated on the basis of the electric current Ia flowing through the resistor 40a and the electric current Ib flowing through the resistor 40b at the time when two of transistors SW1, SW2 and SW3 are ON and one of transistors SW4, SW5 and SW6 is ON.

The circuit configuration of a control circuit 50 in the present embodiment is identical to the circuit configuration of the control circuit 50 in the sixth embodiment described above.

Next, control processing performed by the control circuit 50 in the present embodiment will be described with reference to FIGS. 30 to 33.

Figure 31:
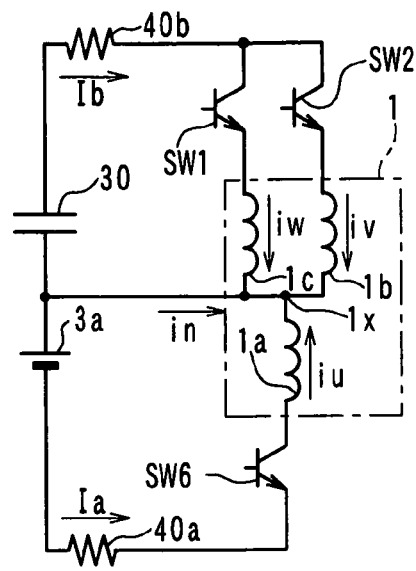
FIG. 31 is a diagram schematically showing an inverter circuit shown in FIG. 30.
Figure 32:
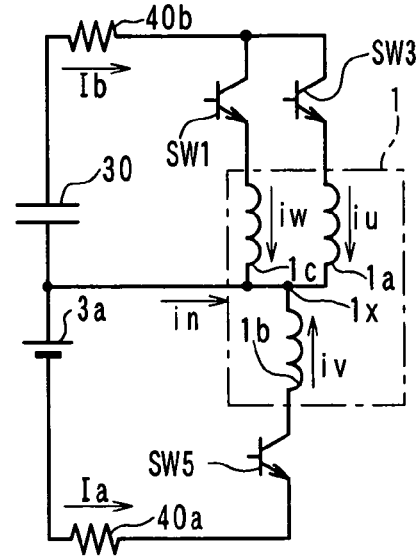
FIG. 32 is a diagram schematically showing the inverter circuit shown in FIG. 30.
Figure 33:
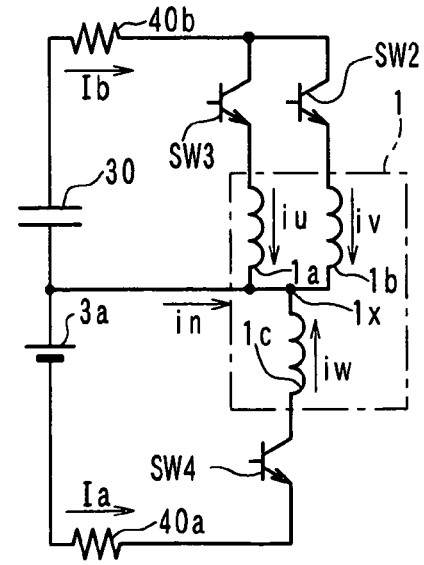
FIG. 33 is a diagram schematically showing the inverter circuit shown in FIG. 30.

FIG. 31 shows a schematic diagram of the inverter circuit 20 when transistors SW1, SW2 and SW6 are ON among the transistors SW1 to SW6. FIG. 32 shows a schematic diagram of the inverter circuit 20 when the transistors SW1, SW3 and SW5 are ON. FIG. 33 shows a schematic diagram of the inverter circuit 20 when the transistors SW2, SW3 and SW4 are ON.

Figure 30:
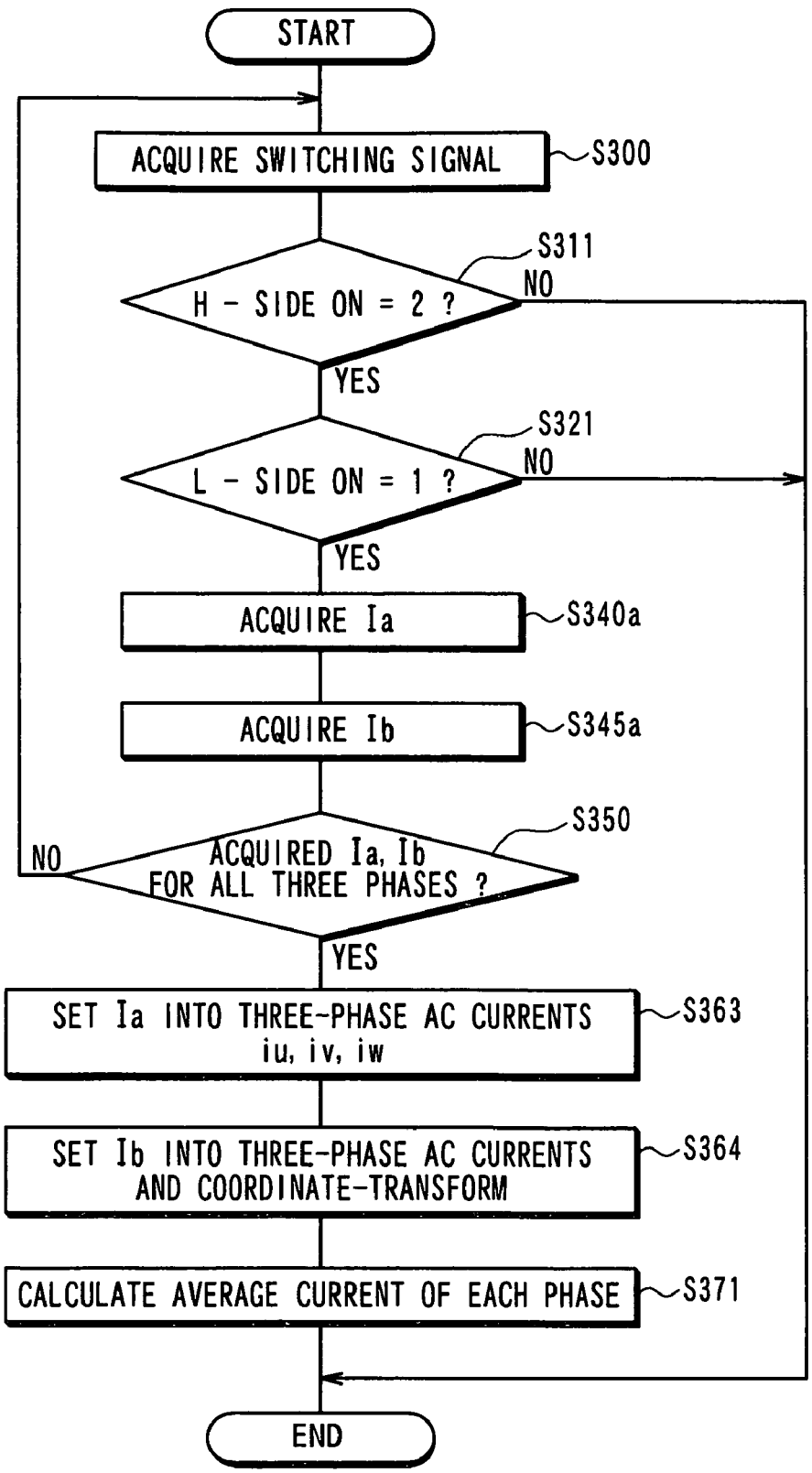
FIG. 30 is a diagram showing the configuration of a driving apparatus in a seventh embodiment according to the present invention.

FIG. 30 is a flowchart showing electric current calculation processing performed by the control circuit 50 in the present embodiment. The control circuit 50 performs the electric current calculation processing in accordance with the flowchart of FIG. 30. In FIG. 30, reference numerals identical to those in FIG. 12 represent the same steps and the description thereof is omitted.

First, at step S300, the switching signal is acquired. When the transistors SW1, SW2 and SW6 are ON at this point among the transistors SW1 to SW6, it is determined that the number of ON transistors (denoted as ON number in FIG. 30) among the transistors SW1, SW2 and SW3 (denoted as high-side SWs in FIG. 30) is two and YES is produced at the next step S311.

It is determined that the number of ON transistors (denoted as ON number in FIG. 30) among the transistors SW4, SW5 and SW6 (denoted as lower-side SWs in FIG. 30) is one and YES is produced at the next step S321.

When the transistors SW1, SW2 and SW6 are ON among the transistors SW1 to SW6 (FIG. 31), an electric current Ia is acquired as a U-phase electric current iu at step 340a. The electric current Ia is equal to a value V/R provided by dividing the voltage V detected by the voltage sensor 47a by the resistance value R of the resistor 40a.

At the next step S345a, the electric current Ib is acquired as the electric current (in+iu). The electric current Ib is equal to the value V/R provided by dividing the voltage V detected by the voltage sensor 47b by the resistance value R of the resistor 40b. Since the electric current Ia and Ib have been acquired only for the U-phase, it is determined that the electric current Ia and Ib have not been acquired for three phases yet and NO is produced at the next step S350.

Thereafter, the processing at step S300, the YES determination at step S311 and step S321 and the processing at steps S340a and S345a are repeated until the electric current Ia and Ib have been acquired for the three-phases and thus YES is produced at step S350. When the transistors SW1, SW3 and SW5 are ON among the transistors SW1 to SW6 (FIG. 32), the electric current Ia is acquired as the V-phase electric current iv at step S340a.

At the next step S345a, the electric current Ib is acquired as the electric current (iu+iw).

When the transistors SW2, SW3 and SW4 are ON among the transistors SW1 to SW6 (FIG. 33), the control processing proceeds to step S340a to acquire the electric current Ia as the W-phase electric current iw. At the next step S234a, the electric current Ib is acquired as the electric current (in+iw).

It is determined that the electric current Ia and Ib flowing through the resistor 40a have been acquired for the three-phases and YES is produced at the next step S350. The control circuit 50 then proceeds to the next step S363 to bring the electric current Ia for the three-phases acquired at the step S340 together into three-phase AC currents iu, iv and iw of the three-phase fixed coordinate system.

At the next step S364, similarly to the fifth embodiment described above, the control circuit 50 brings the electric currents Ib for the three-phases acquired at the step S345a together into three-phase AC currents iva, iva and iwa of the three-phase fixed coordinate system and coordinate-transforms the three-phase AC currents iva, iva and iwa to acquire three-phase AC currents iu, iv and iw excluding the neutral-paint electric current in for each phase from the electric currents iva, iva and iwa.

At the next step S371, the control circuit 50 calculates, for each phase, average values of the three-phase AC currents iu, iv and iw acquired at the step S363 and the three-phase AC currents iu, iv and iw acquired at the step S364.

Specifically, the control circuit 50 calculates, for each phase, the average values of the three-phase AC currents iu, iv and iw acquired on the basis of the electric current Ia flowing through the resistor 40a and the three-phase AC currents iu, iv and iw acquired on the basis of the electric currents Ib flowing through the resistor 40b. Then, the control circuit 50 uses the calculated average to acquire the voltage command wave for each phase. The control circuit 50 uses the voltage command wave to acquire the switching signal and outputs the switching signal to the inverter circuit 20 to perform switching operation of the transistors SW1 to SW6.

In the present embodiment described above, the control circuit 50 can control the three-phase AC synchronous motor through the inverter circuit 20 by using the average values of the three-phase AC currents iu, iv and iw acquired on the basis of the electric current Ia flowing through the resistor 40a and the three-phase AC currents iu, iv and iw acquired on the basis of the electric currents Ib flowing through the resistor 40b, similarly to the sixth embodiment described above.

Alternatively, the control circuit 50 may prepare the two three-phase AC currents acquired by using the resistors 40a and 40b in the sixth embodiment described above and the two three-phase AC currents acquired by using the resistors 40a and 40b in the seventh embodiment described above, may calculate the average values for each phase of the prepared four three-phase AC currents and may use the calculated average value for each phase to control the three-phase AC synchronous motor through the inverter circuit 20.

(Eighth Embodiment)

The first embodiment described above is an example, in which the battery 3a is connected between the negative-pole bus 21 and the neutral point 1x of the stator coil 1. Instead, in the eighth embodiment described below, the DC power source 3 is connected between the positive-pole bus 22 and the neutral point 1x of the stator coil 1.

Figure 34:
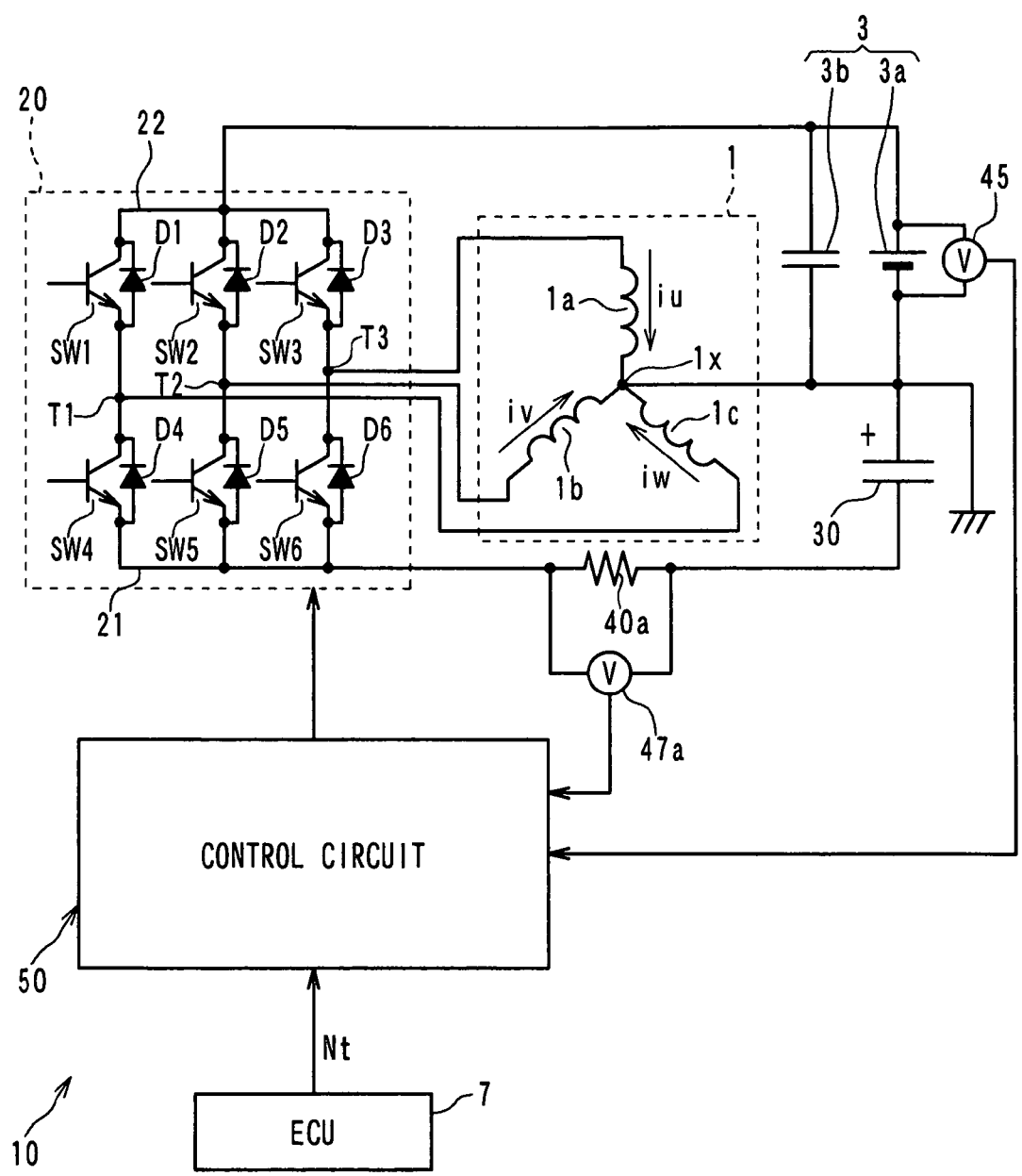
FIG. 34 is a diagram showing the configuration of a driving apparatus in an eighth embodiment according to the present invention.

FIG. 34 shows the circuit configuration of the driving apparatus 10 according to the present embodiment. The driving apparatus 10 of the present embodiment has the same circuit configuration as that in FIG. 1 except for the placement of the DC power source 3 and the capacitor 30.

The DC power source 3 of the present embodiment is connected between the positive-pole bus 22 and the neutral point 1x of the stator coil 1. The capacitor 30 is connected between the negative-pole bus 21 and the neutral point 1x of the stator coil 1.

Next, the operation in the present embodiment will be described.

The control circuit 50 of the present embodiment performs the electric current calculation processing in accordance with the flowchart of FIG. 4, similarly to the first embodiment described above. Thus, the outline of the electric current calculation processing performed by the control circuit 50 will be described below with reference to FIGS. 35 to 37.

Figure 35:
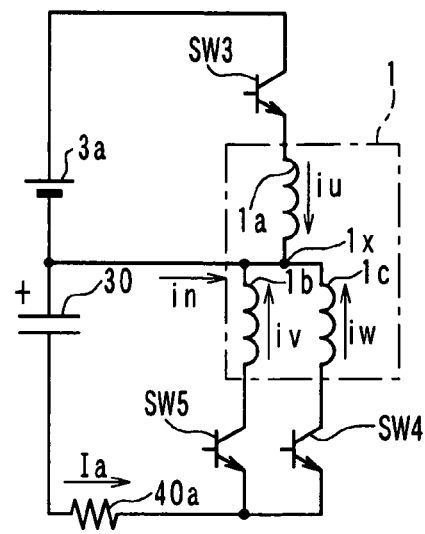
FIG. 35 is a diagram schematically showing an inverter circuit shown in FIG. 34.
Figure 36:
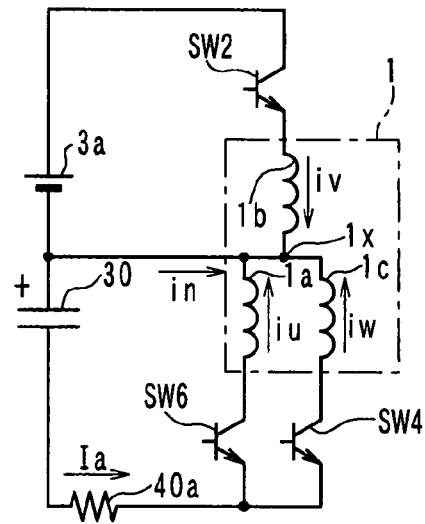
FIG. 36 is a diagram schematically showing the inverter circuit shown in FIG. 34.
Figure 37:
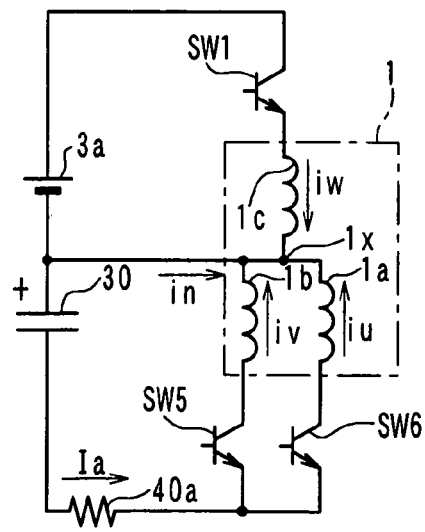
FIG. 37 is a diagram schematically showing the inverter circuit shown in FIG. 34.

FIG. 35 shows a schematic diagram of the inverter circuit 20 when the transistors SW3, SW4 and SW5 are ON. FIG. 36 shows a schematic diagram of the inverter circuit 20 when the transistors SW2, SW4 and SW6 are ON. FIG. 37 shows a schematic diagram of the inverter circuit 20 when the transistors SW1, SW5 and SW6 are ON.

First, when the transistors SW3, SW4 and SW5 are ON among the transistors SW1 to SW6 (FIG. 35), the electric current Ia is acquired as (in+iu).

Next, when the transistors SW2, SW4 and SW6 are ON among the transistors SW1 to SW6 (FIG. 36), the electric current Ia is acquired as (in+iv).

Next, when the transistors SW1, SW5 and SW6 are ON among the transistors SW1 to SW6 (FIG. 37), the electric current Ia is acquired as (in+iw).

The currents (in+iu), (in+iv) and (in+iw) thus acquired are set together into the three-phase AC currents of the three-phase fixed coordinate system. In addition, similarly to the first embodiment described above, the three-phase AC currents of the three-phase fixed coordinate system are coordinate-transformed to acquire three-phase AC currents iu, iv and iw excluding the neutral-point electric current in for each phase and the three-phase AC synchronous motor is controlled through the inverter circuit 20 based on the three-phase AC currents, currents iu, iv and iw.

The eighth embodiment is an example, in which the three-phase AC currents iva, iva and iwa of the three-phase fixed coordinate system containing the electric currents flowing through the neutral point 1x are coordinate-transformed to acquire the three-phase AC currents iu, iv and iw. Instead, a resistor may be connected between the neutral point 1x of the stator coil 1 and the positive electrode of the battery 3a, the neutral-point electric current in flowing through the resistor may be detected and the detected neutral-point electric current in may be used to exclude the neutral-point electric current in from the three-phase AC currents iva, iva and iwa, similarly to the second embodiment.

(Ninth Embodiment)

The eighth embodiment described above is an example, in which the electric current including the neutral-point electric current in added to the phase electric current is detected for each phase as the electric current Ia flowing through the resistor 40a. Instead, in the ninth embodiment described below, the phase electric current is detected as the electric current Ia flowing through the resistor 40a.

The circuit configuration of the driving apparatus 10 of the present embodiment is identical to the circuit configuration of the driving apparatus 10 in the eighth embodiment described above.

Next, the operation in the present embodiment will be described.

The control circuit 50 of the present embodiment performs the electric current calculation processing in accordance with the flowchart of FIG. 12, similarly to the third embodiment described above. Thus, the outline of the electric current calculation processing performed by the control circuit 50 will be described below with reference to FIGS. 38 to 40.

Figure 38:
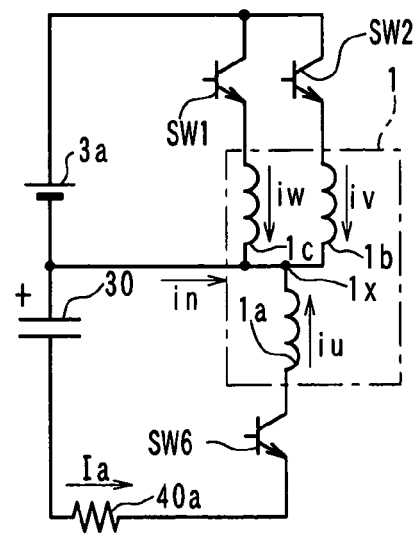
FIG. 38 is a diagram showing the configuration of an inverter circuit in a ninth embodiment according to the present invention.
Figure 39:
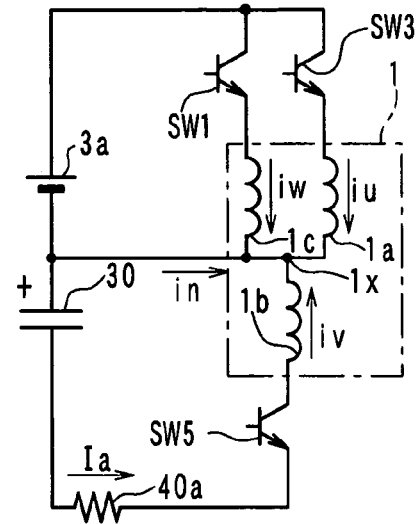
FIG. 39 is a diagram schematically showing the inverter circuit shown in FIG. 38.
Figure 40:
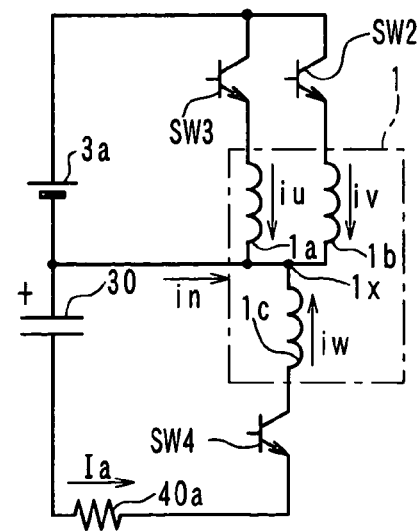
FIG. 40 is a diagram schematically showing the inverter circuit shown in FIG. 38.

FIG. 38 shows a schematic diagram of the inverter circuit 20 when the transistors SW1, SW2 and SW6 are ON. FIG. 39 shows a schematic diagram of the inverter circuit 20 when the transistors SW1, SW3 and SW5 are ON. FIG. 40 shows a schematic diagram of the inverter circuit 20 when the transistors SW2, SW3 and SW4 are ON First, when the transistors SW1, SW2 and SW6 are ON among the transistors SW1 to SW6 (FIG. 38), the electric current Ia is acquired as the U-phase electric current iu.

Next, when the transistors SW1, SW3 and SW5 are ON among the transistors SW1 to SW6 (FIG. 39), the electric current Ia is acquired as the V-phase electric current iv.

Next, when the transistors SW2, SW3 and SW4 are ON among the transistors SW1 to SW6 (FIG. 40), the electric current Ia is acquired as the W-phase electric current iw.

The electric currents Ia thus acquired are set together into three-phase AC currents iu, iv and iw. Thus, similarly to the third embodiment described above, the three-phase AC currents iu, iv and iw can be acquired and the three-phase AC synchronous motor can be controlled through the inverter circuit 20 based on the three-phase AC currents iu, iv and iw.

The control circuit 50 may calculate, for each phase, average values of the phase electric currents iu, iv and iw acquired in the ninth embodiment described above and the phase electric currents iu, iv and iw acquired in the eighth embodiment described above and may use the average values of the phase electric currents to drive the three-phase AC synchronous motor through the inverter circuit 20.

(Tenth Embodiment)

The eighth embodiment described above is an example, in which the resistor 40a is connected between the negative-pole bus 21 and the negative electrode of the capacitor 30. Instead, in the tenth embodiment shown in FIG. 1 and described below, the resistor 40b is connected between the positive-pole bus 22 and the positive electrode of the battery 3a.

Figure 41:
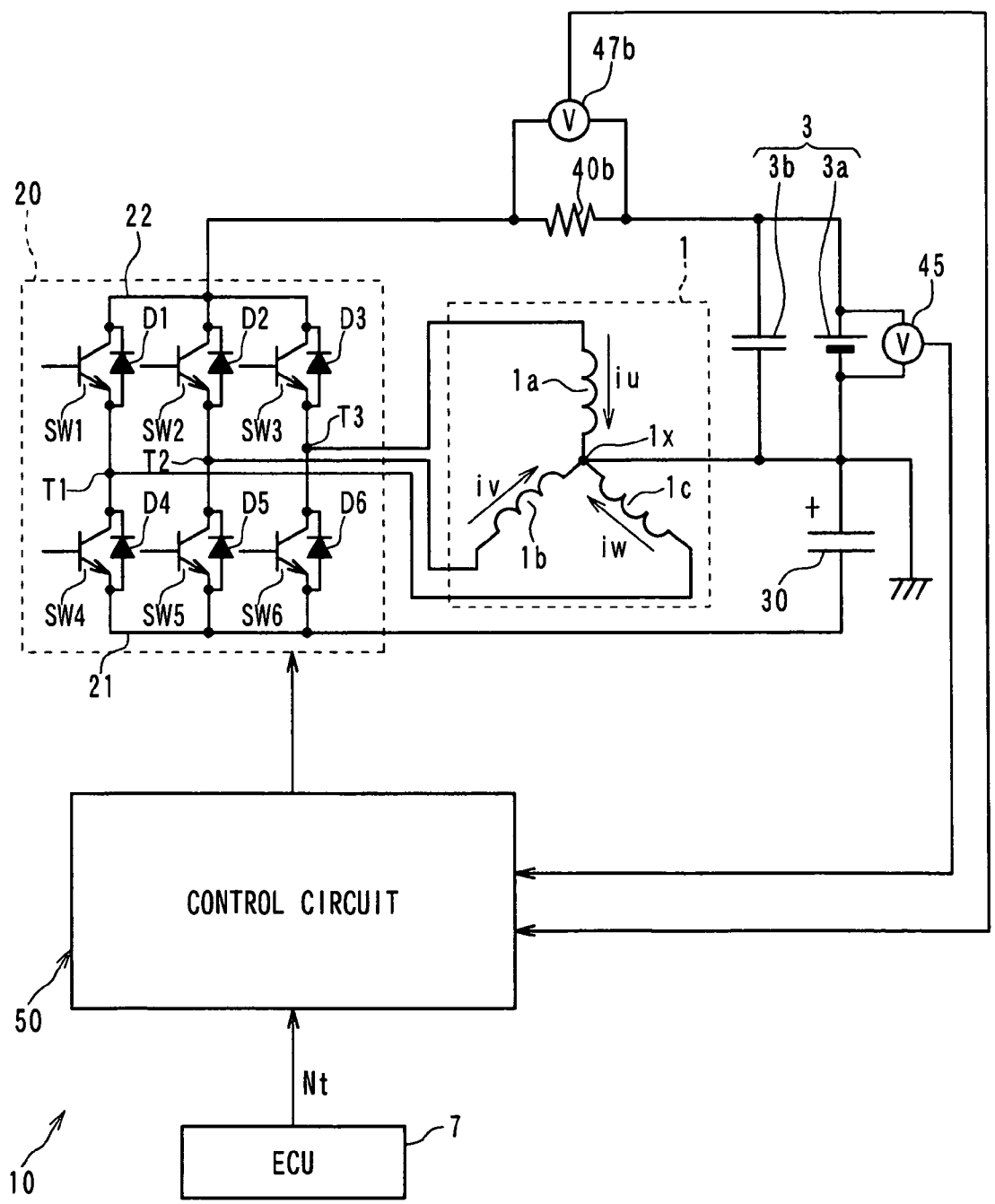
FIG. 41 is a diagram showing the configuration of a driving apparatus in a tenth embodiment according to the present invention.

FIG. 41 shows the configuration in which the resistor 40b instead of the resistor 40a and the voltage sensor 47b instead of the voltage sensor 47a are included in the circuit configuration shown in FIG. 34.

Next, the operation in the present embodiment will be described.

The control circuit 50 of the present embodiment performs the electric current calculation processing in accordance with the flowchart of FIG. 17, similarly to the fourth embodiment described above. Thus, the outline of the electric current calculation processing performed by the control circuit 50 will be described below with reference to FIGS. 42 to 44.

Figure 42:
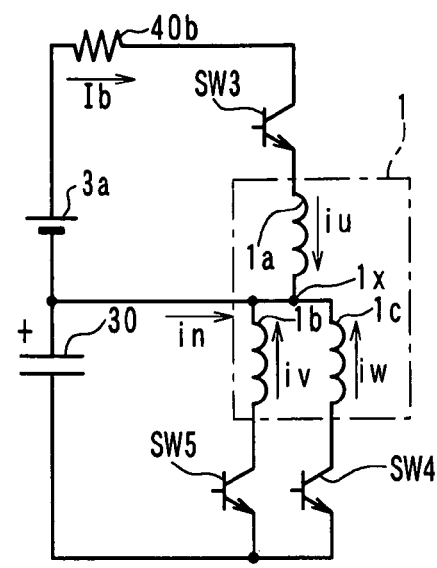
FIG. 42 is a diagram schematically showing an inverter circuit shown in FIG. 41.
Figure 43:
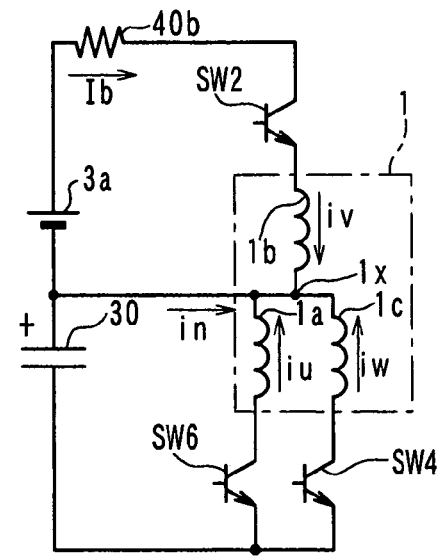
FIG. 43 is a diagram schematically showing the inverter circuit shown in FIG. 41.
Figure 44:
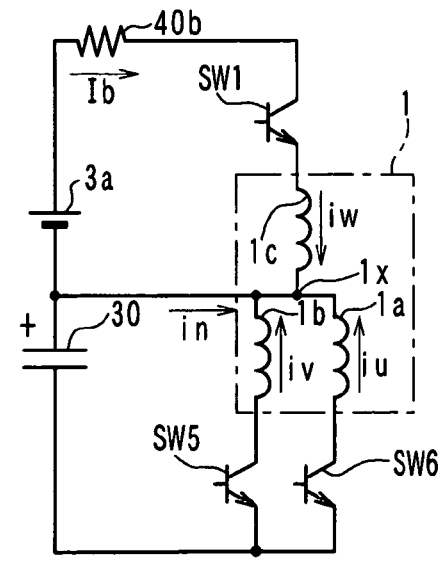
FIG. 44 is a diagram schematically showing the inverter circuit shown in FIG. 41.

FIG. 42 shows a schematic diagram of the inverter circuit 20 when transistors SW3, SW4 and SW5 are ON. FIG. 43 shows a schematic diagram of the inverter circuit 20 when the transistors SW2, SW4 and SW6 are ON. FIG. 44 shows a schematic diagram of the inverter circuit 20 when the transistors SW1, SW5 and SW6 are ON.

First, when the transistors SW3, SW4 and SW5 are ON among the transistors SW1 to SW6 (FIG. 42), the electric current Ib is acquired as the U-phase electric current iu.

Next, when the transistors SW2, SW4 and SW6 are ON among the transistors SW1 to SW6 (FIG. 43), the electric current Ib is acquired as the V-phase electric current iv.

Next, when the transistors SW1, SW5 and SW6 are ON among the transistors SW1 to SW6 (FIG. 44), the electric current Ib is acquired as the W-phase electric current iw.

The U-phase electric current iu, the V-phase electric current iv and the W-phase electric current iw thus acquired are set together into three-phase AC currents iu, iv and iw. Thus, similarly to the fourth embodiment described above, the three-phase AC synchronous motor can be controlled through the inverter circuit 20 based on the three-phase AC currents iu, iv and iw.

(Eleventh Embodiment)

The tenth embodiment described above is an example, in which the phase electric current is detected for each phase as the electric current Ib flowing through the resistor 40b. Instead, in the eleventh embodiment described below, the electric current including the neutral-point electric current in added to the phase electric current is detected for each phase as the electric current Ib flowing through the resistor 40b.

The circuit configuration of the driving apparatus 10 of the present embodiment is identical to the circuit configuration of the driving apparatus 10 in the tenth embodiment described above.

Next, the operation in the present embodiment will be described.

The control circuit 50 of the present embodiment performs the electric current calculation processing in accordance with the flowchart of FIG. 21, similarly to the fifth embodiment described above. Thus, the outline of the electric current calculation processing performed by the control circuit 50 will be described below with reference to FIGS. 45 to 47.

Figure 45:
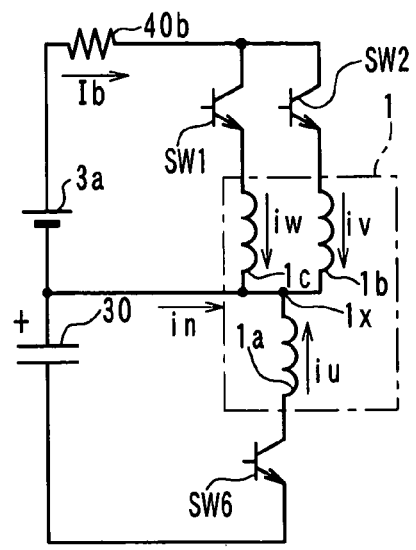
FIG. 45 is a schematic diagram showing an inverter circuit in an eleventh embodiment according to the present invention.
Figure 46:
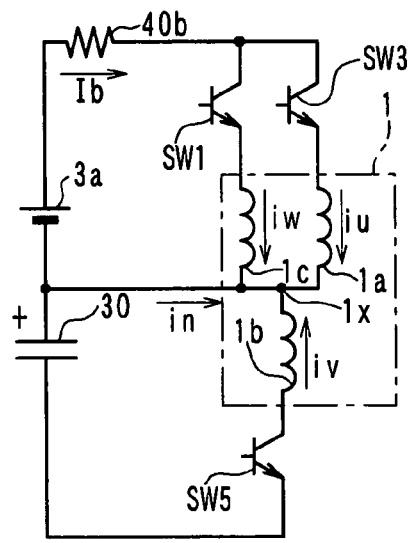
FIG. 46 is a schematic diagram showing the inverter circuit of the eleventh embodiment.
Figure 47:
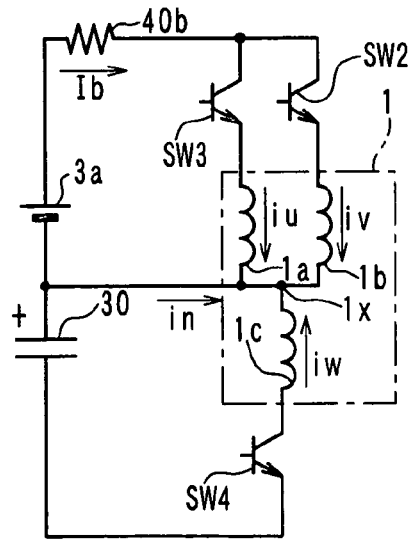
FIG. 47 is a schematic diagram showing the inverter circuit of the eleventh embodiment.

FIG. 45 shows a schematic diagram of the inverter circuit 20 when the transistors SW1, SW2 and SW6 are ON. FIG. 46 shows a schematic diagram of the inverter circuit 20 when the transistors SW1, SW3 and SW5 are ON. FIG. 47 shows a schematic diagram of the inverter circuit 20 when the transistors SW2, SW3 and SW4 are ON.

First, when the transistors SW1, SW2 and SW6 are ON among the transistors SW1 to SW6 (FIG. 45), the electric current (in+iu) is acquired as the electric current Ib.

Next, when the transistors SW1, SW3 and SW5 are ON among the transistors SW1 to SW6 (FIG. 46), the electric current (in+iv) is acquired as the electric current Ib.

Next, when the transistors SW2, SW3 and SW4 are ON among the transistors SW1 to SW6 (FIG. 47), the electric current (in+iw) is acquired as the electric current Ib.

The electric currents (in+iu), (in+iv) and (in+iw) thus acquired are set together into the three-phase AC currents iva, iva and iwa of the three-phase fixed coordinate system. The three-phase AC currents of the three-phase fixed coordinate system are coordinate-transformed to acquire the three-phase AC currents iu, iv and iw excluding the neutral-point electric current in for each phase from the three-phase AC currents iva, iva and iwa, similarly to the fifth embodiment described above.

As described above, similarly to the fifth embodiment described above, the control circuit 50 can acquire the three-phase AC currents iu, iv and iw excluding the neutral-point electric current in for each phase from the three-phase AC currents (in+iu), (in+iv) and (in+iw) of the three-phase fixed coordinate system and can control the three-phase AC synchronous motor through the inverter circuit 20 based on the three-phase AC currents iu, iv and iw.

The control circuit may calculate, for each phase, average values of the phase electric currents iu, iv and iw acquired in the eleventh embodiment described above and the phase electric currents iu, iv and iw acquired in the tenth embodiment described above and may use the average values of the phase electric currents to drive the three-phase AC synchronous motor through the inverter circuit 20.

(Twelfth Embodiment)

Next, the twelfth embodiment will be described, in which the eighth and the tenth embodiments described above are combined to acquire average values of three-phase AC currents detected by the resistor 40a and the voltage sensor 47a and the three-phase AC currents detected by the resistor 40b and the voltage sensor 47b.

Figure 48:
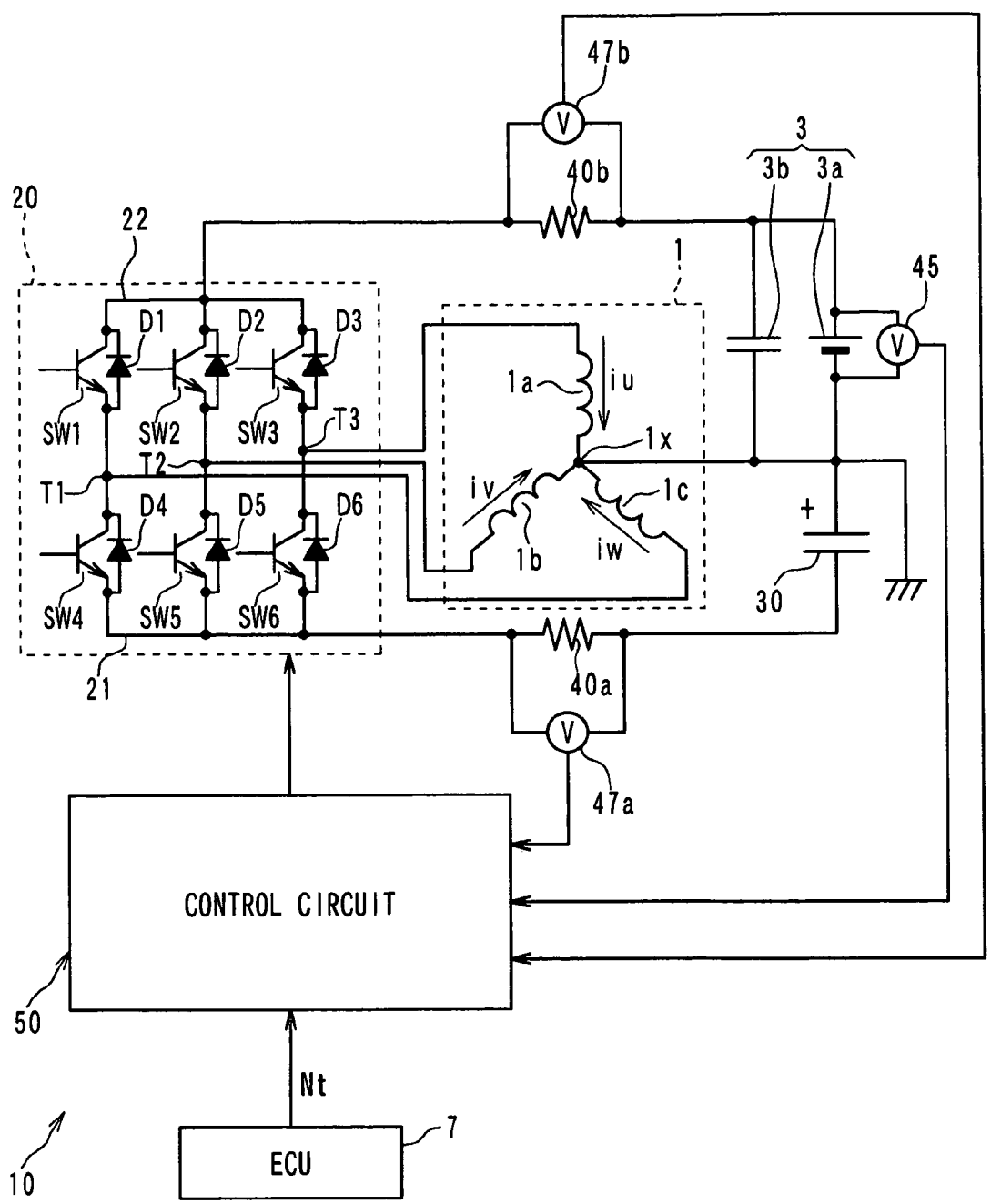
FIG. 48 is a diagram showing the configuration of a driving apparatus in the twelfth embodiment according to the present invention.

FIG. 48 shows the circuit configuration of the driving apparatus 10 according to the present embodiment. FIG. 48 shows the configuration in which the resistor 40b and the voltage sensor 47b are added to the circuit configuration shown in FIG. 34.

The resistor 40b is placed between the positive-pole bus 22 of the inverter circuit 20 and the positive electrode of the battery 3a. The voltage sensor 47b detects the potential difference between one terminal and the other terminal of the resistor 40b, similarly to the tenth embodiment described above.

Next, the control processing performed by the control circuit 50 in the present embodiment will be described.

The control circuit 50 performs the electric current calculation processing in accordance with the flowchart of FIG. 26, similarly to the sixth embodiment described above. Thus, the outline of the electric current calculation processing will be described below.

Figure 49:
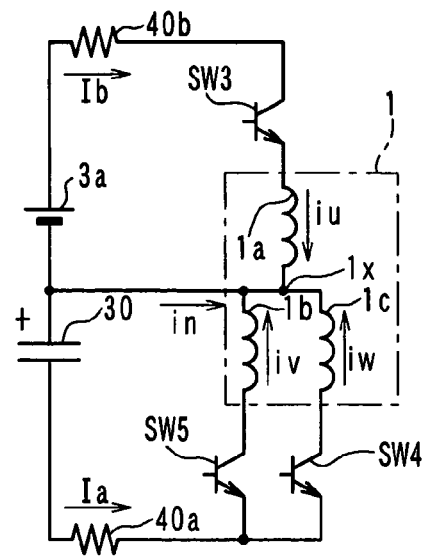
FIG. 49 is a diagram schematically showing an inverter circuit shown in FIG. 48.
Figure 50:
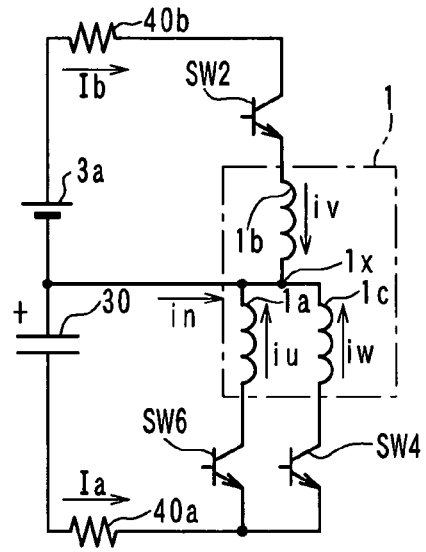
FIG. 50 is a diagram schematically showing the inverter circuit shown in FIG. 48.
Figure 51:
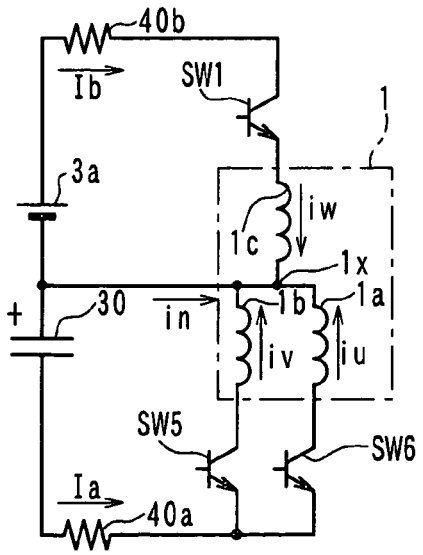
FIG. 51 is a diagram schematically showing the inverter circuit shown in FIG. 48.

FIG. 49 shows a schematic diagram of the inverter circuit 20 when transistors SW3, SW4 and SW5 are ON. FIG. 50 shows a schematic diagram of the inverter circuit 20 when the transistors SW2, SW4 and SW6 are ON. FIG. 51 shows a schematic diagram of the inverter circuit 20 when the transistors SW1, SW5 and SW6 are ON.

First, when the transistors SW3, SW4 and SW5 are ON among the transistors SW1 to SW6 (FIG. 49), the electric current Ia is acquired as the electric current (in+iu). At this point, the electric current Ib is acquired as the U-phase electric current iu.

Next, when the transistors SW2, SW4 and SW6 are ON among the transistors SW1 to SW6 (FIG. 50), the electric current Ia is acquired as the electric current (in+iv). At this point, the electric current Ib is acquired as the V-phase electric current iv.

Next, when the transistors SW1, SW5 and SW6 are ON among the transistors SW1 to SW6 (FIG. 51), the electric current Ia is acquired as the electric current (in+iw). At this point, the electric current Ib is acquired as the W-phase electric current iw.

The electric currents Ia for the three-phases thus acquired are set together into three-phase AC currents iva, iva and iwa of the three-phase fixed coordinate system. The three-phase AC currents iva, iva and iwa are coordinate-transformed to acquire the three-phase AC currents iu, iv and iw excluding the neutral-point electric current in for each phase from the electric currents iva, iva and iwa. On the other hand, the electric currents Ib for the three-phases are set together into three-phase AC currents iu', iv' and iw' of the three-phase fixed coordinate system.

In addition, the control circuit 50 calculates, for each phase, average values of the three-phase AC currents iu, iv and iw and the three-phase AC currents iu', iv' and iw'. The control circuit 50 uses the calculated average values to acquire the voltage command wave for each phase. The control circuit 50 uses the voltage command wave for each phase to acquire the switching signal similarly to the first embodiment described above. Then, the switching signals are output to the inverter circuit 20 to perform switching operation of the transistors SW1 to SW6.

In the present embodiment described above, the control circuit 50 calculates the average value for each phase of the three-phase AC acquired by using the electric current Ia flowing through the resistor 40a and the three-phase AC currents acquired by using the electric current Ib flowing through the resistor 40b. The circuit 50 uses the calculated average value for each phase to acquire the voltage command wave for each phase.

Then, the control circuit 50 uses the voltage command wave for each phase to acquire the switching signal and outputs the acquired switching signals to the inverter circuit 20. Thus, the three-phase AC synchronous motor can be controlled through the inverter circuit 20 based on the average values.

(Thirteenth Embodiment)

Next, the thirteenth embodiment will be described, in which average values of phase electric currents are calculated on the basis of the electric current Ia flowing through the resistor 40a and the electric current Ib flowing through the resistor 40b when one of transistors SW1, SW2 and SW3 is turned on.

Next, the control processing performed by the control circuit 50 in the present embodiment will be described with reference to FIG. 30 and FIGS. 52 to 54.

The control circuit 50 of the present embodiment performs the electric current calculation processing in accordance with the flowchart of FIG. 30, similarly to the seventh embodiment described above. The outline of the electric current calculation processing will be described below.

Figure 52:
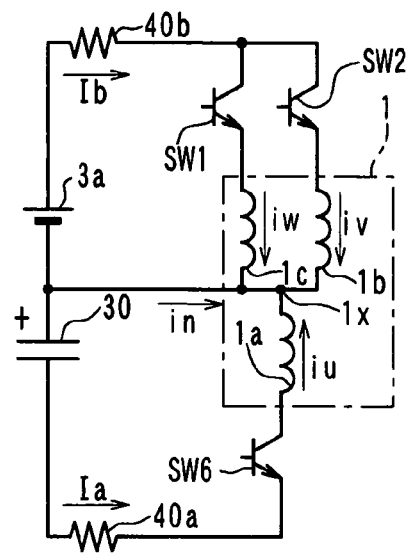
FIG. 52 is a schematic diagram showing an inverter circuit in a thirteenth embodiment according to the present invention.
Figure 53:
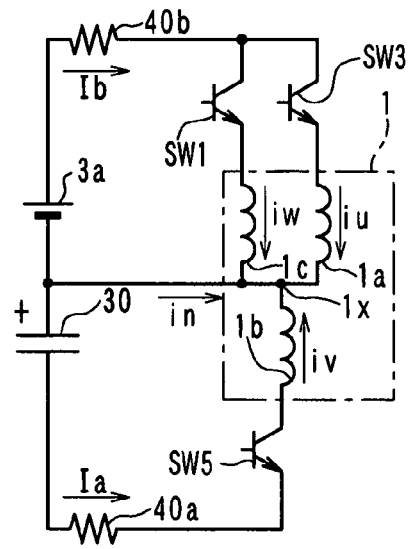
FIG. 53 is a schematic diagram showing the inverter circuit of the thirteenth embodiment.
Figure 54:
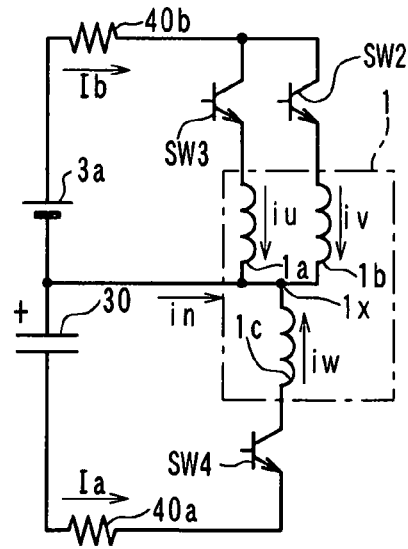
FIG. 54 is a schematic diagram showing the inverter circuit of the thirteenth embodiment.

FIG. 52 shows a schematic diagram of the inverter circuit 20 when transistors SW1, SW2 and SW6 are ON. FIG. 53 shows a schematic diagram of the inverter circuit 20 when the transistors SW1, SW3 and SW5 are ON. FIG. 54 shows a schematic diagram of the inverter circuit 20 when the transistors SW2, SW3 and SW4 are ON.

First, when the transistors SW1, SW2 and SW6 are ON among the transistors SW1 to SW6 (FIG. 52), the electric current Ia is acquired as the U-phase electric current iu. In addition, the electric current Ib is acquired as the electric current (in+iu).

Next, when the transistors SW1, SW3 and SW5 are ON among the transistors SW1 to SW6 (FIG. 53), the electric current Ia is acquired as the V-phase electric current iv. In addition, the electric current Ib is acquired as the electric current (in+iv).

Next, when the transistors SW2, SW3 and SW4 are ON among the transistors SW1 to SW6 (FIG. 54), the electric current Ia is acquired as the W-phase electric current iw. At this point, the electric current Ib is acquired as the electric current (in+iw).

The electric currents Ia for the three-phases thus acquired are set together into the three-phase AC currents iu, iv and iw of the three-phase fixed coordinate system. On the other hand, the electric currents Ib for the three-phases are set together into three-phase AC currents iva, iva and iwa of the three-phase fixed coordinate system and the three-phase AC currents iva, iva and iwa are coordinate-transformed to acquire three-phase AC currents iu", iv" and iw" excluding the neutral-point electric current in for each phase from the electric currents iva, iva and iwa, similarly to the seventh embodiment described above. In addition, the average values of the phase electric currents iu, iv and iw and the phase electric currents iu", iv" and iw" are calculated. The average values are used to acquire the voltage command wave for each phase.

According to the present embodiment described above, the control circuit 50 uses the average values of the three-phase AC currents detected by using the resistor 40a and the voltage sensor 47a and the three-phase AC currents detected by using the resistor 40b and the voltage sensor 47b to acquire the voltage command wave for each phase, similarly to the seventh embodiment. The control circuit 50 uses the voltage command wave for each phase to acquire the switching signal and outputs the acquired switching signals to the inverter circuit 20. Thus, the three-phase AC synchronous motor can be controlled through the inverter circuit 20 based on the average values.

Alternatively, the control circuit 50 may prepare two three-phase AC currents acquired by using the resistors 40a and 40b in the thirteenth embodiment described above and two three-phase AC currents acquired by using the resistors 40a and 40b in the twelfth embodiment described above, may calculate the average value for each phase of the prepared four three-phase AC currents and may use the calculated average value for each phase to control the three-phase AC synchronous motor through the inverter circuit 20.

(Fourteenth Embodiment)

The first embodiment described above is an example, in which the capacitor 30 is connected between the neutral point 1x of the stator coil 1 and the positive-pole bus 22. Instead, in the fourteenth embodiment described below, the capacitor 30 is connected between the positive-pole bus 22 and the negative-pole bus 21 of the inverter circuit 21.

Figure 55:
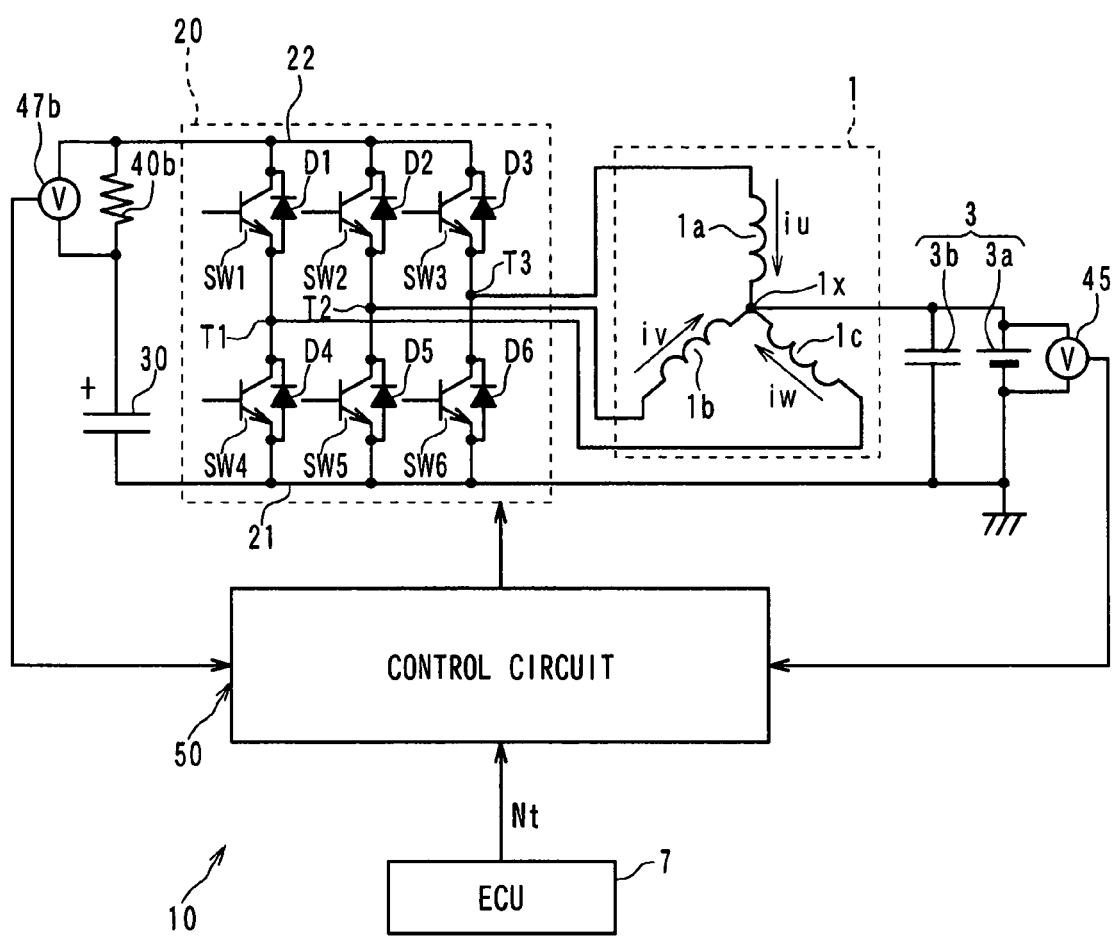
FIG. 55 is a diagram showing the configuration of a driving apparatus in a fourteenth embodiment according to the present invention.

FIG. 55 shows the circuit configuration of the driving apparatus 10 of the present embodiment. The driving apparatus 10 of the present embodiment has the configuration, in which the resistor 40b instead of the resistor 40a and the voltage sensor 47b instead of the voltage sensor 47a are added to the circuit configuration of FIG. 1.

The resistor 40b is connected between the positive electrode of the capacitor 30 and the positive-pole bus 22 of the inverter circuit 20. The voltage sensor 47b detects a potential difference between one terminal and the other terminal of the resistor 40b.

The negative electrode of the battery 3a of the present embodiment is connected to the negative-pole bus 21. The negative electrode of the capacitor 3b is also connected to the negative-pole bus 21.

The control circuit 50 of the present embodiment performs the electric current calculation processing in accordance with the flowchart of FIG. 17, similarly to the fourth embodiment described above. The outline of the electric current calculation processing performed by the control circuit 50 will be described below with reference to FIGS. 56 to 58.

Figure 56:
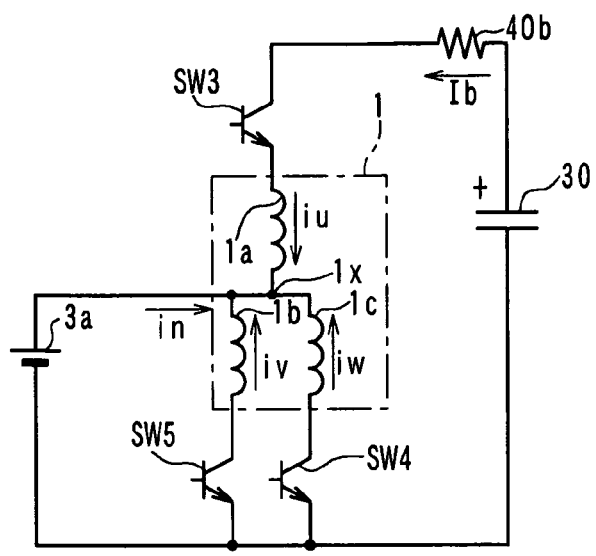
FIG. 56 is a diagram schematically showing an inverter circuit shown in FIG. 55.
Figure 57:
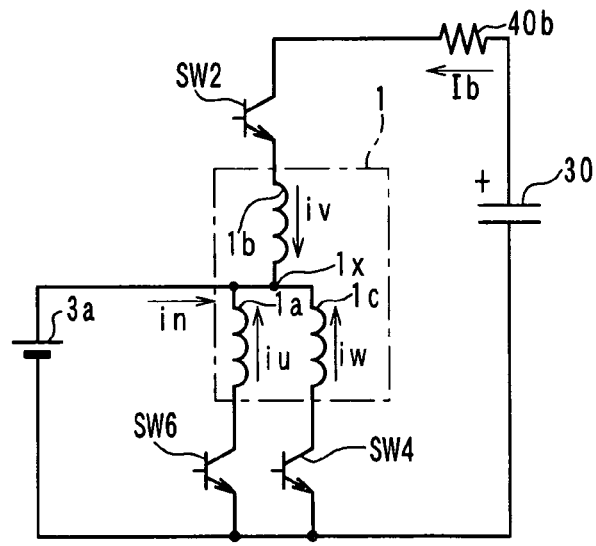
FIG. 57 is a diagram schematically showing the inverter circuit shown in FIG. 55.
Figure 58:
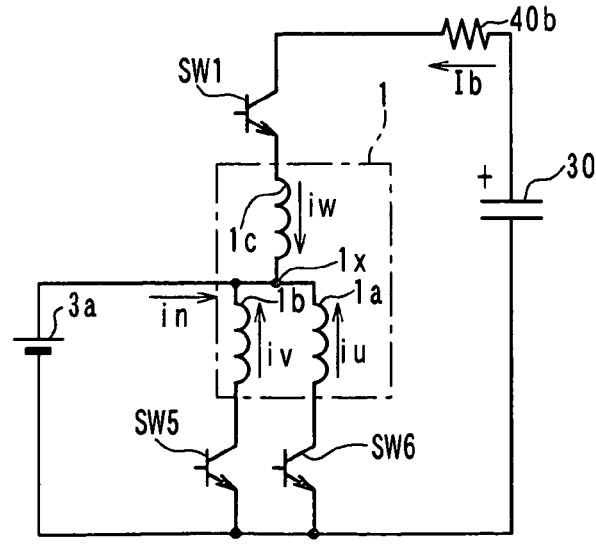
FIG. 58 is a diagram schematically showing the inverter circuit shown in FIG. 55.

FIG. 56 shows a schematic diagram of the inverter circuit 20 when the transistors SW3, SW4 and SW5 are ON. FIG. 57 shows a schematic diagram of the inverter circuit 20 when the transistors SW2, SW4 and SW6 are ON. FIG. 58 shows a schematic diagram of the inverter circuit 20 when the transistors SW1, SW5 and SW6 are ON.

First, when the transistors SW3, SW4 and SW5 are ON among the transistors SW1 to SW6 (FIG. 56), the electric current Ib is acquired as the U-phase electric current iu.

Next, when the transistors SW2, SW4 and SW6 are ON among the transistors SW1 to SW6 (FIG. 57), the electric current Ib is acquired as the V-phase electric current iv.

Next, when the transistors SW1, SW5 and SW6 are ON among the transistors SW1 to SW6 (FIG. 58), the electric current Ib is acquired as the W-phase electric current iw.

The U-phase electric current iu, the V-phase electric current iv and the W-phase electric current iw thus acquired are set together into the three-phase AC currents iu, iv and iw. Thus, similarly to the fourth embodiment described above, the three-phase AC currents iu, iv and iw can be acquired and the three-phase AC synchronous motor can be controlled through the inverter circuit 20 based on the three-phase. AC currents, currents iu, iv and iw.

(Fifteenth Embodiment)

The fourteenth embodiment described above is an example, in which the phase electric current is detected for each phase as the electric current Ib flowing through the resistor 40b. Instead, in the fifteenth embodiment described below, the electric current including the neutral-point electric current in added to the phase electric current is detected for each phase as the electric current Ib flowing through the resistor 40b.

The circuit configuration of the driving apparatus 10 of the present embodiment is identical to the circuit configuration of the driving apparatus 10 in the fourteenth embodiment described above.

Next, the operation in the present embodiment will be described.

The control circuit 50 of the present embodiment performs the electric current calculation processing in accordance with the flowchart of FIG. 21 similarly to the fifth embodiment described above. Thus, the outline of the electric current calculation processing performed by the control circuit 50 will be described below with reference to FIGS. 59 to 61.

Figure 59:
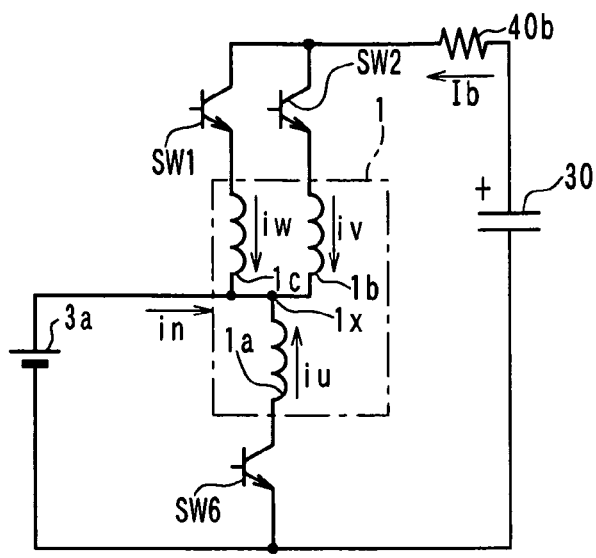
FIG. 59 is a schematic diagram showing an inverter circuit in a fifteenth embodiment according to the present invention.
Figure 60:
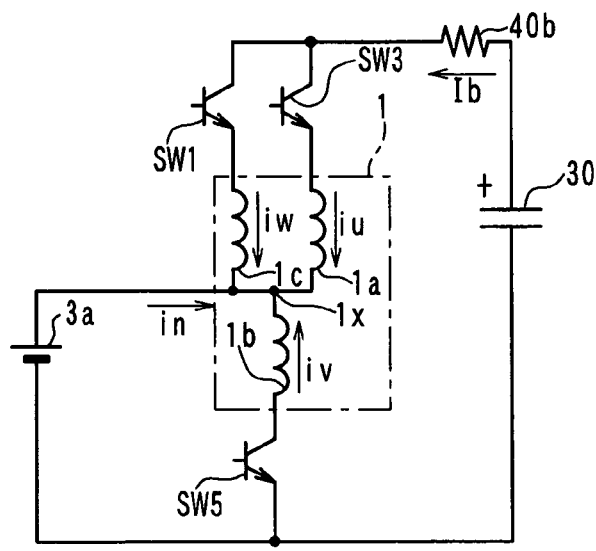
FIG. 60 is a schematic diagram showing the inverter circuit of the fifteenth embodiment.
Figure 61:
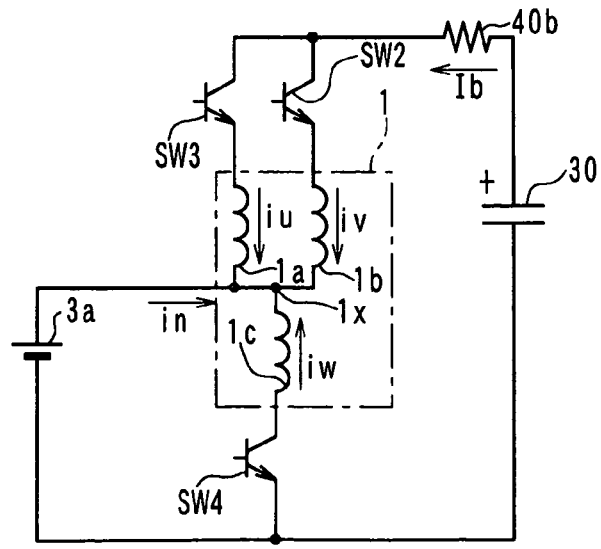
FIG. 61 is a schematic diagram showing the inverter circuit of the fifteenth embodiment.

FIG. 59 shows a schematic diagram of the inverter circuit 20 when transistors SW1, SW2 and SW6 are ON. FIG. 60 shows a schematic diagram of the inverter circuit 20 when the transistors SW1, SW3 and SW5 are ON. FIG. 61 shows a schematic diagram of the inverter circuit 20 when the transistors SW2, SW3 and SW4 are ON.

First, when the transistors SW1, SW2 and SW6 are ON among the transistors SW1 to SW6 (FIG. 59), the electric current Ib is acquired as the electric current (in+iu).

Next, when the transistors SW1, SW3 and SW5 are ON among the transistors SW1 to SW6 (FIG. 60), the electric current Ib is acquired as the electric current (in+iv).

Next, when the transistors SW2, SW3 and SW4 are ON among the transistors SW1 to SW6 (FIG. 61), the electric current Ib is acquired as the electric current (in+iw).

The electric currents (in+iu), (in+iv) and (in+iw) are set together into three-phase AC currents iva, iva and iwa of the three-phase fixed coordinate system. The three-phase AC currents are coordinate-transformed to acquire the AC currents iα and iβ of the two-phase fixed coordinate system. In addition, the AC currents iα and iβ of the two-phase fixed coordinate system are transformed into the electric currents of the three-phase fixed coordinate system to acquire the electric currents iu, iv and iw excluding the neutral-point electric current in for each phase from the three-phase AC currents (in+iu), (in+iv) and (in+iw) of the three-phase fixed coordinate system. Then, the three-phase AC synchronous motor can be controlled through the inverter circuit 20 based on the electric currents iu, iv and iw.

The fourteenth and fifteenth embodiments are examples, in which the resistor 40b is connected between the positive electrode of the capacitor 30 and the positive-pole bus 22. The present invention is not limited thereto and the resistor 40b may be connected between the negative electrode of the capacitor 30 and the negative-pole bus 21.

The control circuit 50 may calculate, for each phase, the average values of the phase electric currents iu, iv and iw acquired in the fifteenth embodiment described above and the phase electric currents iu, iv and iw acquired in the fourteenth embodiment described above and may use the average values of the phase electric currents to drive the three-phase AC synchronous motor through the inverter circuit 20.

(Sixteenth Embodiment)

Next, the sixteenth embodiment will be described, in which the neutral-point electric current in is detected and the neutral-point electric current in contained in three-phase AC currents iva, iva and iwa is excluded for each phase based on the detected neutral-point electric current in.

Figure 62:
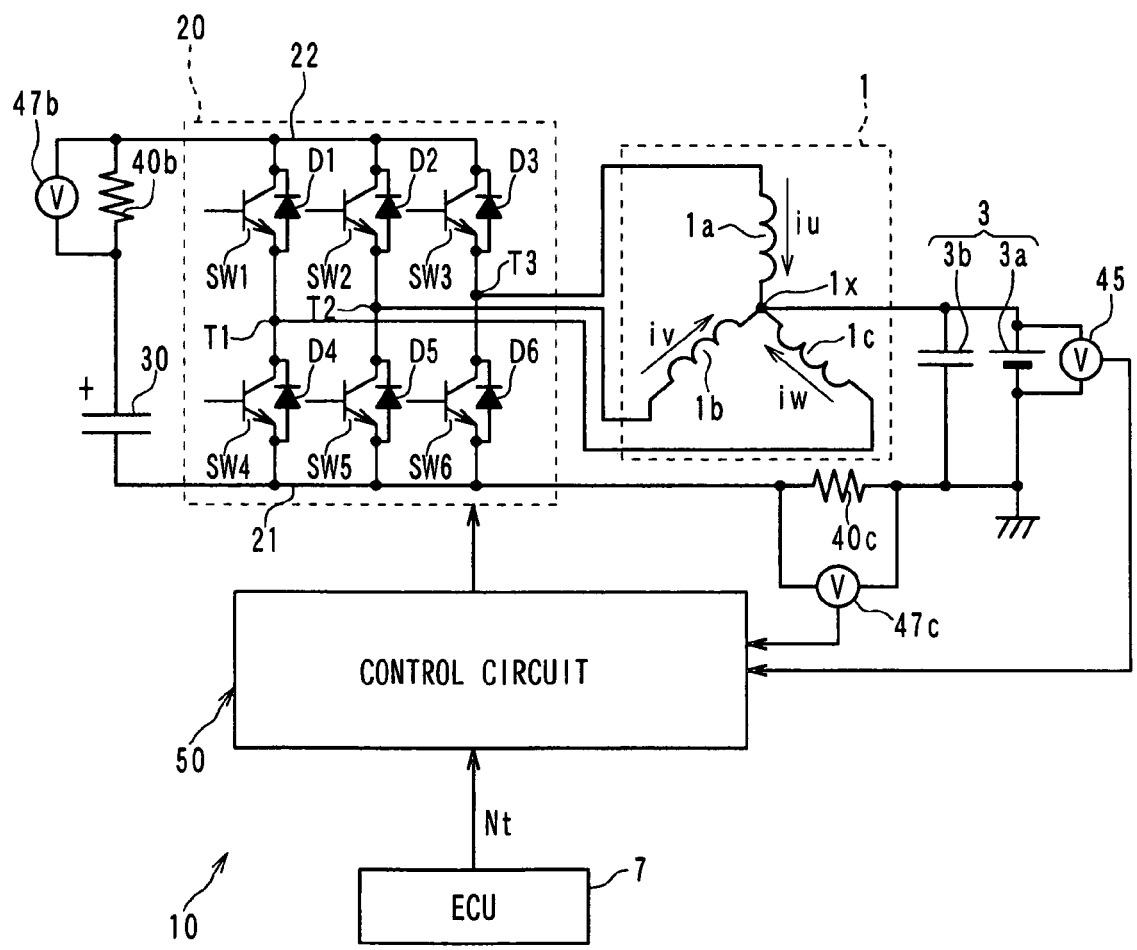
FIG. 62 is a diagram showing the configuration of a driving apparatus in a sixteenth embodiment according to the present invention.

FIG. 62 shows the circuit configuration of the driving apparatus 10 of the present embodiment. The driving apparatus 10 of the present embodiment has the configuration, in which the resistor 40c and the voltage sensor 47c are added to the circuit configuration of FIG. 55. The resistor 40c is connected between the negative-pole bus 21 and the negative electrode of the battery 3a. The voltage sensor 47c detects a potential difference between one terminal and the other terminal of the resistor 40c.

The negative electrode of the battery 3a of the present embodiment is connected to the negative-pole bus 21 through the resistor 40c. The negative electrode of the capacitor 3b is connected to the negative-pole bus 21 through the resistor 40c.

Figure 64:
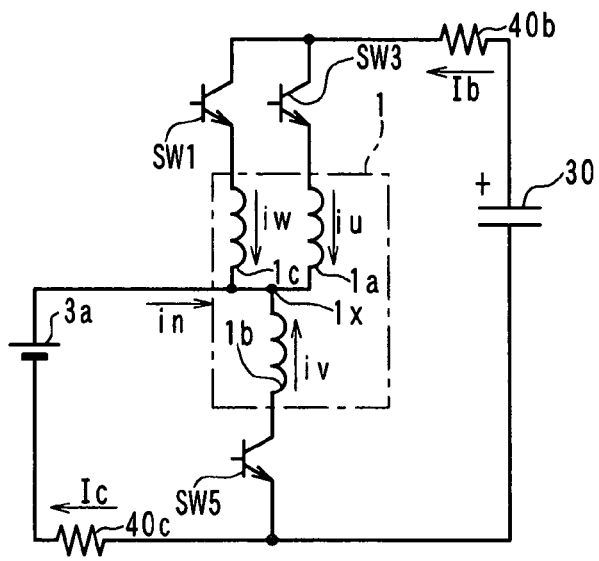
FIG. 64 is a diagram schematically showing the inverter circuit shown in FIG. 62.
Figure 65:
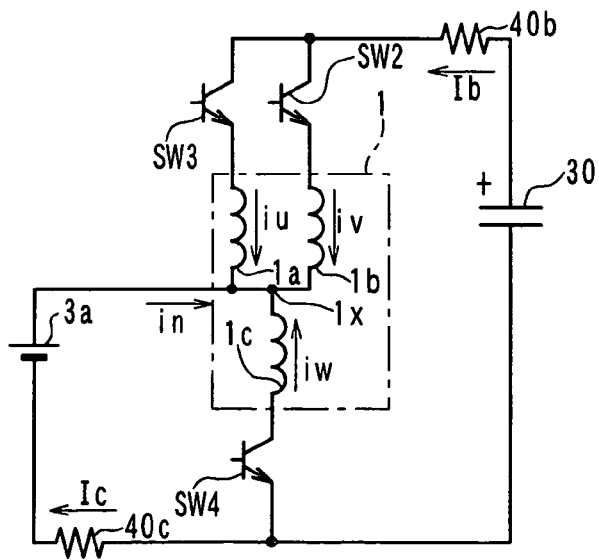
FIG. 65 is a diagram schematically showing the inverter circuit shown in FIG. 62.

Next, the operation of the control circuit 50 in the present embodiment will be described with reference to FIGS. 63 to 65.

Figure 63:
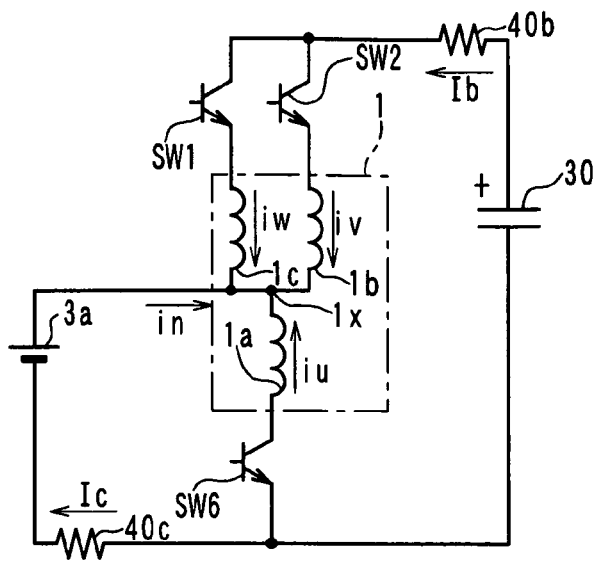
FIG. 63 is a diagram schematically showing an inverter circuit shown in FIG. 62.

FIG. 63 shows a schematic diagram of an inverter circuit 20 when the transistors SW1, SW2 and SW6 are ON. FIG. 64 shows a schematic diagram of the inverter circuit 20 when the transistors SW1, SW3 and SW5 are ON. FIG. 65 shows a schematic diagram of the inverter circuit 20 when the transistors SW2, SW3 and SW4 are ON.

First, when the transistors SW1, SW2 and SW6 are ON among the transistors SW1 to SW6 (FIG. 63), the electric current Ib is acquired as the electric current (in+iu) similarly to the fifteenth embodiment described above. In addition, the neutral-point electric current in flows through the resistor 40c as shown in FIG. 63. The neutral-point electric current in is acquired as the value V/R provided by dividing the voltage V detected by the voltage sensor 47c by the resistance value R of the resistor 40c. Subsequently, the electric current −iu excluding the electric current −in from the electric current (in+iu) acquired as described above is acquired on the basis of the neutral-point electric current in. In addition, the electric current −iu is multiplied by −1 to acquire the U-phase electric current iu.

Next, when the transistors SW1, SW3 and SW5 are ON among the transistors SW1 to SW6 (FIG. 64), the electric current Ib is acquired as the electric current (in+iv). In addition, the neutral-point electric current in is acquired as the value V/R provided by dividing the voltage V detected by the voltage sensor 47c by the resistance value R of the resistor 40c.

Subsequently, an electric current −iv excluding the electric current −in from the electric current (in+iv) acquired as described above is acquired on the basis of the neutral-point electric current in. In addition, the electric current −iv is multiplied by −1 to acquire the V-phase electric current iv.

Next, when the transistors SW2, SW3 and SW4 are ON among the transistors SW1 to SW6 (FIG. 65), the electric current Ib is acquired as the electric current (in+iw).

In addition, the neutral-point electric current in is acquired as a value V/R provided by dividing the voltage V detected by the voltage sensor 47c by the resistance value R of the resistor 40c. Subsequently, the electric current −iw excluding the electric current −in from the electric current (in+iw) acquired as described above is acquired on the basis of the neutral-point electric current in. In addition, the electric current −iw is multiplied by −1 to acquire the W-phase electric current iw.

The U-phase electric current iu, the V-phase electric current iv and the W-phase electric current iw thus acquired are set together into three-phase AC currents. Thus, the three-phase AC output currents from the inverter circuit 20 to the stator coil 1 can be acquired, similarly to the fifteenth embodiment.

(Seventeenth Embodiment)

The eighth embodiment described above is an example, in which the capacitor 30 is connected between the neutral point 1x of the stator coil 1 and the negative-pole bus 21. Instead, in the seventeenth embodiment described below, the capacitor 30 is connected between the negative-pole bus 21 and the positive-pole bus 22.

Figure 66:
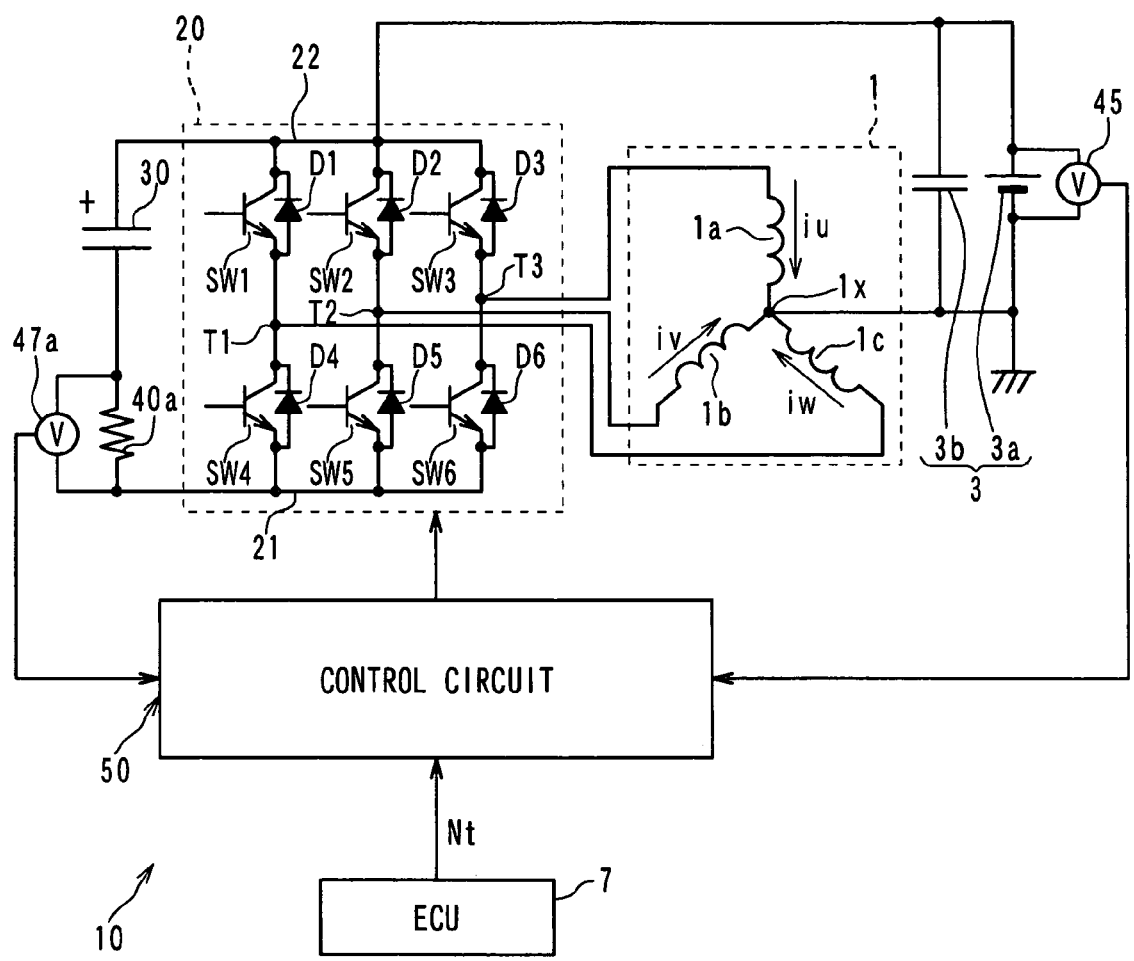
FIG. 66 is a diagram showing the configuration of a driving apparatus in a seventeenth embodiment according to the present invention.

FIG. 66 shows the circuit configuration of the driving apparatus 10 of the present embodiment. The driving apparatus 10 of the present embodiment has the same configuration as the circuit configuration in FIG. 34 except for the capacitor 30, the resistor 40a and the voltage sensor 47a.

The resistor 40a is connected between the negative-pole bus 21 and the negative electrode of the capacitor 30. The voltage sensor 47a detects the potential difference between one terminal and the other terminal of the resistor 40a.

The positive electrode of the battery 3a of the present embodiment is connected to the positive-pole bus 22. The positive electrode of the capacitor 3b is connected to the positive-pole bus 22.

Next, the operation in the present embodiment will be described.

The control circuit 50 of the present embodiment performs the electric current calculation processing in accordance with the flowchart of FIG. 4 similarly to the first embodiment described above. Thus, the outline of the electric current calculation processing performed by the control circuit 50 will be described below with reference to FIGS. 67 to 69.

Figure 67:
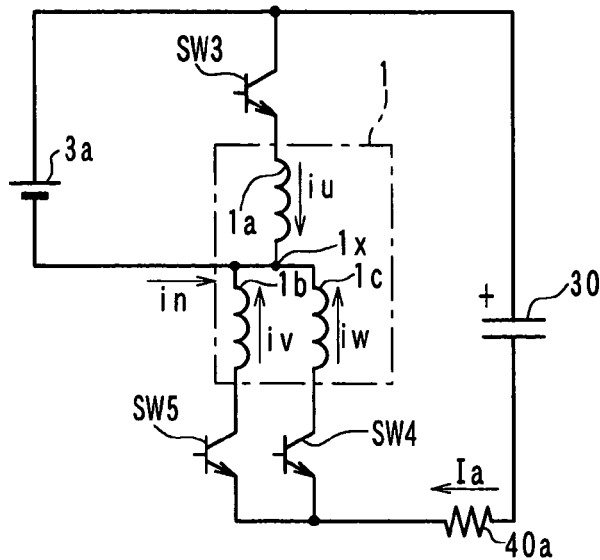
FIG. 67 is a diagram schematically showing an inverter circuit shown in FIG. 66.
Figure 68:
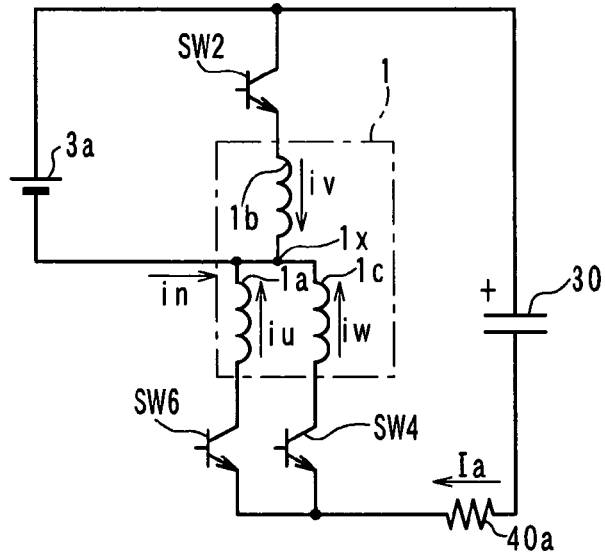
FIG. 68 is a diagram schematically showing the inverter circuit shown in FIG. 66.
Figure 69:
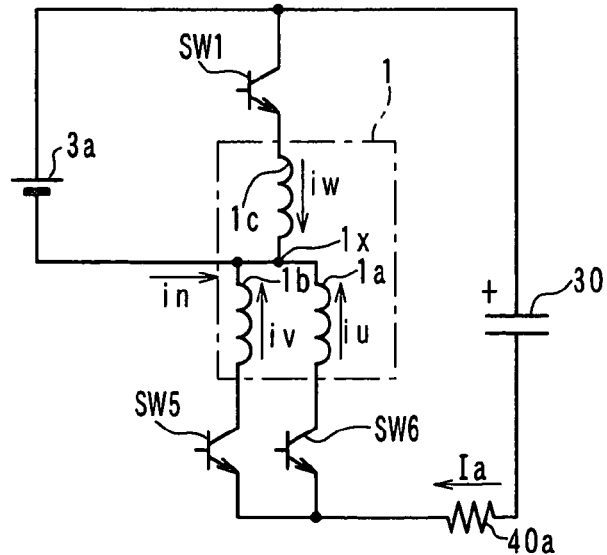
FIG. 69 is a diagram schematically showing the inverter circuit shown in FIG. 66.

FIG. 67 shows a schematic diagram of the inverter circuit 20 when the transistors SW3, SW4 and SW5 are ON. FIG. 68 shows a schematic diagram of the inverter circuit 20 when the transistors SW2, SW4 and SW6 are ON. FIG. 69 shows a schematic diagram of the inverter circuit 20 when the transistors SW1, SW5 and SW6 are ON.

First, when the transistors SW3, SW4 and SW5 are ON among the transistors SW1 to SW6 (FIG. 67), the electric current Ia is acquired as the electric current (in+iu) similarly to the first embodiment described above.

Next, when the transistors SW2, SW4 and SW6 are ON among the transistors SW1 to SW6 (FIG. 68), the electric current Ia is acquired as the electric current (in+iv) similarly to the first embodiment described above.

Next, when the transistors SW1, SW5 and SW6 are ON among the transistors SW1 to SW6 (FIG. 69), the electric current Ia is acquired as the electric current (in+iw) similarly to the first embodiment described above.

The electric currents (in+iu), (in+iv) and (in+iw) thus acquired are set together into the three-phase AC currents of the three-phase fixed coordinate system. In addition to the three-phase AC currents, currents of the three-phase fixed coordinate system can be coordinate-transformed to acquire three-phase AC currents iu, iv and iw excluding the neutral-point electric current in for each phase from the three-phase AC currents (in+iu), (in+iv) and (in+iw) of the three-phase fixed coordinate system, similarly to the first embodiment.

(Eighteenth Embodiment)

The seventeenth embodiment described above is an example, in which the electric current including the neutral-point electric current in added to the phase electric current is detected for each phase as the electric current Ia flowing through the resistor 40a. Instead, in the eighteenth embodiment described below, the phase electric current is detected as the electric current Ia flowing through the resistor 40a.

The circuit configuration of the driving apparatus 10 of the present embodiment is identical to the circuit configuration of the driving apparatus 10 of the seventeenth embodiment described above.

Next, the operation in the present embodiment will be described.

The control circuit 50 of the present embodiment performs the electric current calculation processing in accordance with the flowchart of FIG. 12 similarly to the third embodiment described above. Thus, the outline of the electric current calculation processing performed by the control circuit 50 will be described below with reference to FIGS. 70 to 72.

Figure 70:
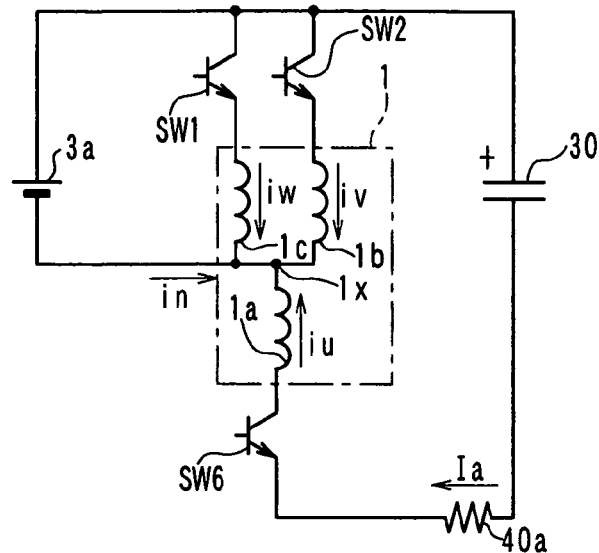
FIG. 70 is a schematic diagram showing an inverter circuit in an eighteenth embodiment according to the present invention.
Figure 71:
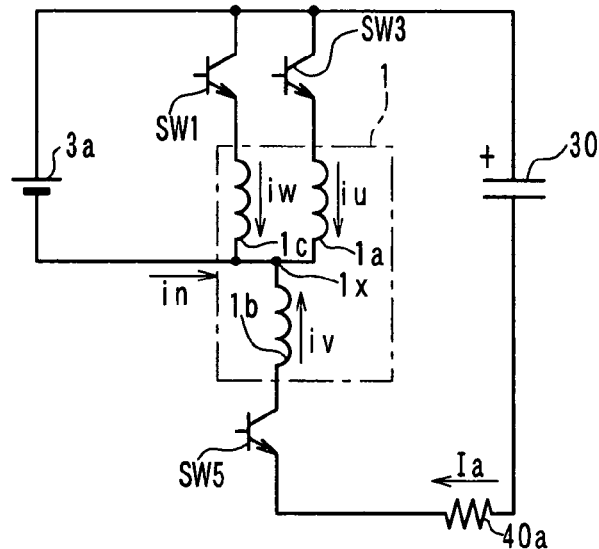
FIG. 71 is a schematic diagram showing the inverter circuit of the eighteenth embodiment.
Figure 72:
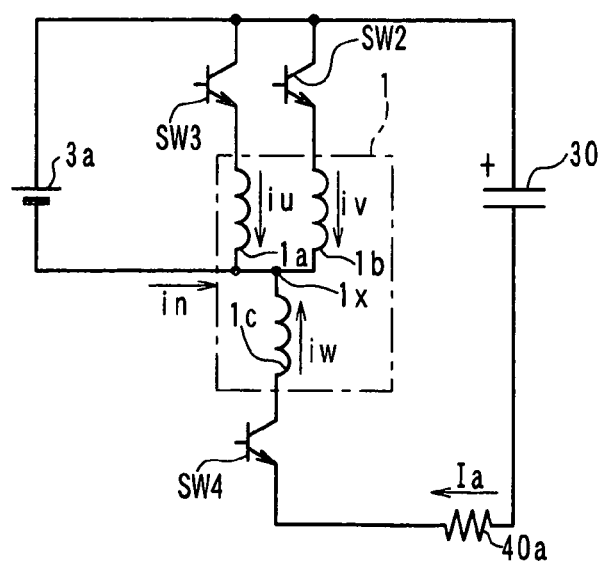
FIG. 72 is a schematic diagram showing the inverter circuit of the eighteenth embodiment.

FIG. 70 shows a schematic diagram of the inverter circuit 20 when the transistors SW1, SW2 and SW6 are ON. FIG. 71 shows a schematic diagram of the inverter circuit 20 when the transistors SW1, SW3 and SW5 are ON. FIG. 72 shows a schematic diagram of the inverter circuit 20 when the transistors SW2, SW3 and SW4 are ON.

First, when the transistors SW1, SW2 and SW6 are ON among the transistors SW1 to SW6 (FIG. 70), the electric current Ia is acquired as the U-phase electric current iu similarly to the third embodiment described above.

Next, when the transistors SW1, SW3 and SW5 are ON among the transistors SW1 to SW6 (FIG. 71), the electric current Ia is acquired as the V-phase electric current iv.

Next, when the transistors SW2, SW3 and SW4 are ON among the transistors SW1 to SW6 (FIG. 72), the electric current Ia is acquired as the W-phase electric current iw.

The electric current Ia thus acquired are set together into the three-phase AC currents iu, iv and iw. Thus, the three-phase AC currents iu, iv and iw can be acquired similarly to the third embodiment described above.

The control circuit 50 may calculate, for each phase, the average values of the three-phase AC currents iu, iv and iw acquired in the eighteenth embodiment described above and the three-phase AC currents iu, iv and iw acquired in the seventeenth embodiment described above and may use the average values to acquire the voltage command value for each phase.

The seventeenth and the eighteenth embodiments described above are examples, in which the resistor 40a is connected between the negative electrode of the capacitor 30 and the negative-pole bus 21. The resistor 40a may be connected between the positive electrode of the capacitor 30 and the positive-pole bus 22 instead.

(Nineteenth Embodiment)

Next, the nineteenth embodiment will be described, in which the neutral-point electric current in is detected and the neutral-point electric current in contained in the three-phase AC current is excluded for each phase based on the detected neutral-point electric current in.

Figure 73:
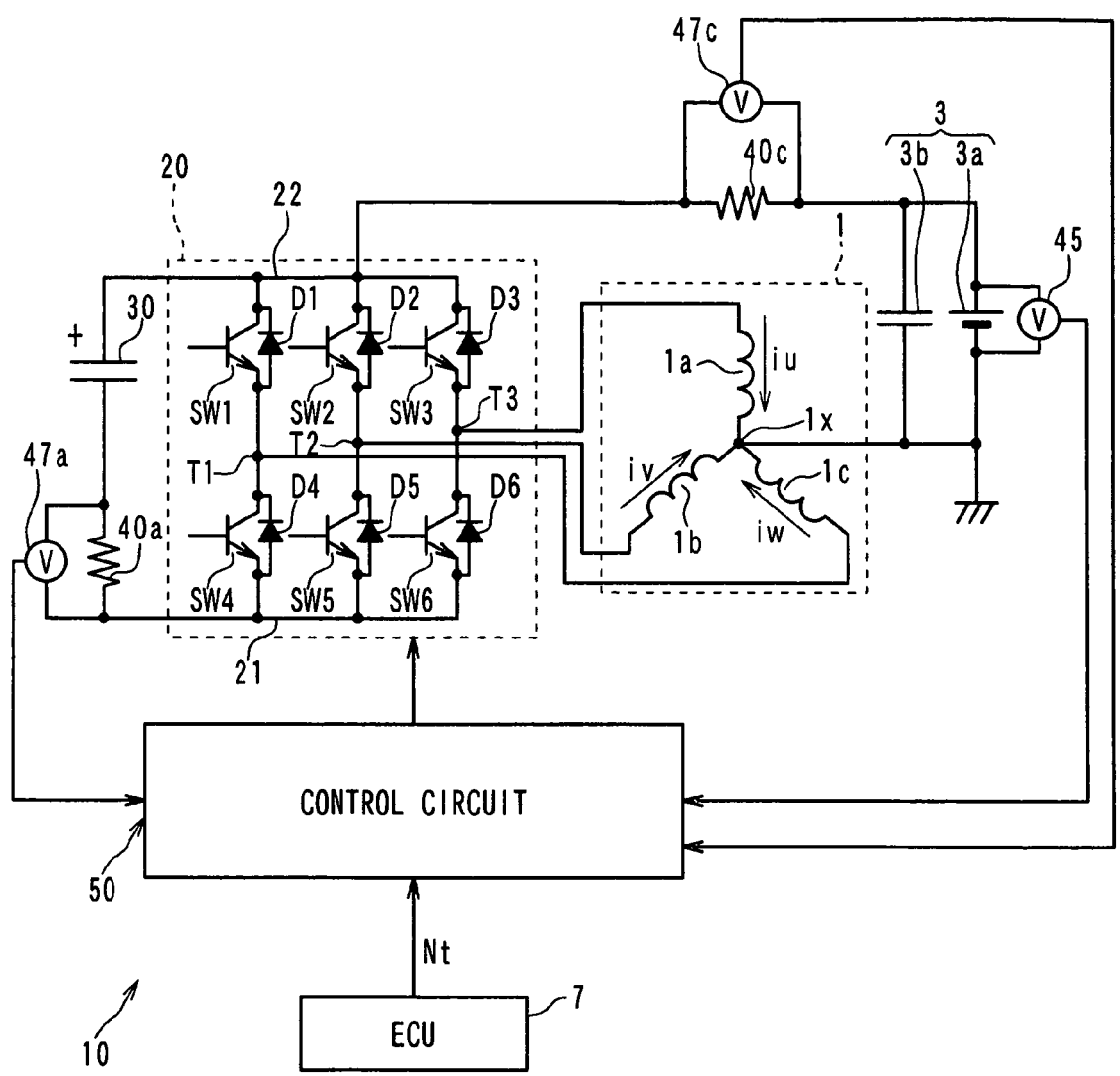
FIG. 73 is a diagram showing the configuration of a driving apparatus in a nineteenth embodiment according to the present invention.

FIG. 73 shows a circuit configuration of the driving apparatus 10 of the present embodiment. The driving apparatus 10 of the present embodiment has the configuration, in which the resistor 40c and the voltage sensor 47c are added to the circuit configuration in FIG. 66.

The resistor 40c is connected between the positive-pole bus 22 and the positive electrode of the battery 3a. The voltage sensor 47c detects a potential difference between one terminal and the other terminal of the resistor 40c.

The positive electrode of the battery 3a of the present embodiment is connected to the positive-pole bus 22 through the resistor 40c. The positive electrode of the capacitor 3b is connected to the positive-pole bus 22 through the resistor 40c.

Figure 75:
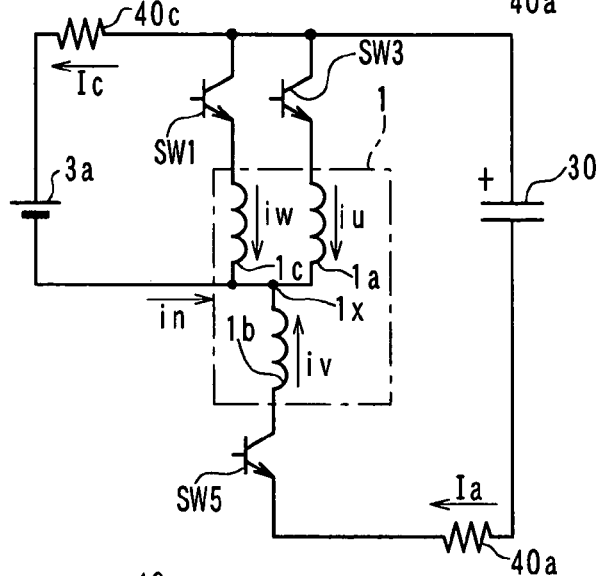
FIG. 75 is a diagram schematically showing the inverter circuit shown in FIG. 73.
Figure 76:
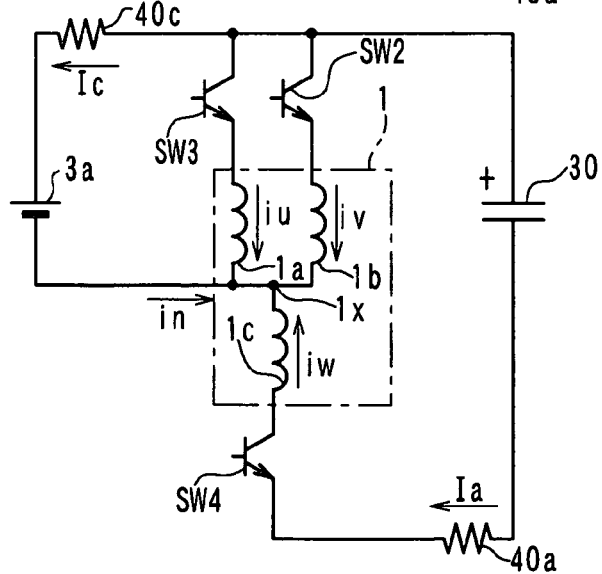
FIG. 76 is a diagram schematically showing the inverter circuit shown in FIG. 73.

Next, the operation of the control circuit 50 in the present embodiment will be described with reference to FIGS. 74 to 76.

Figure 74:
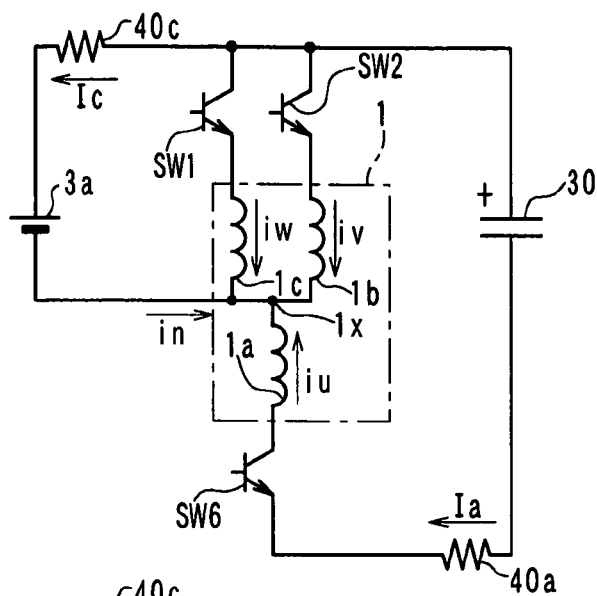
FIG. 74 is a diagram schematically showing an inverter circuit shown in FIG. 73.

FIG. 74 shows a schematic diagram of the inverter circuit 20 when the transistors SW1, SW2 and SW6 are ON. FIG. 75 shows a schematic diagram of the inverter circuit 20 when the transistors SW1, SW3 and SW5 are ON. FIG. 76 shows a schematic diagram of the inverter circuit 20 when the transistors SW2, SW3 and SW4 are ON.

First, when the transistors SW1, SW2 and SW6 are ON among the transistors SW1 to SW6 (FIG. 74), the electric current Ia is acquired as the electric current (in+iu) similarly to the seventeenth embodiment described above.

In addition, the neutral-point electric current in is acquired as the value V/R provided by dividing the voltage V detected by the voltage sensor 47c by the resistance value R of the resistor. 40c. Subsequently, the electric current −iu excluding the electric current −in from the electric current (in+iu) acquired as described above is acquired on the basis of the neutral-point electric current in. In addition, the electric current −iu is multiplied by −1 to acquire the U-phase electric current iu.

Next, when the transistors SW1, SW3 and SW5 are ON among the transistors SW1 to SW6 (FIG. 75), the electric current Ia is acquired as the electric current (in+iv) similarly to the seventeenth embodiment described above.

In addition, the neutral-point electric current in is acquired as the value V/R provided by dividing the voltage V detected by the voltage sensor 47c by the resistance value R of the resistor 40c. Subsequently, the electric current −iv excluding the electric current −in from the electric current (in+iv) acquired as described above is acquired on the basis of the neutral-point electric current in. The electric current −iv is multiplied by −1 to acquire the V-phase electric current iv.

Next, when the transistors SW2, SW3 and SW4 are ON among the transistors SW1 to SW6 (FIG. 76), the electric current Ia is acquired as the electric current (in+iw) similarly to the seventeenth embodiment described above.

In addition, the neutral-point electric current in is acquired as the value V/R provided by dividing the voltage V detected by the voltage sensor 47c by the resistance value R of the resistor 40c. Subsequently, the electric current −iw excluding an electric current −in from the electric current (in+iw) acquired as described above is acquired on the basis of the neutral-point electric current in. The electric current −iw is multiplied by −1 to acquire the W-phase electric current iw.

The U-phase electric current iu, the V-phase electric current iv and the W-phase electric current iw thus acquired are set together into three-phase AC currents. Thus, three-phase AC currents excluding the neutral-point electric current in from the three-Phase AC currents (in+iu), (in+iv) and (in+iw) can be acquired.

(Twentieth Embodiment)

Fourteenth embodiment described above is an example, in which the negative electrode of the DC power source 3 is connected to the negative-pole bus 21. Instead, in the twentieth embodiment described below, the negative electrode of the DC power source 3 is connected to the negative electrode of the capacitor 30.

Figure 77:
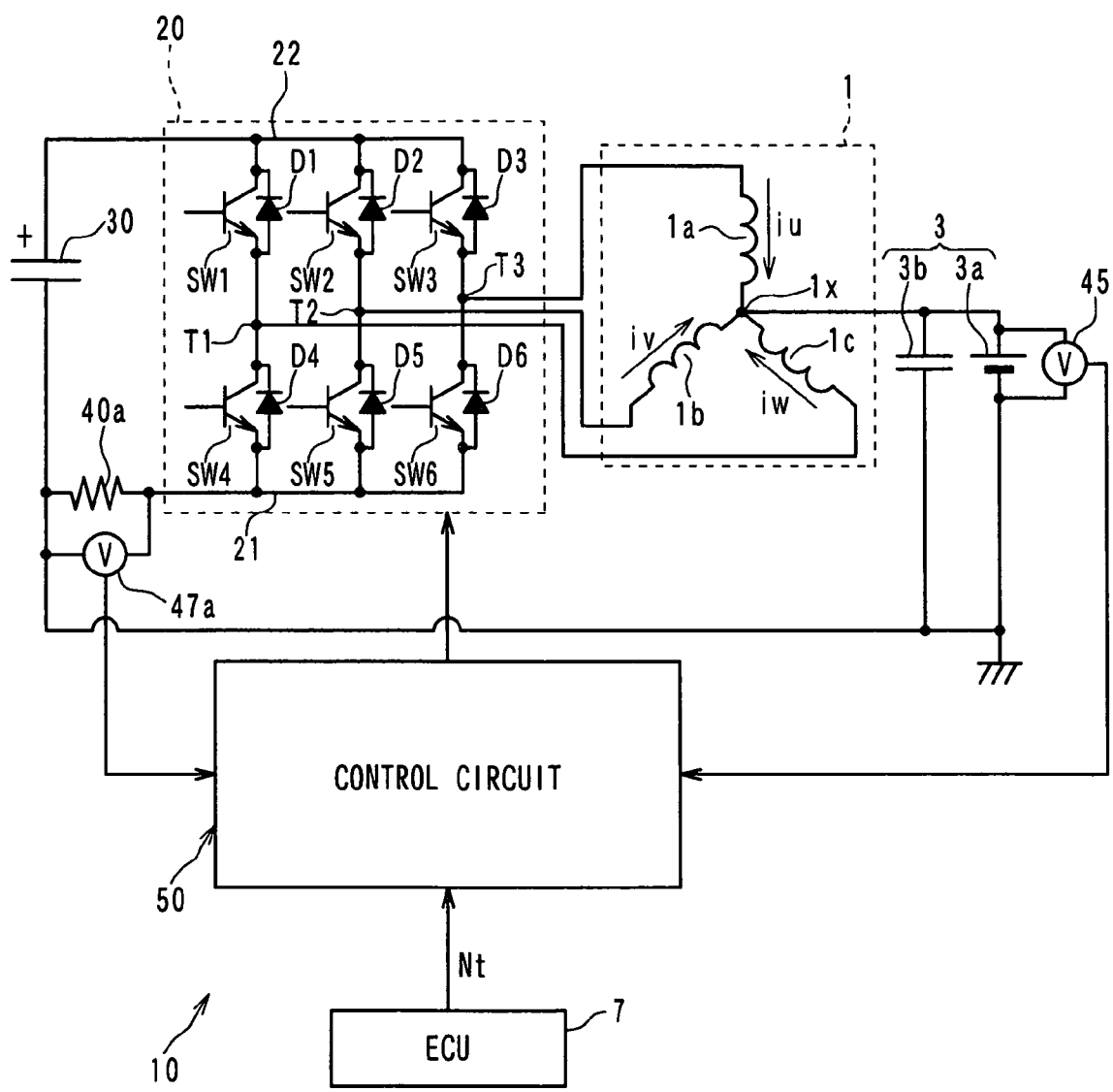
FIG. 77 is a diagram showing the configuration of a driving apparatus in a twentieth embodiment according to the present invention.

FIG. 77 shows the circuit configuration of the driving apparatus 10 of the present embodiment.

The driving apparatus 10 of the present embodiment has the configuration in which the resistor 40a instead of the resistor 40b and the voltage sensor 47a instead of the voltage sensor 47b are added to the circuit configuration of FIG. 55.

The resistor 40a is connected between a common connection point of the negative electrode of the capacitor 30 and the negative electrode of the DC power source 3 and the negative-pole bus 21. The voltage sensor 47a detects a potential difference between one terminal and the other terminal of the resistor 40a.

The negative electrode of the battery 3a is not connected to the negative-pole bus 21 but is connected to the negative electrode of the capacitor 30. The negative electrode of the capacitor 3b is also connected not to the negative-pole bus 21 but connected to the negative electrode of the capacitor 30.

Figure 78:
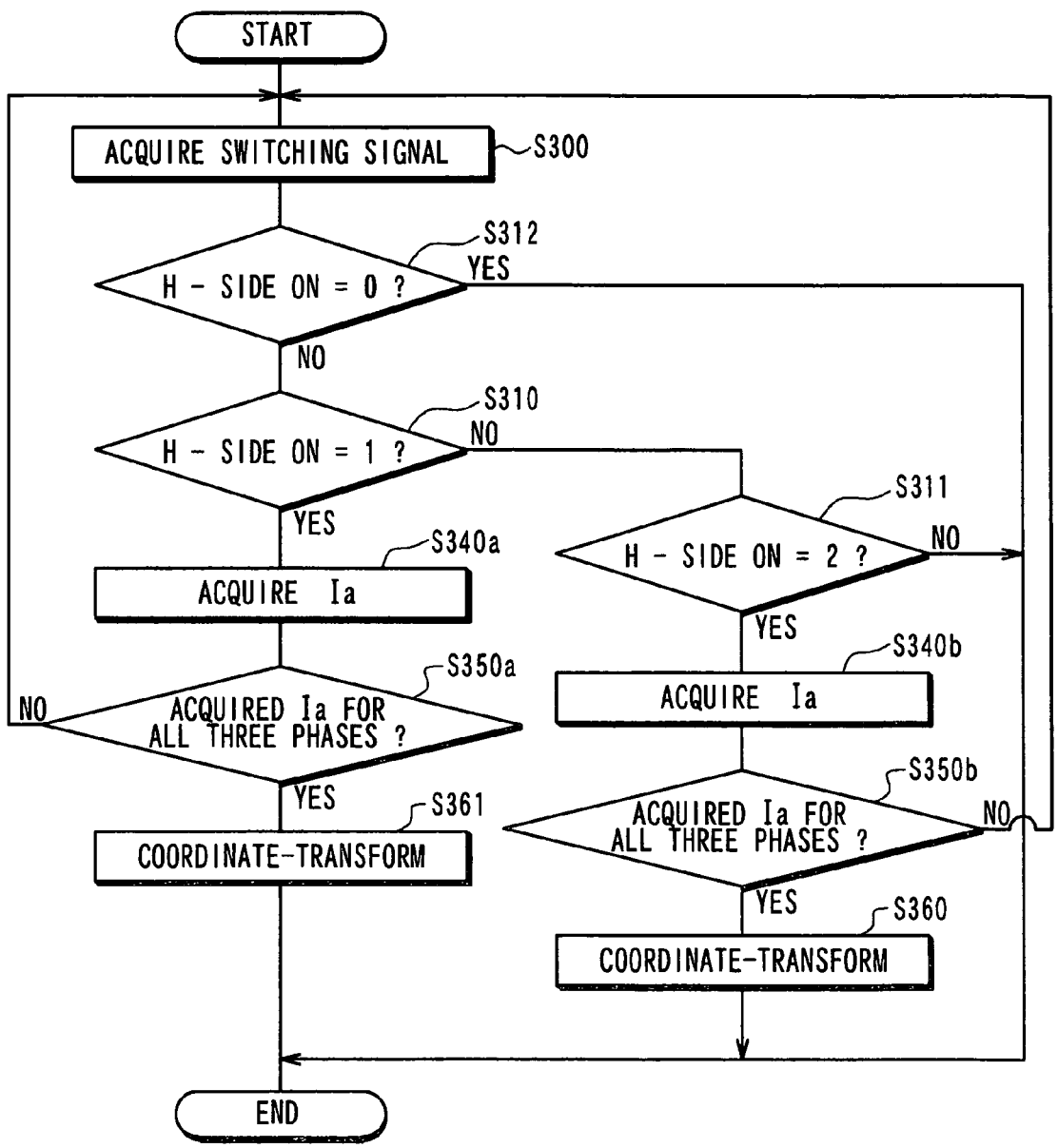
FIG. 78 is a flowchart showing control processing performed by a control circuit shown in FIG. 77.

The control circuit 50 of the present embodiment performs the electric current calculation processing in accordance with a flowchart of FIG. 78. The electric current calculation processing performed by the control circuit 50 will be described below.

Figure 79:
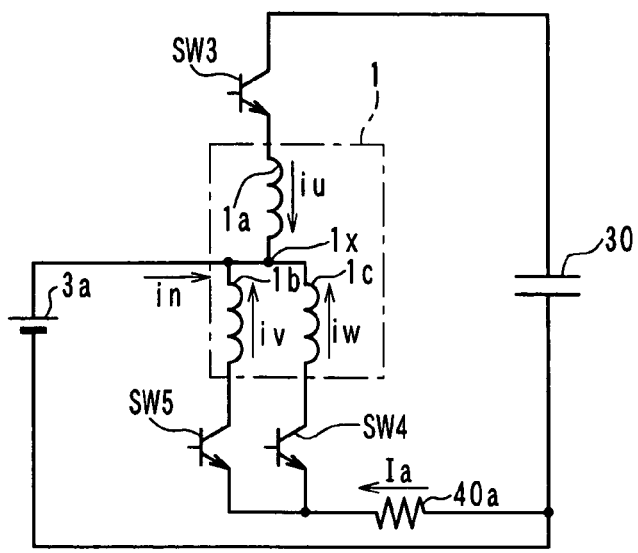
FIG. 79 is a diagram schematically showing an inverter circuit shown in FIG. 77.

FIG. 79 shows a schematic diagram of the inverter circuit 20 when the transistors SW3, SW4 and SW5 are ON among the transistors SW1 to SW6. In FIG. 79, the transistors SW1, SW2 and SW6 are not shown.

Figure 80:
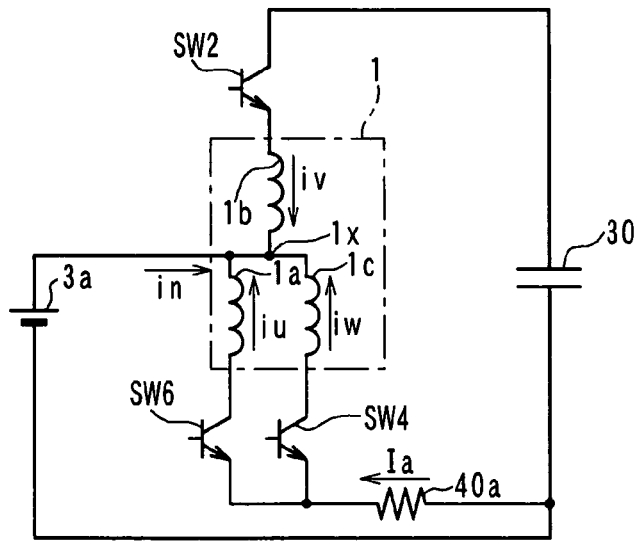
FIG. 80 is a diagram schematically showing the inverter circuit shown in FIG. 77.

FIG. 80 shows a schematic diagram of the inverter circuit 20 when the transistors SW2, SW4 and SW6 are ON among the transistors SW1 to SW6. In FIG. 80, the transistors SW1, SW3 and SW5 are not shown.

Figure 81:
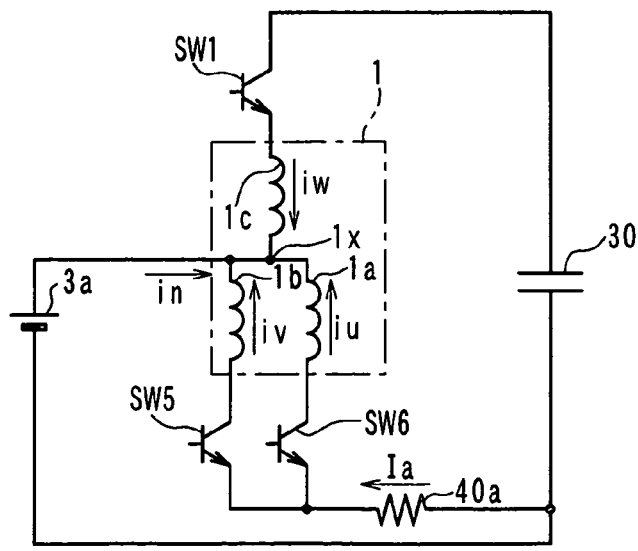
FIG. 81 is a diagram schematically showing the inverter circuit shown in FIG. 77.

FIG. 81 shows a schematic diagram of the inverter circuit 20 when the transistors SW1, SW5 and SW6 are ON among the transistors SW1 to SW6. In FIG. 81, the transistors SW2, SW3 and SW4 are not shown.

Figure 82:
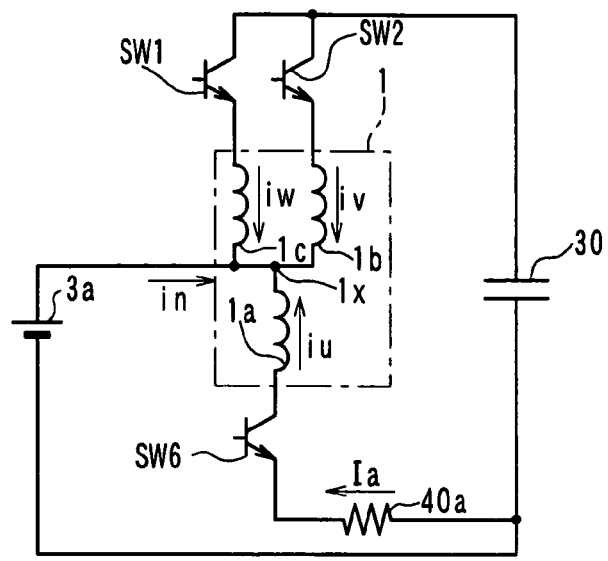
FIG. 82 is a diagram schematically showing the inverter circuit shown in FIG. 77.

FIG. 82 shows a schematic diagram of the inverter circuit 20 when the transistors SW1, SW2 and SW6 are ON among the transistors SW1 to SW6. In FIG. 82, the transistors SW3, SW4 and SW5 are not shown.

Figure 83:
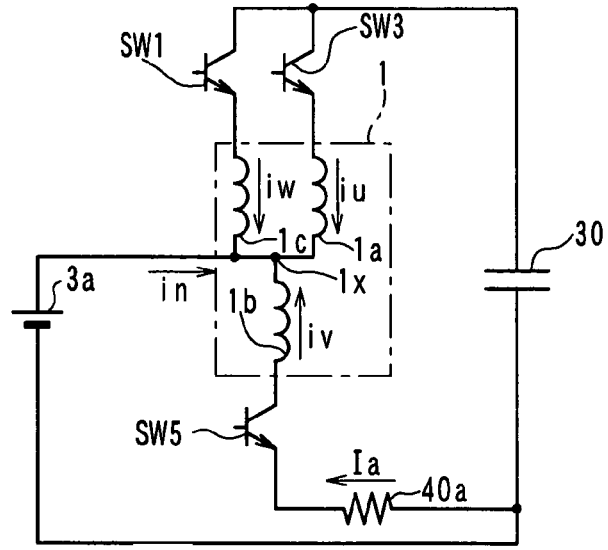
FIG. 83 is a diagram schematically showing the inverter circuit shown in FIG. 77.

FIG. 83 shows a schematic diagram of the inverter circuit 20 when the transistors SW1, SW3 and SW5 are ON among the transistors SW1 to SW6. In FIG. 83, the transistors SW2, SW4 and SW6 are not shown.

Figure 84:
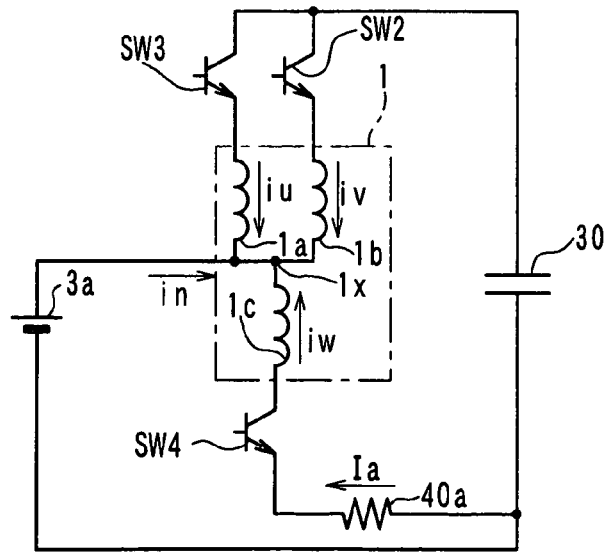
FIG. 84 is a diagram schematically showing the inverter circuit shown in FIG. 77.

FIG. 84 shows a schematic diagram of the inverter circuit 20 when the transistors SW2, SW3 and SW4 are ON among the transistors SW1 to SW6. In FIG. 84, the transistors SW1, SW5 and SW6 are not shown.

In FIGS. 79 to 84, diodes D1 to D6 are not shown either. The direction of the flow of the electric current Ia in each of FIGS. 79 to 84 is defined such that arrows indicate a positive direction.

First, description will be made with respect to the situation, in which the transistors SW3, SW4 and SW5 are ON among the transistors SW1 to SW6 as shown in FIG. 79.

First, at step S300 in FIG. 78, the switching signal is acquired. At the next step S312, it is checked whether the number of ON transistors (denoted as ON number in FIG. 78) among the transistors SW1, SW2 and SW3 (denoted as high-side SWs in FIG. 78) is zero or not based on the switching signal.

Since it is determined at this point that the number of ON transistors among the transistors SW1, SW2 and SW3 is one, NO is produced at step S312.

At the next step S310, it is checked whether the number of ON transistors (denoted as ON number in FIG. 78) among the transistors SW1, SW2 and SW3 (denoted as high-side SWs in FIG. 78) is one or not based on the switching signal.

Since it is determined at this point that the number of ON transistors among the transistors SW1, SW2 and SW3 is one, YES is produced at step S310.

When the transistors SW3, SW4 and SW5 are ON among the transistors SW1 to SW6 (FIG. 79), the electric current Ia flowing through the resistor 40a is equal to the electric current (in+iu). The electric current in is the neutral-point electric current flowing between the positive electrode of the battery 3a and the neutral point 1x of the stator coil 1 and the electric current iu is the U-phase electric current iu.

The control processing proceeds to step S340a to acquire the electric current (in+iu) as the value V/R provided by dividing the voltage V detected by the voltage sensor 47a by the resistance value R of the resistor 40a.

At the next step S350a, it is checked whether or not the electric current Ia at step S340a described above has been acquired for three-phases. Since the electric current Ia has been acquired only for the U-phase at this point, it is determined that the electric current Ia has not been acquired for the three phases yet and NO is produced. Then, the processing returns to step S300.

When the transistors SW2, SW4 and SW6 are ON among the transistors SW1 to SW6 (FIG. 80), NO is produced at step S312 and YES is produced at the next step S310, similarly to the situation, in which the transistors SW3, SW4 and SW5 are ON (FIG. 79). Then, the electric current (in+iv) is acquired as the electric current Ia flowing through the resistor 40a at the next step S340a. The electric current iv is the V-phase electric current.

Since it is determined that the electric current Ia at the step S340a has been acquired for the two phases of the U-phase and the V-phase but the electric current Ia has not been acquired for the three phases yet, NO is produced at the next step S350a. Then, the processing returns to step S300.

When the transistors SW1, SW5 and SW6 are ON among the transistors SW1 to SW6 (FIG. 81), NO is produced at step S312 and YES is produced at the next step S310, similarly to the situation, in which the transistors SW3, SW4 and SW5 are ON (FIG. 79). Then, the electric current (in+iw) is acquired as the electric current Ia flowing through the resistor 40a at the next step S340a. The electric current iw is a W-phase electric current.

As described above, the electric current Ia at the step S340a has been acquired for the three-phases of the U-phase, the V-phase and the W-phase. Thus, YES is produced at the next step S350a.

Then, the control processing proceeds to step S361, in which the electric current Ia for the three phases acquired at the step S340a are set together into the three-phase AC currents (in+iu), (in+iv) and (in+iw) of the three-phase fixed coordinate system. The three-phase AC currents (in+iu), (in+iv) and (in+iw) are coordinate-transformed, into AC currents iα and iβ of the two-phase fixed coordinate system, similarly to the first embodiment described above. Thus, the electric current iα and iβ of the two-phase fixed coordinate system excluding the neutral-point electric current in for each phase can be acquired. Then, the switching signal is acquired at step S300 and the control processing proceeds to the next step S312.

Next, description will be made with respect to the situation, in which the transistors SW1, SW2 and SW6 are ON among the transistors SW1 to SW6 as shown in FIG. 82.

In this case, it is determined that the number of ON transistors among the transistors SW1, SW2 and SW3 is not zero and NO is produced at step S312. At the next step S310, it is determined that the number of ON transistors among the transistors SW1, SW2 and SW3 is not one, NO is produced at step S310. In addition, the control processing proceeds to step S311 to determine whether the number of ON transistors among the transistors SW1, SW2 and SW3 is two or not.

Since the transistors SW1 and SW2 are ON among the transistors SW1, SW2 and SW3, it is determined that the number of ON transistors among the transistors SW1, SW2 and SW3 is two and YES is produced at step S311.

When the transistors SW1, SW2 and SW6 are ON among the transistors SW1 to SW6 (FIG. 82), the U-phase electric current-iu flows as the electric current Ia through the resistor 40a.

The control processing proceeds to step S340b to acquire the U-phase electric current iu as the value V/R provided by dividing the voltage V detected by the voltage sensor 47a by the resistance value R of the resistor 40a.

At the next step S350b, it is checked whether or not the electric current Ia at the step S340b has been acquired for the three phases. Since the electric current Ia has been acquired only for the U-phase at this point, it is determined that the electric current Ia has not been acquired for the three phases yet and NO is produced. Then, the processing returns to step S300.

When the transistors SW1, SW3 and SW5 are ON at this point among the transistors SW1 to SW6 (FIG. 83), NO is produced at each of steps S312 and S310, similarly to the situation, in which the transistors SW1, SW2 and SW6 are ON (FIG. 82). Then, YES is produced at the next step S311. At the next step S340b, the V-phase electric current iv is acquired as the electric current Ia flowing through the resistor 40a.

Since it is determined that the electric current Ia at the step S340a has been acquired for the two phases of the U-phase and the V-phase but the electric current Ia has not been acquired for the three phases yet, NO is produced at the next step S350b. Then, the processing returns to step S300.

When the transistors SW2, SW3 and SW4 are ON among the transistors SW1 to SW6 (FIG. 84), the processing is performed similarly to the situation, in which the transistors SW1, SW2 and SW6 are ON (FIG. 82). Thus, at step S340b, the W-phase electric current iw is acquired as the electric current Ia flowing through the resistor 40a.

As described above, the electric current Ia at the step S340b has been acquired for the three-phases of the U-phase, the V-phase and the W-phase. Thus, YES is produced at the next step S350b.

Then, the control processing proceeds to step S360 to set the electric currents Ia for the three-phases acquired at the step S340b together into three-phase AC currents iu, iv and iw of the three-phase fixed coordinate system. The control circuit 50 coordinate-transforms the three-phase AC currents iu, iv and iw of the three-phase fixed coordinate system into the AC currents iα and iβ of the two-phase fixed coordinate system. Thus, the coordinate system of the electric currents acquired at step S360 can be matched with the coordinate system of the electric currents acquired at step S361

Through the processing, when one of the transistors SW1, SW2 and SW3 is ON and two of the transistors SW4, SW5 and SW6 are ON, the AC currents of the two-phase fixed coordinate system can be acquired. On the other hand, when two of the transistors SW1, SW2 and SW3 are ON and one of the transistors SW4, SW5 and SW6 are ON, the AC currents of the two-phase fixed coordinate system can also be acquired. The AC currents of the two-phase fixed coordinate system thus acquired are used for calculating the voltage command wave for each phase at step S100 in FIG. 2.

(Twenty-First Embodiment)

Figure 85:
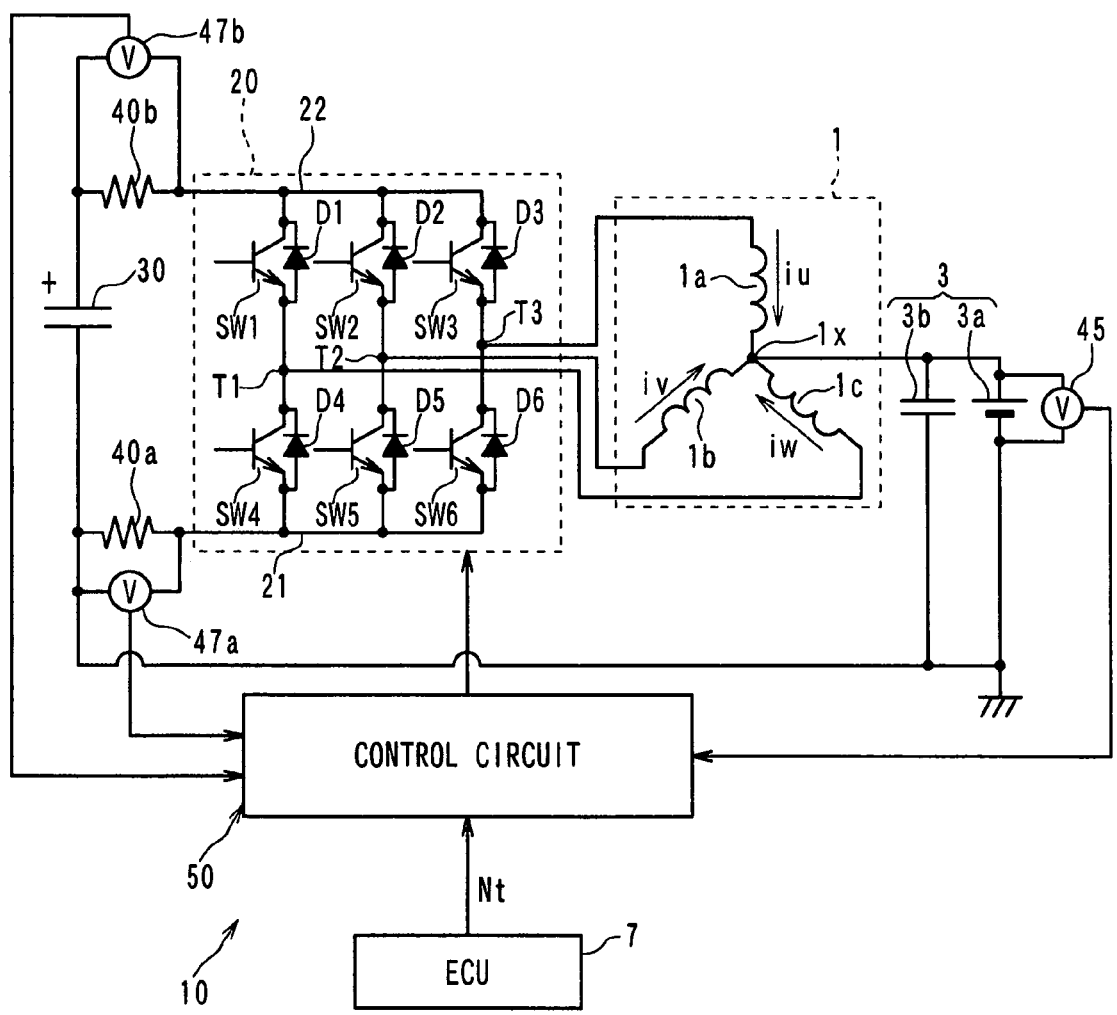
FIG. 85 is a diagram showing the configuration of a driving apparatus in a twenty-first embodiment according to the present invention.

Next, the twenty-first embodiment will be described, in which the resistor 40b for detecting an electric current and the voltage sensor 47b are added, as shown in FIG. 85, to the driving apparatus 10 of the twentieth embodiment described above.

FIG. 85 shows the circuit configuration of the driving apparatus 10 of the present embodiment. The driving apparatus 10 of the present embodiment has the configuration in which the resistor 40b and the voltage sensor 47b are added to the circuit configuration shown in FIG. 77.

The resistor 40b is connected between the positive electrode of the capacitor 30 and the positive-pole bus 22 of the inverter circuit 20. The voltage sensor 47b detects a potential difference between one terminal and the other terminal of the resistor 40b.

Figure 86:
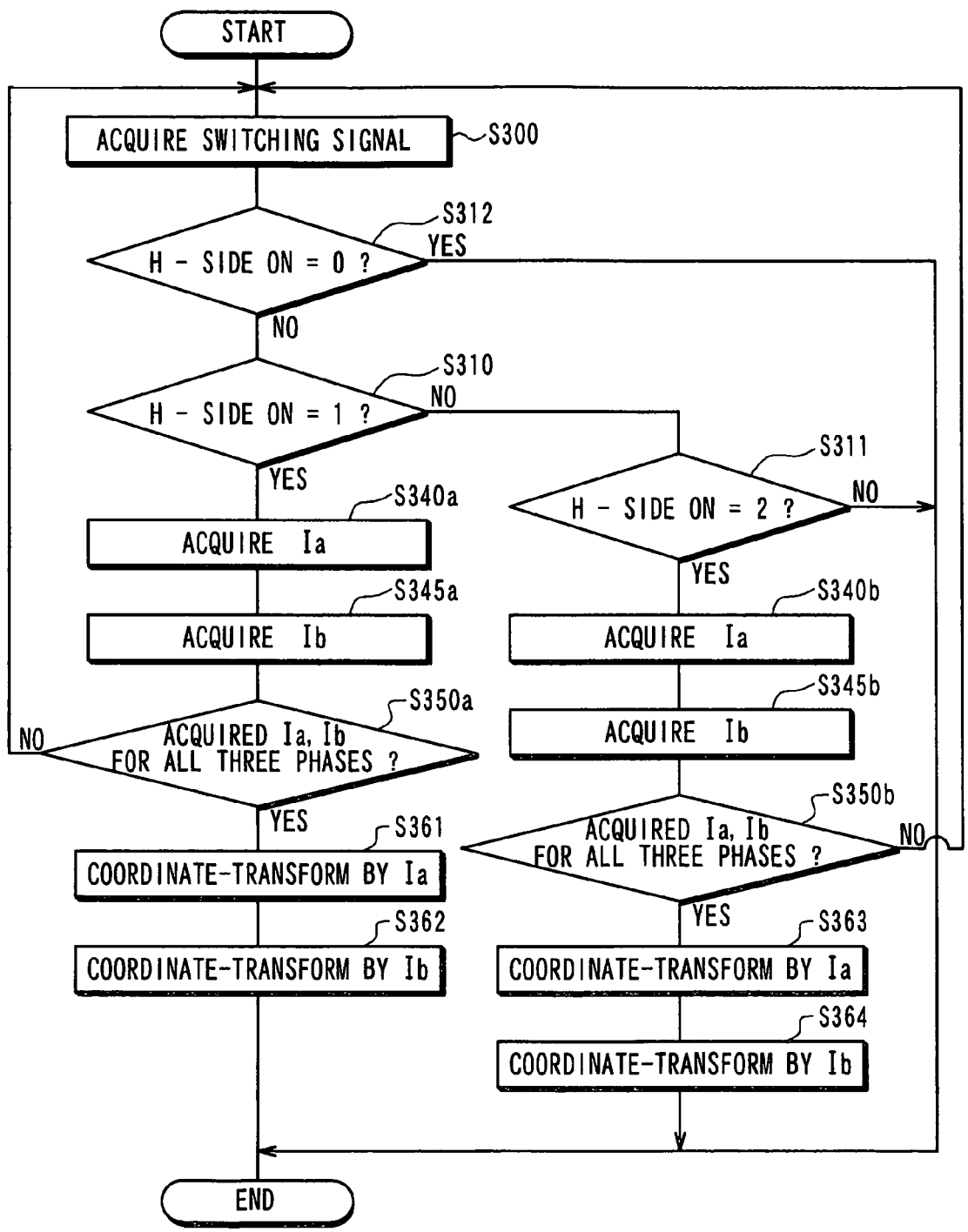
FIG. 86 is a flowchart showing control processing performed by a control circuit shown in FIG. 85.

The control circuit 50 of the present embodiment performs the electric current calculation processing in accordance with a flowchart shown in FIG. 86 instead of the flowchart in FIG. 78. Thus, description will be made with respect to differences between the electric current calculation processing of the present embodiment and the electric current calculation processing of the twentieth embodiment described above.

Figure 87:
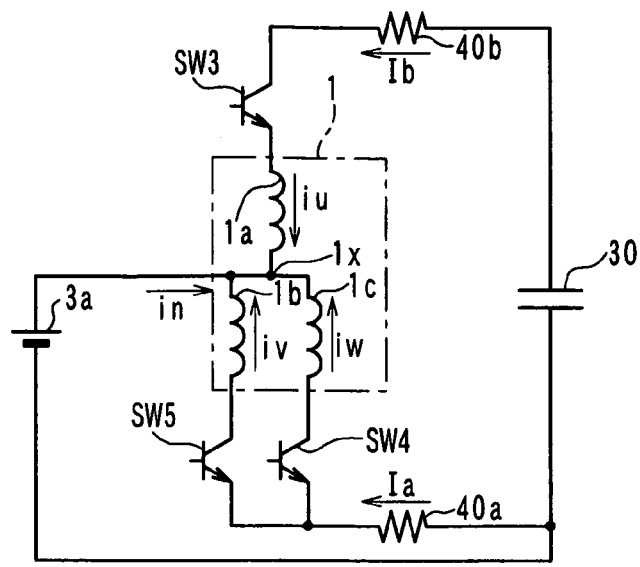
FIG. 87 is a diagram schematically showing an inverter circuit shown in FIG. 85.
Figure 88:
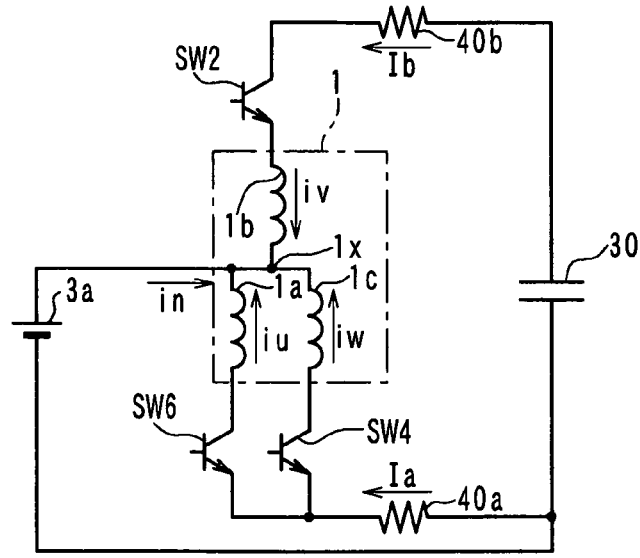
FIG. 88 is a diagram schematically showing the inverter circuit shown in FIG. 85.
Figure 89:
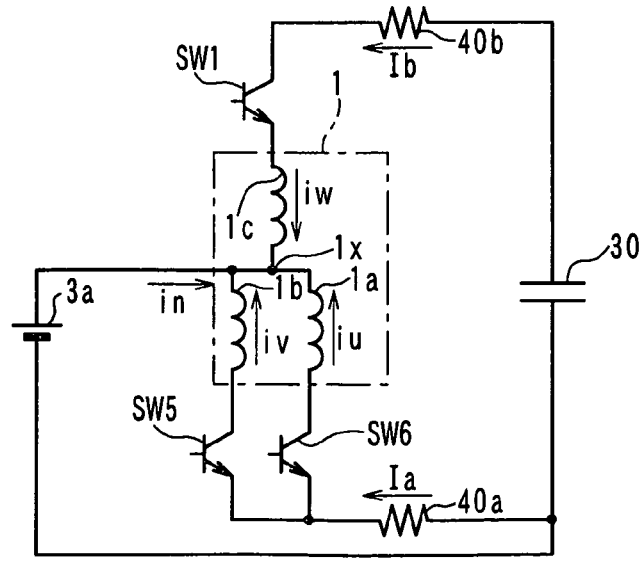
FIG. 89 is a diagram schematically showing the inverter circuit shown in FIG. 85.

FIG. 87 shows a schematic diagram of the inverter circuit 20 when the transistors SW3, SW4 and SW5 are ON similarly to FIG. 79. FIG. 88 shows a schematic diagram of the inverter circuit 20 when the transistors SW2, SW4 and SW6 are ON similarly to FIG. 80. FIG. 89 shows a schematic diagram of the inverter circuit 20 when the transistors SW1, SW5 and SW6 are ON similarly to FIG. 81.

Figure 90:
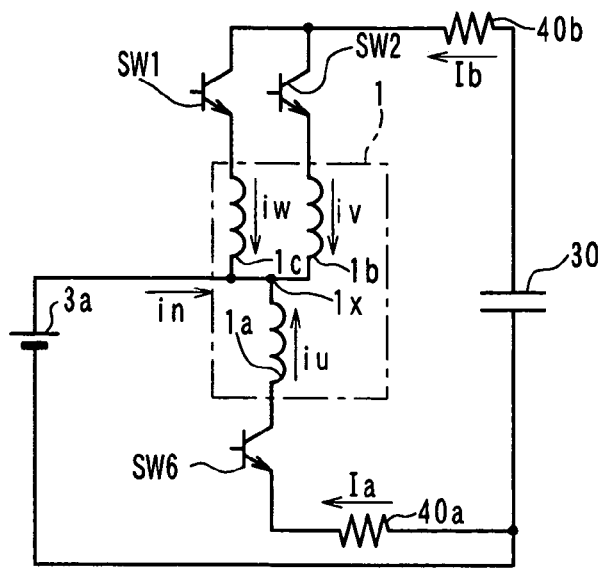
FIG. 90 is a diagram schematically showing the inverter circuit shown in FIG. 85.
Figure 91:
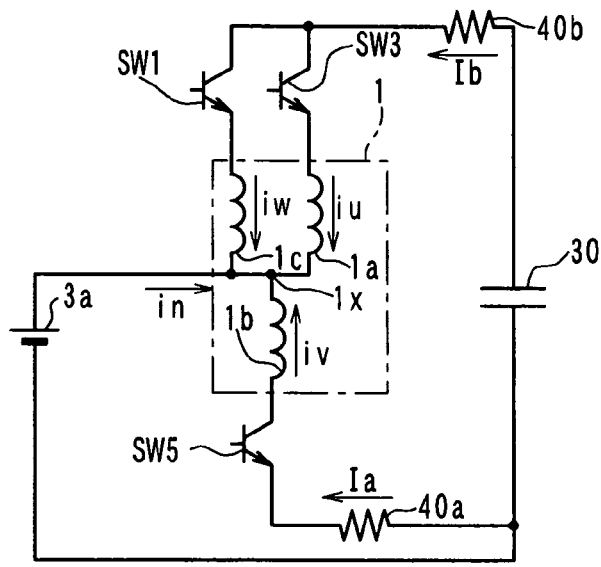
FIG. 91 is a diagram schematically showing the inverter circuit shown in FIG. 85.
Figure 92:
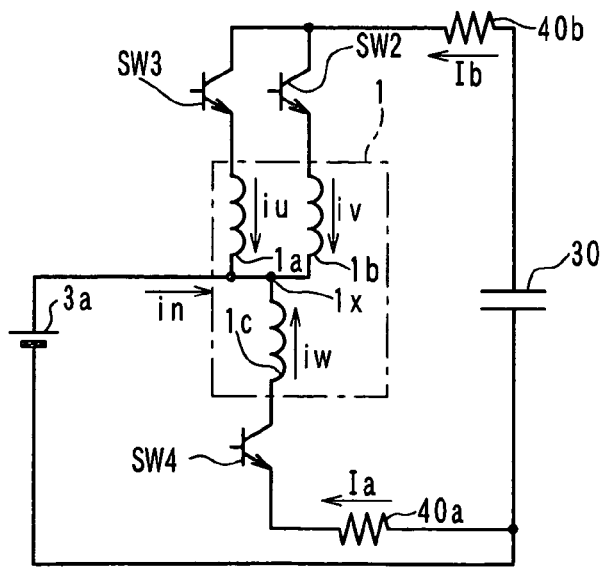
FIG. 92 is a diagram schematically showing the inverter circuit shown in FIG. 85.

FIG. 90 shows a schematic diagram of the inverter circuit 20 when the transistors SW1, SW2 and SW6 are ON similarly to FIG. 82. FIG. 91 shows a schematic diagram of the inverter circuit 20 when the transistors SW1, SW3 and SW5 are ON, similarly to FIG. 83. FIG. 92 shows a schematic diagram of the inverter circuit 20 when the transistors SW2, SW3 and SW4 are ON similarly to FIG. 84. In each of FIGS. 87 to 92, the directions of the flows of electric current Ia and Ib are defined such that arrows indicate positive directions, respectively.

The flowchart in FIG. 86 is provided by adding step S345a, step S362, step S345b and step S364 to the flowchart in FIG. 78.

Referring to FIG. 86, after step S340a is performed, the electric current Ib flowing through the resistor 40b is acquired at step S345a. After step S361 is performed, the electric currents Ib for three phases are set together into three-phase AC currents of the three-phase fixed coordinate system and the three-phase AC currents are coordinate-transformed into AC currents of the two-phase fixed coordinate system at step S362.

Specifically, when the transistors SW3, SW4 and SW5 are ON among the transistors SW1 to SW6 as shown in FIG. 87, the U-phase electric current iu is acquired as the electric current Ib at step S345a.

When the transistors SW2, SW4 and SW6 are ON among the transistors SW1 to SW6 as shown in FIG. 88, the V-phase electric current iv is acquired as the electric current Ib at step S345a.

When the transistors SW1, SW5 and SW6 are ON among the transistors SW1 to SW6 as shown in FIG. 89, the W-phase electric current iw is acquired as the electric current Ib at step S345a.

The electric currents Ib for the three-phases, that is, the U-phase electric current iu, the V-phase electric current iv and the W-phase electric current iw, are acquired in this manner. Then, YES is produced at step S350a and after the next step S361 is performed, the control processing proceeds to step S362 to set the electric currents Ib for the three-phases acquired at the step S345a together into three-phase AC currents iu, iv and iw of the three-phase fixed coordinate system. In addition the three-phase AC currents iu, iv and iw of the three-phase fixed coordinate system are coordinate-transformed into the AC currents of the two-phase fixed coordinate system.

In FIG. 86, after step S340b is performed, the electric current Ib flowing through the resistor 40b is acquired at step S345b. After step S363 is performed, the electric currents Ib for three phases are set together into three-phase AC currents of the three-phase fixed coordinate system and the three-phase AC currents are coordinate-transformed into electric currents $i\alpha$ and $i\beta$ of the two-phase fixed coordinate system at step S364.

Specifically, when the transistors SW1, SW2 and SW6 are ON among the transistors SW1 to SW6 as shown in FIG. 90, the electric current (iu+in) is acquired as the electric current Ib at step S345b.

When the transistors SW1, SW3 and SW5 are ON among the transistors SW1 to SW6 as shown in FIG. 91, the electric current (iv+in) is acquired as the electric current Ib at step S345b.

When the transistors SW2, SW3 and SW4 are ON among the transistors SW1 to SW6 as shown in FIG. 92, an electric current (iw+in) is acquired as the electric current Ib at step S345b.

After the electric currents Ib for the three-phases, that is, the electric currents (iu+in), (iv+in) and (iw+in), are acquired in this manner, YES is produced at step S350b. Then, step S363 is performed and the control processing proceeds to step S364 to set the electric currents Ib for the three-phases acquired at the step S345b together into the three-phase AC currents (iu+in), (iv+in) and (iw+in). The three-phase AC currents (iu+in), (iv+in) and (iw+in) are coordinate-transformed into the AC currents $i\alpha$ and $i\beta$ of the two-phase fixed coordinate system, similarly to the first embodiment described above. This can result in electric currents excluding the neutral-point electric current in for each phase. The AC currents of the two-phase fixed coordinate system thus acquired at steps S362 and S364 are used for calculating the voltage command wave for each phase at step S100 in FIG. 2.

(Twenty-Second Embodiment)

The seventeenth embodiment described above is an example, in which the positive electrode of the DC power source 3 is connected to the positive-pole bus 22. Instead, in the twenty-second embodiment described below, the positive electrode of the DC power source 3 is connected to the positive electrode of the capacitor 30.

Figure 93:
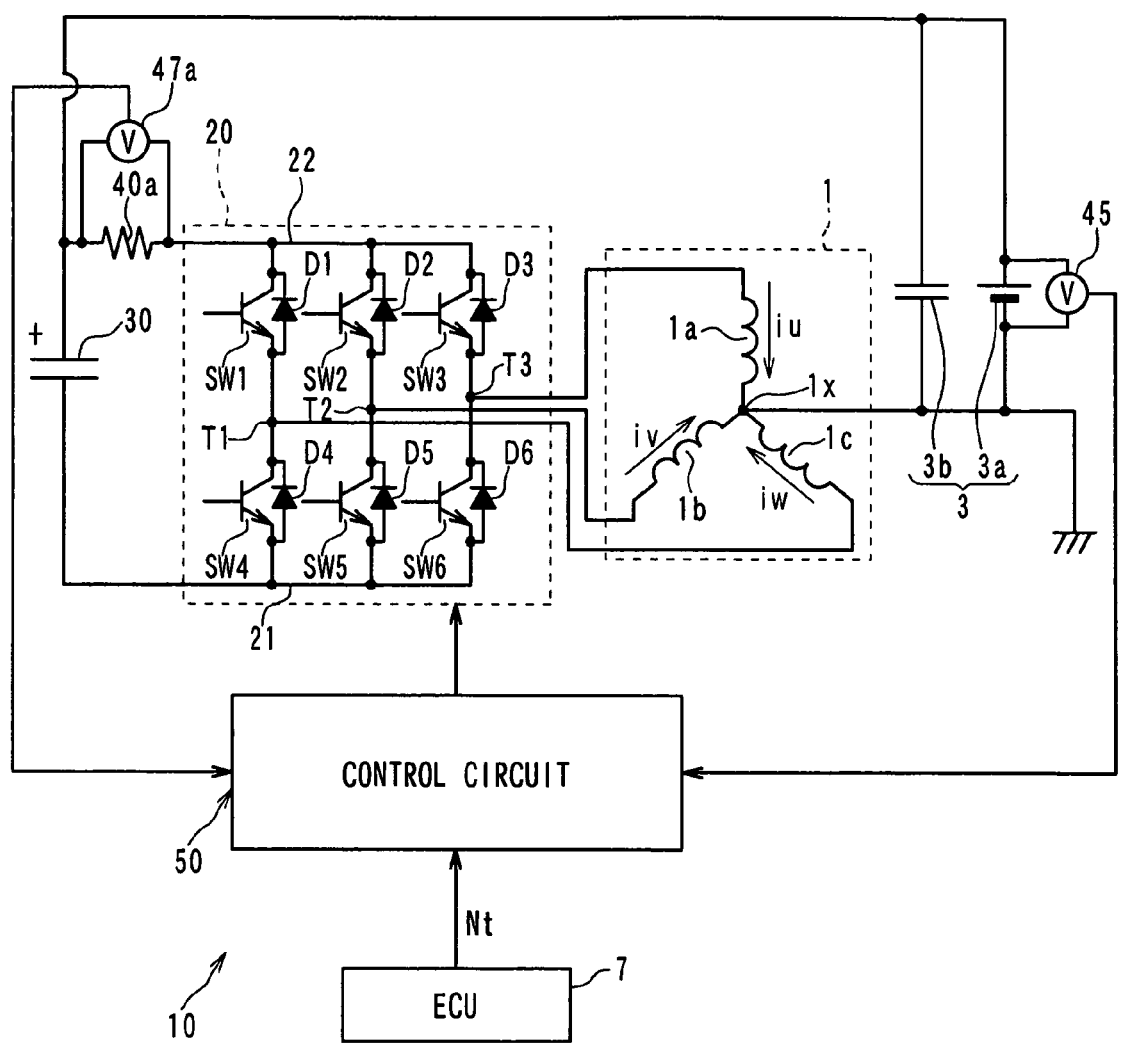
FIG. 93 is a diagram showing the configuration of a driving apparatus in a twenty-second embodiment according to the present invention.

FIG. 93 shows the circuit configuration of the driving apparatus 10 of the present embodiment.

The driving apparatus 10 of the present embodiment has the configuration in which the resistor 40a and the voltage sensor 47a are not connected between the negative electrode of the capacitor 30 and the negative-pole bus 21 but are connected between a common connection point of the positive electrode of the capacitor 30 and the positive electrode of the DC power source 3 and the positive-pole bus 22.

The positive electrode of the battery 3a is not connected to the positive-pole bus 22 but is connected to the positive electrode of the capacitor 30. the positive electrode of the capacitor 3b is connected not to the positive-pole bus 22 but connected to the positive electrode of the capacitor 30.

Figure 94:
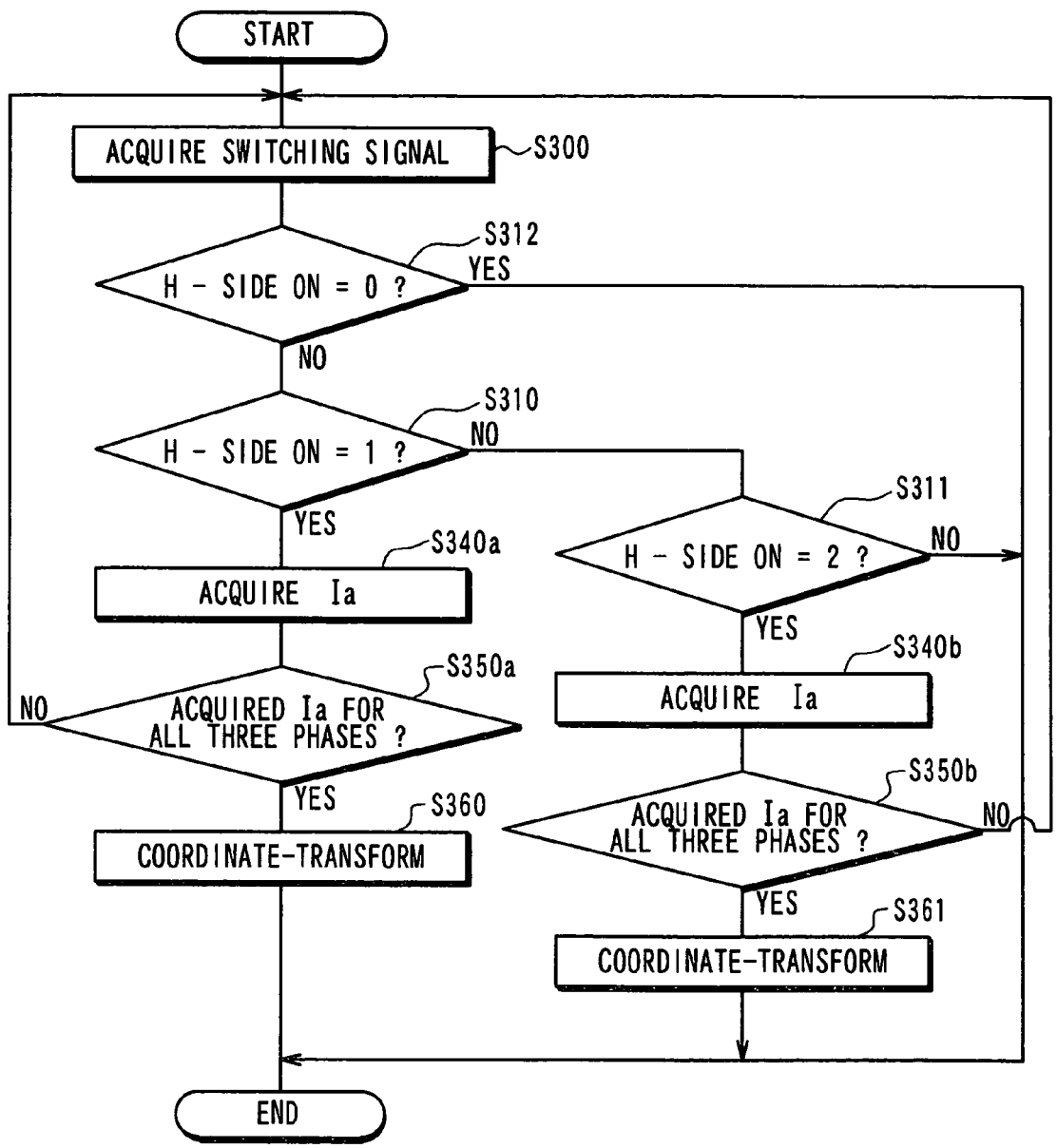
FIG. 94 is a flowchart showing control processing performed by a control circuit shown in FIG. 93.

The control circuit 50 of the present embodiment performs the electric current calculation processing in accordance with a flowchart of FIG. 94. The electric current calculation processing performed by the control circuit 50 will be described below.

Figure 95:
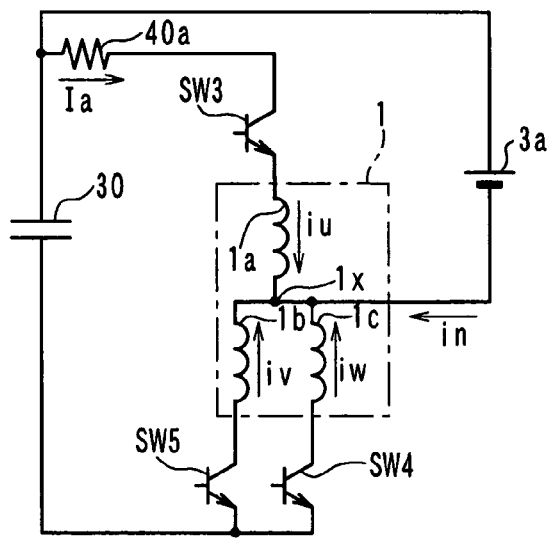
FIG. 95 is a diagram schematically showing an inverter circuit shown in FIG. 93.

FIG. 95 shows a schematic diagram of the inverter circuit 20 when the transistors SW3, SW4 and SW5 are ON among the transistors SW1 to SW6. In FIG. 95, the transistors SW1, SW2 and SW6 are not shown.

Figure 96:
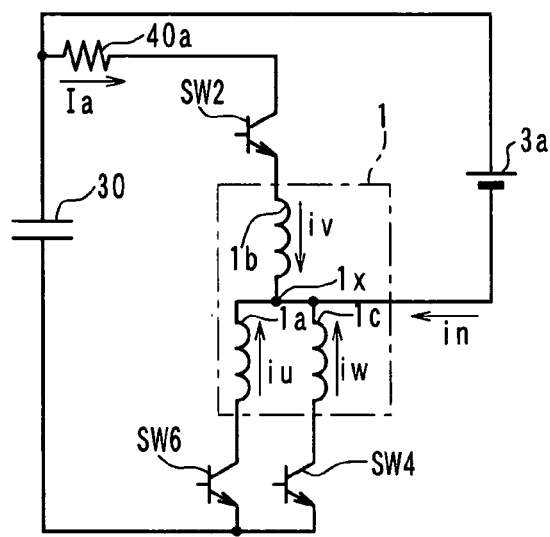
FIG. 96 is a diagram schematically showing the inverter circuit shown in FIG. 93.

FIG. 96 shows a schematic diagram of the inverter circuit 20 when the transistors SW2, SW4 and SW6 are ON among the transistors SW1 to SW6. In FIG. 96, the transistors SW1, SW3 and SW5 are not shown.

Figure 97:
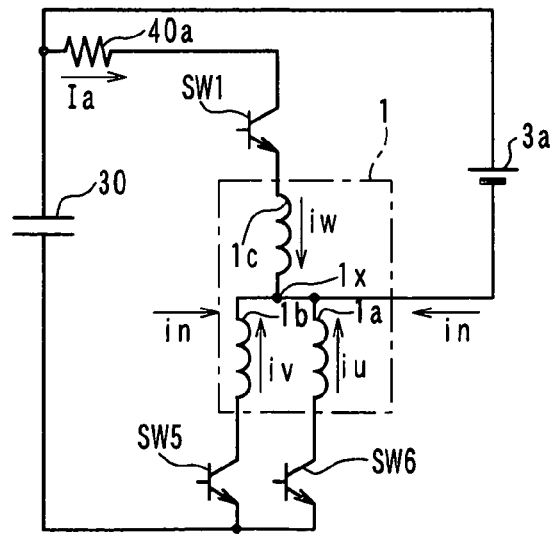
FIG. 97 is a diagram schematically showing the inverter circuit shown in FIG. 93.

FIG. 97 shows a schematic diagram of the inverter circuit 20 when the transistors SW1, SW5 and SW6 are ON among the transistors SW1 to SW6. In FIG. 97, the transistors SW2, SW3 and SW4 are not shown.

Figure 98:
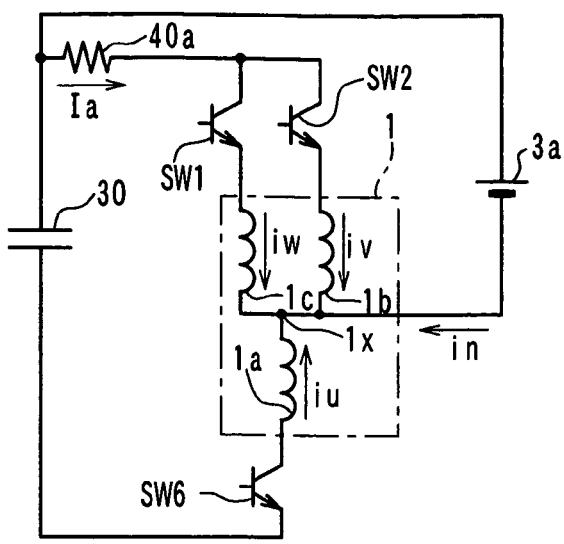
FIG. 98 is a diagram schematically showing the inverter circuit shown in FIG. 93.

FIG. 98 shows a schematic diagram of the inverter circuit 20 when the transistors SW1, SW2 and SW6 are ON among the transistors SW1 to SW6. In FIG. 98, the transistors SW3, SW4 and SW5 are not shown.

Figure 99:
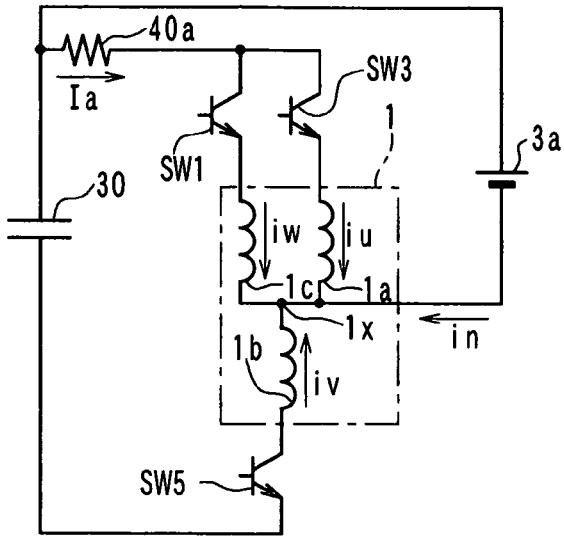
FIG. 99 is a diagram schematically showing the inverter circuit shown in FIG. 93.

FIG. 99 shows a schematic diagram of the inverter circuit 20 when the transistors SW1, SW3 and SW5 are ON among the transistors SW1 to SW6. In FIG. 99, the transistors SW2, SW4 and SW6 are not shown.

Figure 100:
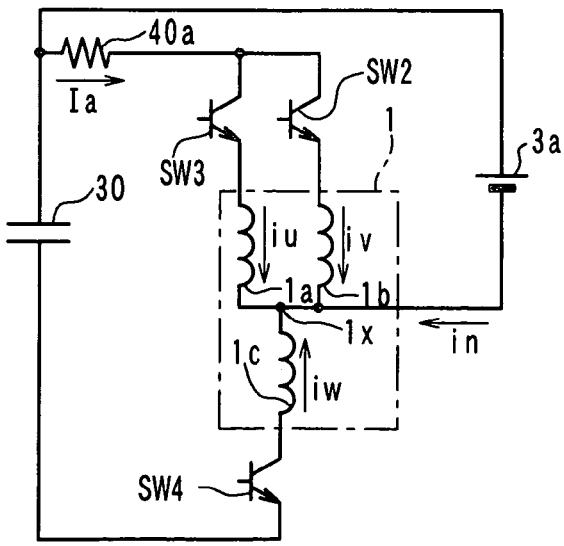
FIG. 100 is a diagram schematically showing the inverter circuit shown in FIG. 93.

FIG. 100 shows a schematic diagram of the inverter circuit 20 when the transistors SW2, SW3 and SW4 are ON among the transistors SW1 to SW6. In FIG. 100, the transistors SW1, SW5 and SW6 are not shown.

In FIGS. 95 to 100, the diodes D1 to D6 are not shown either. The direction of the flow of the electric current 1a in each of FIGS. 95 to 100 is defined such that arrows indicate a positive direction.

First, description will be made with respect to the situation, in which the transistors SW3, SW4 and SW5 are ON among the transistors SW1 to SW6 as shown in FIG. 95.

First, at step S300 in FIG. 94, the switching signal is acquired. At the next step S312, it is checked whether the number of ON transistors (denoted as ON number in FIG. 94) among the transistors SW1, SW2 and SW3 (denoted as high-side SWs in FIG. 94) is zero or not based on the switching signal.

Since it is determined at this point that the number of ON transistors among the transistors SW1, SW2 and SW3 is one, NO is produced at step S312.

At the next step S310, it is checked whether the number of ON transistors (denoted as ON number in FIG. 94) among the transistors SW1, SW2 and SW3 (denoted as high-side SWs in FIG. 94) is one or not based on the switching signal.

Since it is determined at this point that the number of ON transistors among the transistors SW1, SW2 and SW3 is one, YES is produced at step S310.

At the next step S340, the U-phase electric current iu is acquired as the electric current Ia flowing through the resistor 40a. At the next step S350a, it is checked whether or not the electric current Ia at step S340a described above has been acquired for three-phases. Since the electric current Ia has been acquired only for the U-phase at this point, it is determined that the electric current Ia has not been acquired for the three phases yet and NO is produced. Then, the processing returns to step S300.

When the transistors SW2, SW4 and SW6 are ON among the transistors SW1 to SW6 (FIG. 96), the V-phase electric current iv is acquired as the electric current Ia flowing through the resistor 40a at the next step S340a, similarly to the situation, in which the transistors SW3, SW4 and SW5 are ON (FIG. 95).

When the transistors SW1, SW5 and SW6 are ON among the transistors SW1 to SW6 (FIG. 97), the W-phase electric current iw is acquired as the electric current Ia flowing through the resistor 40a at the next step S340a.

The electric current Ia at the step S340a are acquired for the three-phases of the U-phase, the V-phase and the W-phase in this manner. Then, YES is produced at the next step S350a. The control processing proceeds to step S360 to bring the electric current Ia for the three phases acquired at the step S340a together into three-phase AC currents iu, iv and iw of the three-phase fixed coordinate system. In addition the three-phase AC currents, currents iu, iv and iw of the three-phase fixed coordinate system are coordinate-transformed into AC currents iα and iβ of the two-phase fixed coordinate system.

Then, the switching signal is acquired at step S300 and the control processing proceeds to the next step S312.

Next, description will be made with respect to the situation, in which the transistors SW1, SW2 and SW6 are ON among the transistors SW1 to SW6 as shown in FIG. 98.

In this case, it is determined that the number of ON transistors among the transistors SW1, SW2 and SW3 is not zero and NO is produced at step S312. At the next step S310, it is determined that the number of ON transistors among the transistors SW1, SW2 and SW3 is not one, NO is produced at step S310. In addition, the control processing proceeds to step S311 to determine whether the number of ON transistors among the transistors SW1, SW2 and SW3 is two or not.

Since the transistors SW1 and SW2 are ON among the transistors SW1, SW2 and SW3, it is determined that the number of ON transistors among the transistors SW1, SW2 and SW3 is two and YES is produced at step S311.

Next, the control processing proceeds to step S340b to acquire the electric current (iu+in) as the electric current Ia flowing through the resistor 40a. At the next step S350b, it is checked whether or not the electric current Ia at the step S340b has been acquired for the three phases. Since the electric current Ia has been acquired only for the U-phase at this point, it is determined that the electric current Ia has not been acquired for the three phases yet and NO is produced. Then, the processing returns to step S300.

When the transistors SW1, SW3 and SW5 are ON among the transistors SW1 to SW6 (FIG. 99), the processing is performed similarly to the situation, in which the transistors SW1, SW2 and SW6 are ON (FIG. 98) such that an electric current (iv+in) is acquired as the electric current Ia flowing through the resistor 40a at the next step S340b.

When the transistors SW2, SW3 and SW4 are ON among the transistors SW1 to SW6 (FIG. 100), the electric current (iw+in) is acquired as the electric current Ia flowing through the resistor 40a at step S340b.

As described above, the electric current Ia at the step S340b has been acquired for the three-phases of the U-phase, the V-phase and the W-phase. Thus, YES is produced at the next step S350b.

Then, the control processing proceeds to step S361 to bring the electric current Ia for the three phases acquired at the step S340b together into three-phase AC currents (iu+in), (iv+in) and (iw+in) of the three-phase fixed coordinate system. In addition the three-phase AC currents, currents (iu+in), (iv+in) and (iw+in) of the three-phase fixed coordinate system are coordinate-transformed into AC currents of the two-phase fixed coordinate system. Thus, the AC currents of the two-phase fixed coordinate system excluding the neutral-point electric current in for each phase can be acquired.

Through the processing, when one of the transistors SW1, SW2 and SW3 is ON and two of the transistors SW4, SW5 and SW6 are ON, the electric currents of the two-phase fixed coordinate system can be acquired. On the other hand, when two of the transistors SW1, SW2 and SW3 are ON and one of the transistors SW4, SW5 and SW6 are ON, the electric currents of the two-phase fixed coordinate system can also be acquired. The AC currents of the two-phase fixed coordinate system thus acquired are used for calculating the voltage command wave for each phase at step S100 in FIG. 2.

(Twenty-Third Embodiment)

Next, the twenty-third embodiment will be described, in which the resistor 40b for detecting the electric current and the voltage sensor 47b are added to the driving apparatus 10 of the twenty-second embodiment described above, as shown in FIG. 101.

Figure 101:
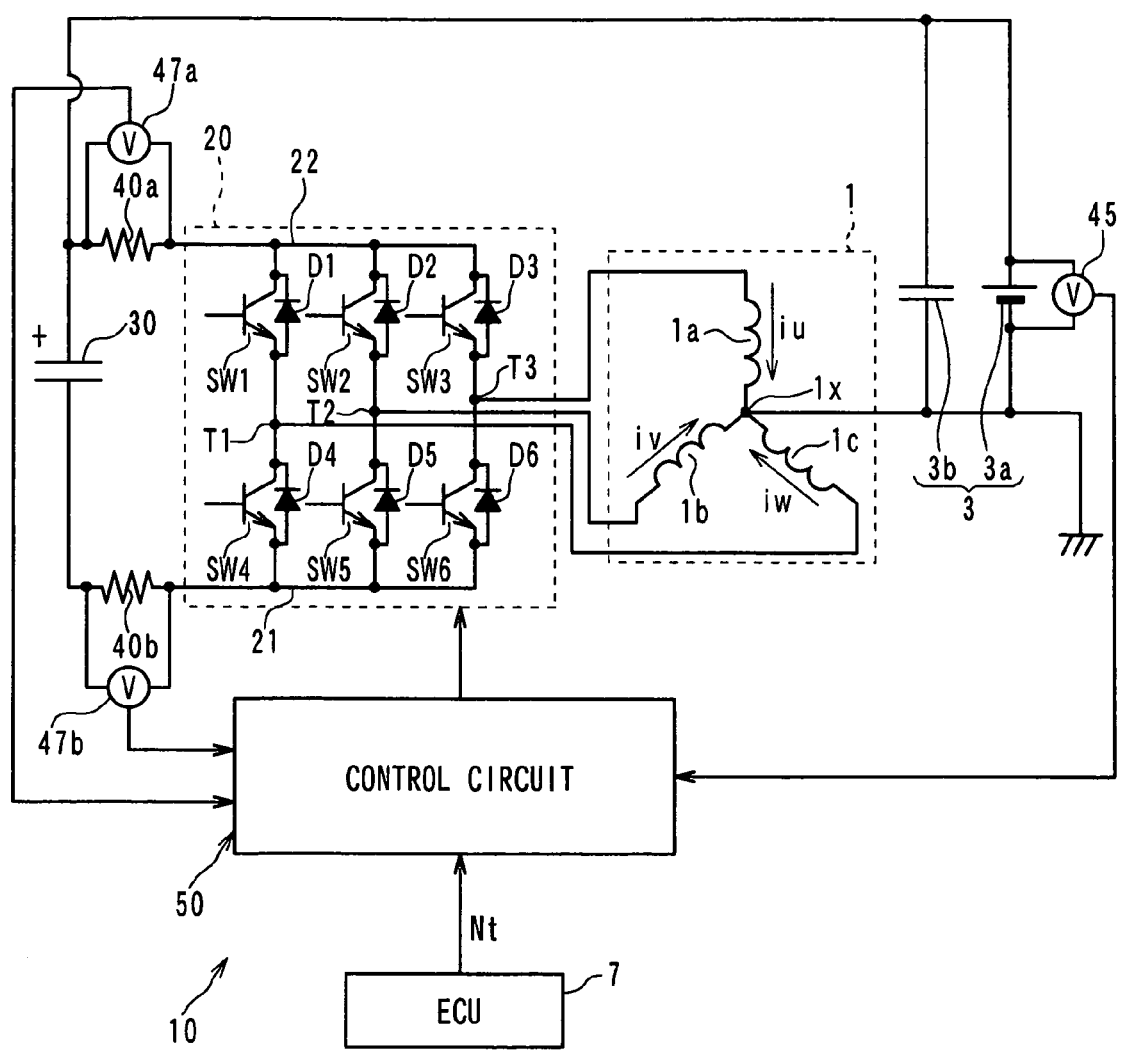
FIG. 101 is a diagram showing the configuration of a driving apparatus in a twenty-third embodiment according to the present invention.

FIG. 101 shows the circuit configuration of the driving apparatus 10 of the present embodiment. The driving apparatus 10 of the present embodiment has the configuration in which the resistor 40b and the voltage sensor 47b are added to the circuit configuration in FIG. 93.

The resistor 40b is connected between the negative electrode of the capacitor 30 and the negative-pole bus 21 of the inverter circuit 20. The voltage sensor 47b detects a potential difference between one terminal and the other terminal of the resistor 40b.

Figure 102:
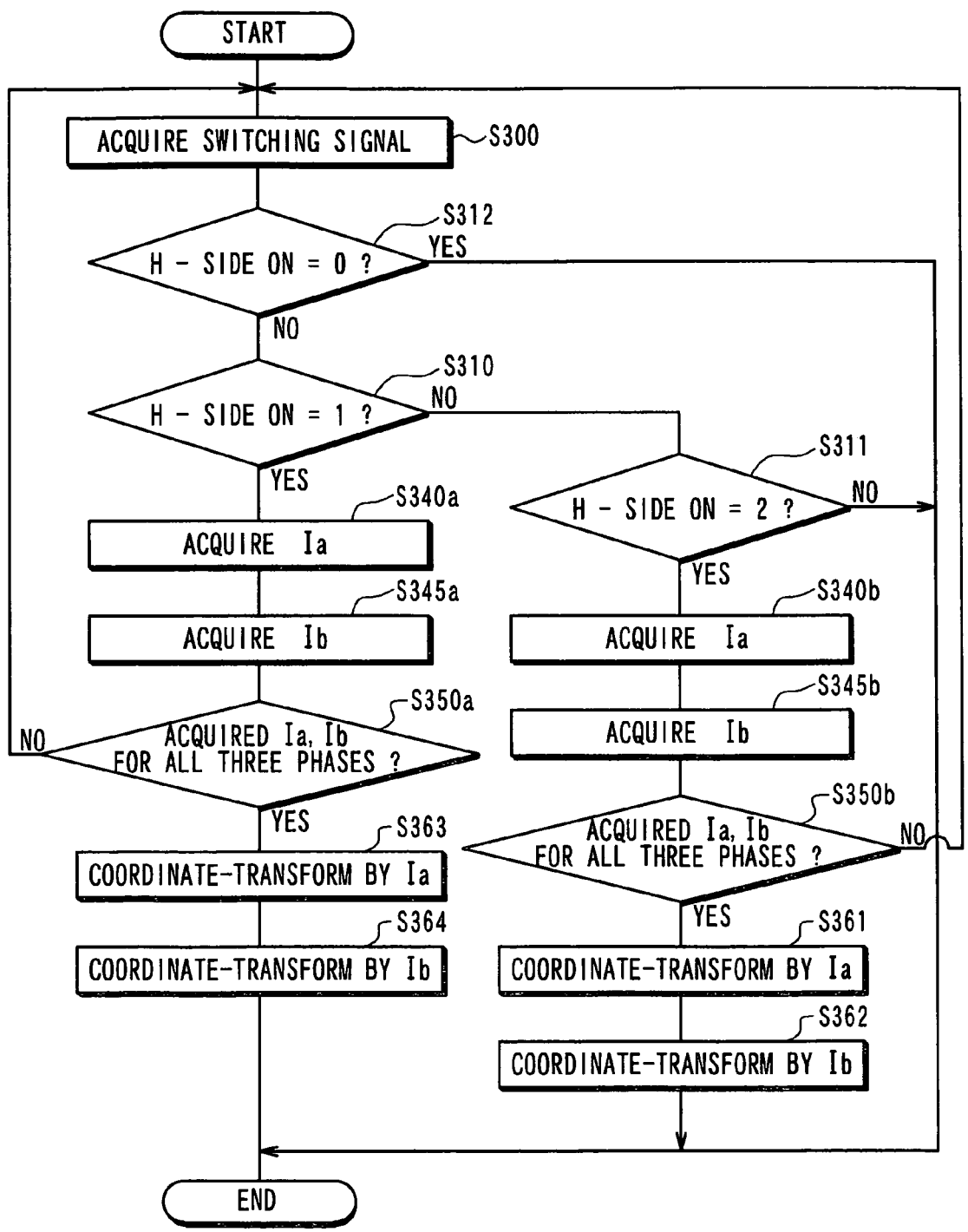
FIG. 102 is a flowchart showing control processing performed by a control circuit shown in FIG. 101.

The control circuit 50 of the present embodiment performs the electric current calculation processing in accordance with a flowchart in FIG. 102 instead of the flowchart in FIG. 94. Thus, description will be made with respect to differences between the electric current calculation processing of the present embodiment and the electric current calculation processing of the twenty-second embodiment described above.

Figure 103:
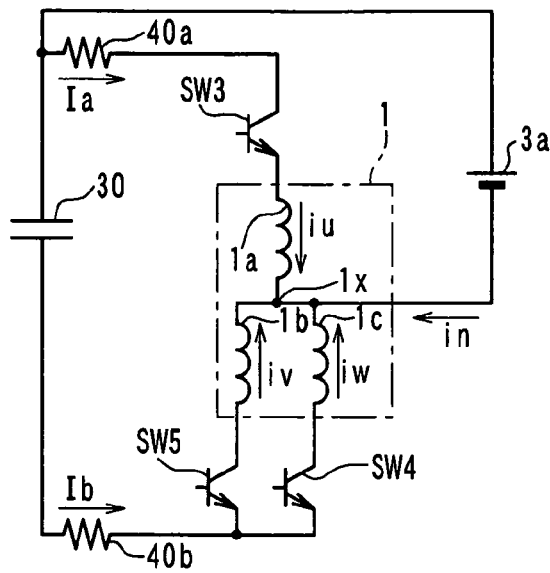
FIG. 103 is a diagram schematically showing an inverter circuit shown in FIG. 101.
Figure 104:
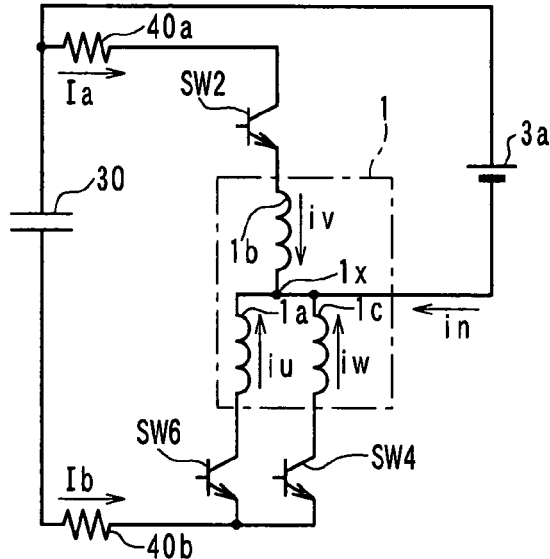
FIG. 104 is a diagram schematically showing the inverter circuit shown in FIG. 101.
Figure 105:
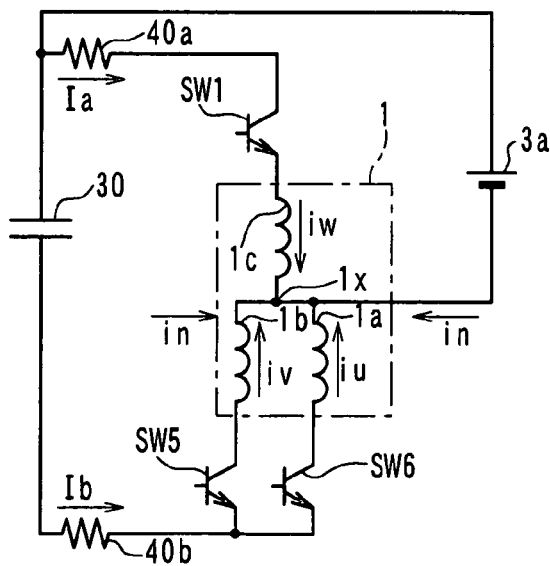
FIG. 105 is a diagram schematically showing the inverter circuit shown in FIG. 101.

FIG. 103 shows a schematic diagram of the inverter circuit 20 when the transistors SW3, SW4 and SW5 are ON similarly to FIG. 95. FIG. 104 shows a schematic diagram of the inverter circuit 20 when the transistors SW2, SW4 and SW6 are ON similarly to FIG. 96. FIG. 105 shows a schematic diagram of the inverter circuit 20 when the transistors SW1, SW5 and SW6 are ON similarly to FIG. 97.

Figure 106:
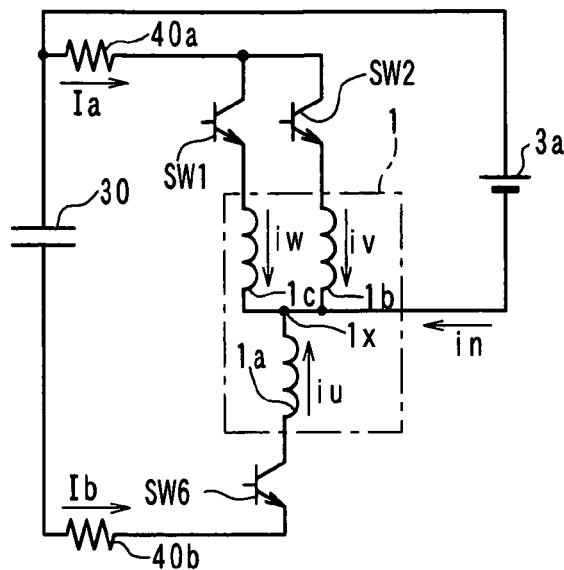
FIG. 106 is a diagram schematically showing the inverter circuit shown in FIG. 101.
Figure 107:
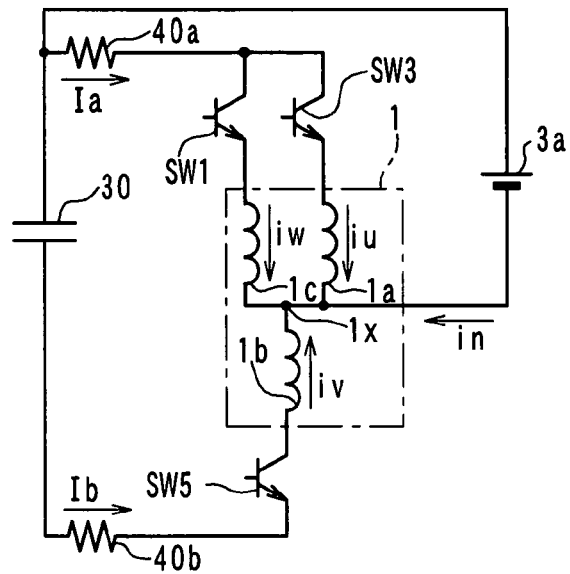
FIG. 107 is a diagram schematically showing the inverter circuit shown in FIG. 101.
Figure 108:
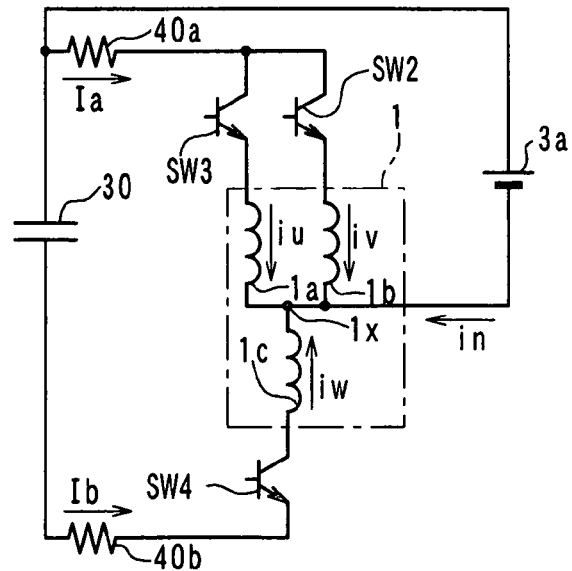
FIG. 108 is a diagram schematically showing the inverter circuit shown in FIG. 101.

FIG. 106 shows a schematic diagram of the inverter circuit 20 when the transistors SW1, SW2 and SW6 are ON similarly to FIG. 98. FIG. 107 shows a schematic diagram of the inverter circuit 20 when the transistors SW1, SW3 and SW5 are ON similarly to FIG. 99. FIG. 108 shows a schematic diagram of the inverter circuit 20 when the transistors SW2, SW3 and SW4 are ON similarly to FIG. 100. In each of FIGS. 103 to 108, the directions of the flows of electric current Ia and Ib are defined such that arrows indicate positive directions, respectively.

The flowchart in FIG. 102 is provided by adding step S345a, step S364, step S345b and step S362 to the flowchart in FIG. 94.

Referring to FIG. 102, after step S340a is performed, the electric current Ib flowing through the resistor 40b is acquired at step S345a. After step S363 is performed, the electric currents Ib for the three-phases are set together into three-phase AC currents and the three-phase AC currents are coordinate-transformed into the electric currents iα and iβ of the two-phase fixed coordinate system at step S364.

Specifically, when the transistors SW3, SW4 and SW5 are ON among the transistors SW1 to SW6 as shown in FIG. 103, the electric current (iu+in) is acquired as the electric current Ib at step S345a.

When the transistors SW2, SW4 and SW6 are ON among the transistors SW1 to SW6 as shown in FIG. 104, the electric current (iv+in) is acquired as the electric current Ib at step S345a.

When the transistors SW1, SW5 and SW6 are ON among the transistors SW1 to SW6 as shown in FIG. 105, the electric current (iw+in) is acquired as the electric current Ib at step S345a.

The electric currents Ib for the three-phases, that is, the electric currents (iu+in), (iv+in) and (iw+in), are acquired in this manner. Then, YES is produced at step S350a and after the next step S363 is performed, the control processing proceeds to step S364 to set the electric currents Ib for the three-phases acquired at the step S345a together into three-phase AC currents (iu+in), (iv+in) and (iw+in). The three-phase AC currents (iu+in), (iv+in) and (iw+in) are coordinate-transformed into the electric currents iα and iβ of the two-phase fixed coordinate system, similarly to the first embodiment described above. This can result in the AC currents iα and iβ of the two-phase fixed coordinate system excluding the neutral-point electric current in for each phase.

On the other hand, in FIG. 102, after step S340b is performed, the electric current Ib flowing through the resistor 40b is acquired at step S345b. After step S361 is performed, the electric currents Ib for three phases are set together into three-phase AC currents of the three-phase, fixed coordinate system and the three-phase AC currents are coordinate-transformed into the AC currents of the two-phase fixed coordinate system at step S362.

Specifically, when the transistors SW1, SW2 and SW6 are ON among the transistors SW1 to SW6 as shown in FIG. 106, the U-phase electric current iu is acquired as the electric current Ib at step S345b.

When the transistors SW1, SW3 and SW5 are ON among the transistors SW1 to SW6 as shown in FIG. 107, the V-phase electric current iv is acquired as the electric current Ib at step S345b.

When the transistors SW2, SW3 and SW4 are ON among the transistors SW1 to SW6 as shown in FIG. 108, the W-phase electric current iw is acquired as the electric current Ib at step S345b.

After the electric currents Ib for the three-phases, that is, the U-phase electric current iu, the V-phase electric current iv and the W-phase electric current iw, are acquired in this manner, YES is produced at step S350b. Then, step S361 is performed and the control processing proceeds to step S362 to set the electric currents Ib for the three-phases acquired at the step S345b together into three-phase AC currents of the three-phase fixed coordinate system. The three-phase AC currents are coordinate-transformed into the AC currents of the two-phase fixed coordinate system. The AC currents of the two-phase fixed coordinate system thus acquired at steps S362 and S364 are used for calculating the voltage command wave for each phase at step S100 in FIG. 2.

(Other Embodiments)

The twentieth and twenty-second embodiments described above are examples, in which the AC currents of the two-phase fixed coordinate system are acquired at steps S360 and S361. In addition, the AC currents of the two-phase fixed coordinate system may be coordinate-transformed to acquire three-phase AC currents of the three-phase fixed coordinate system. In this case, the three-phase AC currents of the three-phase fixed coordinate system are used for the control of the three-phase AC currents.

The twentieth and twenty-second embodiments described above are examples, in which the three-phase AC currents of the three-phase fixed coordinate system are coordinate-transformed into the AC currents of the two-phase fixed coordinate system at step S361 and the electric currents excluding the neutral-point electric current in for each phase from the phase electric currents are acquired. Alternatively, the three-phase AC currents of the three-phase fixed coordinate system including the neutral-point electric current in for each phase may be used for the control of the three-phase AC currents.

In the twentieth and twenty-second embodiments described above, the three-phase AC currents of the three-phase fixed coordinate system may be transformed into electric currents of the rotational coordinate system in acquiring the electric currents excluding the neutral-point electric current in for each phase from the three-phase AC currents of the three-phase fixed coordinate system.

The twenty-first and twenty-third embodiments described above are examples, in which the AC currents of the two-phase fixed coordinate system are acquired at steps S361, S362; S363 and S364. In addition, the AC currents of the two-phase fixed coordinate system may be coordinate-transformed to acquire the three-phase AC currents of the three-phase fixed coordinate system. In this case, the three-phase AC currents of the three-phase fixed coordinate system are used for the control of the three-phase AC currents.

The twenty-first and twenty-third embodiments described above are examples, in which the three-phase AC currents of the three-phase fixed coordinate system are coordinate-transformed into the AC currents of the two-phase fixed coordinate system at steps S361 and S364 and the electric currents excluding the neutral-point electric current in for each phase from the phase electric currents are acquired. Alternatively, the three-phase AC currents of the three-phase fixed coordinate system including the neutral-point electric current in for each phase may be used for the control of the three-phase AC currents.

In the twenty-first and twenty-third embodiments described above, the three-phase AC currents of the three-phase fixed coordinate system may be transformed into electric currents of the rotational coordinate system and the electric currents excluding the neutral-point electric current in for each phase from the phase electric currents may be acquired, in acquiring the electric currents excluding the neutral-point electric current in for each phase from the three-phase AC currents of the three-phase fixed coordinate system.

The first, fifth, sixth, seventh, eighth, eleventh, twelfth, thirteenth, fifteenth and seventeenth embodiments-described above are examples, in which the three-phase AC currents iva, iva and iwa of the three-phase fixed coordinate system are coordinate-transformed into the AC currents of the two-phase fixed coordinate system to exclude the neutral-point electric current in for each phase from the three-phase AC currents iva, iva and iwa. The present invention is not limited thereto and the three-phase AC currents iva, iva and iwa of the three-phase fixed coordinate system may be coordinate-transformed into the electric currents of the rotational coordinate system to exclude the neutral-point electric current in for each phase.

In the fifth, sixth, seventh, eighth, eleventh, twelfth, thirteenth, fifteenth and seventeenth embodiments described above, the three-phase AC currents including the neutral-point electric current are coordinate-transformed to exclude the neutral-point electric current in for each phase included in the three-phase AC currents, similarly to the first embodiment described above. The present invention is not limited thereto and the following modifications can be made.

Specifically, similarly to the second embodiment described above, the resistor connected between the neutral point 1x of the stator coil 1 and the positive electrode of the battery 3a is used and the voltage sensor for detecting the potential difference between one terminal and the other terminal of the resistor is used.

The control circuit 50 detects the neutral-point electric current in each time the U-phase electric current, the V-phase electric current and the W-phase electric current are detected on the basis of the voltage detected by the voltage sensor and the resistance value of the resistor. In addition, the neutral-point electric current in for each phase electric current can be used to exclude the neutral-point electric current in for each phase included in the three-phase AC currents.

The embodiments described above are examples, in which the driving apparatus according to the present invention is applied to the driving apparatus for the three-phase AC synchronous motor. Alternatively, the driving apparatus according to the present invention may be applied to a driving apparatus for a two-phase AC synchronous motor or a multiphase AC synchronous motor of four phases or more.

Each of embodiments described above is an example, in which the neutral-point electric current is excluded from the detection value of electric current including the neutral-point electric current to acquire the phase electric current. Alternatively, detection values of electric current including the neutral-point electric current for three phases may be set together and used for control to achieve a certain electric current amplitude.

Each of the embodiments described above is an example, in which the resistor and the voltage sensor are used as an electric current detecting section for detecting an electric current. The present invention is not limited thereto and a hall element which detects an electric current in a noncontact manner may be used as the electric current detecting section.

What is claimed is:

1. A driving apparatus for a three-phase AC synchronous motor, in which a rotor is rotated by a rotating magnetic field produced by a stator coil including three coils star-connected to a neutral point, the driving apparatus comprising:
    an inverter circuit including pairs of switching elements, each of the pairs of the switching elements being connected in series, the pairs of the switching elements being provided for respective phases and being connected in parallel between a positive-pole bus and a negative-pole bus;
    a control section configured to turn on, for outputting each of three-phase AC currents from the inverter circuit, one of the switching elements connected to one of the positive-pole bus and the negative-pole bus and two of the switching elements connected to other one of the positive-pole bus and the negative-pole bus;
    a capacitor;
    the inverter circuit configured to output the three-phase AC currents to the stator coil for generating the rotating magnetic field based on an output voltage from a DC power source connected between the neutral point and one of the positive-pole bus and the negative-pole bus and an output voltage from the capacitor in association with switching operation of the pairs of the switching elements for the respective phases;
    an electric current detecting section configured to detect an electric current flowing between one of the positive-pole bus and the negative-pole bus and one of the DC power source and the capacitor;
    a current acquiring section configured to acquire, for each of the phases, an electric current containing a phase electric current output to one of the three coils as the electric current detected by the electric current detecting section, the current acquiring section further acquiring electric currents detected by the electric current detecting section for all three phases; and
    the control section configured to set the electric currents for the three-phases detected by the electric current detecting section and acquired by the current acquiring section together into three-phase AC currents, the control section controlling, based on the three-phase AC currents, the pairs of the switching elements for the respective phases such that the switching operation of the pairs of the switching elements for the respective phases is performed.

2. The driving apparatus for a three-phase AC synchronous motor according to claim 1, wherein:
the capacitor is connected between the positive-pole bus and the negative-pole bus;
the DC power source is connected between a negative electrode of the capacitor and the neutral point;
the electric current detecting section is configured to detect the electric current flowing between the negative-pole bus and a common connection point of the negative electrode of the capacitor and the negative electrode of the DC power source;
the current acquiring section is configured to acquire, for each of the phases, the electric current provided by adding the neutral-point electric current flowing between the neutral point and the DC power source to the phase electric current output to one of the three coils as the electric current detected by the electric current detecting section, the current acquiring section further acquiring electric currents detected by the electric current detecting section for all three phases; and
the control section is configured to set the electric currents for the three-phases detected by the electric current detecting section and acquired by the current acquiring section together into the three-phase AC currents, the control section controlling, based on the three-phase AC currents, the pairs of the switching elements for the respective phases such that the switching operation of the pairs of the switching elements for the respective phases is performed.

3. The driving apparatus for a three-phase AC synchronous motor according to claim 2, wherein:
when the three-phase AC currents of a three-phase fixed coordinate system acquired by any one of the first to fourth current acquiring sections is the three-phase AC current of the three-phase fixed coordinate system, which is the electric current provided by adding the neutral-point electric current to the phase electric current output to one of the three coils, the control unit transforms the three-phase AC currents of the three-phase fixed coordinate system into the electric currents of a two-phase coordinate system for excluding the neutral-point electric current for each of the phases from the three-phase AC currents of the three-phase fixed coordinate system.

4. The driving apparatus for a three-phase AC synchronous motor according to claim 1, wherein:
the capacitor is connected between the positive-pole bus and the negative-pole bus;
the DC power source is connected between a negative electrode of the capacitor and the neutral point;
the electric current detecting section is configured to detect the electric current flowing between the negative-pole bus and a common connection point of the negative electrode of the capacitor and the negative electrode of the DC power source;
the current acquiring section is configured to acquire, for each of the phases, the phase electric current output to one of the three coils as the electric current detected by the electric current detecting section, the current acquiring section further acquiring the electric currents detected by the electric current detecting section for all three phases; and
the control section configured to set the electric currents for the three-phases detected by the electric current detecting section and acquired by the current acquiring section together into three-phase AC currents, the control section controlling, based on the three-phase AC currents, the pairs of the switching elements for the respective phases such that the Switching operation of the pairs of the switching elements for the respective phases is performed.

5. The driving apparatus for a three-phase AC synchronous motor according to claim 4, wherein:
when the three-phase AC currents of a three-phase fixed coordinate system acquired by any one of the first to fourth current acquiring sections is the three-phase AC current of the three-phase fixed coordinate system, which is the electric current provided by adding the neutral-point electric current to the phase electric current output to one of the three coils, the control unit transforms the three-phase AC currents of the three-phase fixed coordinate system into the electric currents of a two-phase coordinate system for excluding the neutral-point electric current for each of the phases from the three-phase AC currents of the three-phase fixed coordinate system.

6. A driving apparatus for a three-phase AC synchronous motor, in which a rotor is rotated by a rotating magnetic field produced by a stator coil including three coils star-connected to a neutral point, the driving apparatus comprising:
an inverter circuit including pairs of switching elements, each of the pairs of the switching elements being connected in series, the pairs of the switching elements being provided for respective phases and being connected in parallel between a positive-pole bus and a negative-pole bus;
a control section configured to turn on, for outputting each of three-phase AC currents from the inverter circuit, one of the switching elements connected to the positive-pole bus and two of the switching elements connected to the negative-pole bus;
a capacitor connected between the positive-pole bus and the negative-pole bus;
the inverter circuit configured to output the three-phase AC currents to the stator coil for generating the rotating magnetic field based on an output voltage from a DC power source connected between the neutral point and the positive-pole bus and an output voltage from the capacitor in association with switching operation of the pairs of the switching elements for the respective phases;
an electric current detecting section configured to detect an electric current flowing between one of the positive-pole bus and the negative-pole bus and the capacitor;
a current acquiring section configured to acquire, for each of the phases, an electric current provided by adding a neutral-point electric current flowing between the neutral point and the DC power source to a phase electric current output to one of the three coils as the electric current detected by the electric current detecting section, the current acquiring section further acquiring electric currents detected by the electric current detecting section for all three phases; and
the control section configured to set the electric currents for the three-phases detected by the electric current detecting section and acquired by the current acquiring section together into three-phase AC currents, the control section controlling, based on the three-phase AC currents, the pairs of the switching elements for the respective phases such that the switching operation of the pairs of the switching elements for the respective phases is performed.

7. The driving apparatus for a three-phase AC synchronous motor according to claim 6, wherein:
the control section sets the electric currents for the three-phases detected by the electric current detecting section and acquired by the current acquiring section together into three-phase AC currents of a three-phase fixed coordinate system, transforms the three-phase AC currents of the three-phase fixed coordinate system into electric currents of a two-phase coordinate system to exclude the neutral-point electric current for each of the phases from the three-phase AC currents of the three-phase fixed coordinate system and controls the pairs of the switching elements for the respective phases based on the three-phase AC currents, from which neutral-point electric currents are excluded.

8. The driving apparatus for a three-phase AC synchronous motor according to claim 6, further comprising:
a neutral-point electric current detecting section configured to detect the neutral-point electric current,
wherein the control section sets the electric currents for the three-phases detected by the electric current detecting section and acquired by the current acquiring section together into three-phase AC currents of a three-phase fixed coordinate system, excludes the neutral-point electric current for each of the phases from the three-phase AC based on the electric current detected by the neutral-point electric current detecting section and controls the pairs of the switching elements for the respective phases based on the three-phase AC currents, from which neutral-point electric currents are excluded.

9. The driving apparatus for a three-phase AC synchronous motor according to claim 6, wherein:
the current acquiring section is configured to acquire, for each of the phases, a phase electric current output to one of the three coils as the electric current detected by the electric current detecting section, when the two of the switching elements connected to the positive-pole bus and the one of the switching elements connected to the negative-pole bus are turned on;
the electric currents for the three-phases detected by the electric current detecting section are set together into three-phase AC currents; and
the control section controls the pairs of the switching elements for the respective phases by including the three-phase AC currents.

10. A driving apparatus for a three-phase AC synchronous motor, in which a rotor is rotated by a rotating magnetic field produced by a stator coil including three coils star-connected to a neutral point, the driving apparatus comprising:
an inverter circuit including pairs of switching elements, each of the pairs of the switching elements being connected in series, the pairs of the switching elements being provided for respective phases and being connected in parallel between a positive-pole bus and a negative-pole bus;
a control section configured to turn on, for outputting each of three-phase AC currents from the inverter circuit, two of the switching elements connected to the positive-pole bus and one of the switching elements connected to the negative-pole bus;
a capacitor connected between the positive-pole bus and the negative-pole bus;
the inverter circuit configured to output the three-phase AC currents to the stator coil for generating the rotating magnetic field based on an output voltage from a DC power source connected between the neutral point and the positive-pole bus and an output voltage from the capacitor in association with switching operation of the pairs of the switching elements for the respective phases;
an electric current detecting section configured to detect an electric current flowing between one of the positive-pole bus and the negative-pole bus and the capacitor;
a current acquiring section configured to acquire, for each of the phases, a phase electric current output to one of the three coils as the electric current detected by the electric current detecting section, the current acquiring section further acquiring the phase electric currents for all three phases; and
the control section configured to set the phase electric currents for the three phases acquired by the current acquiring section together into three-phase AC currents, the control section controlling, based on the three-phase AC currents, the pairs of the switching elements for the respective phases such that the switching operation of the pairs of the switching elements for the respective phases is performed.

* * * * *